(12) United States Patent
Pitzer

(10) Patent No.: US 11,705,151 B1
(45) Date of Patent: Jul. 18, 2023

(54) SPEECH SIGNAL PROCESSING SYSTEM FACILITATING NATURAL LANGUAGE PROCESSING USING AUDIO TRANSDUCTION

(71) Applicant: Cornelius Jacobus Pitzer, Vancouver (CA)

(72) Inventor: Cornelius Jacobus Pitzer, Vancouver (CA)

( * ) Notice: Subject to any disclaimer, the term of this patent is extended or adjusted under 35 U.S.C. 154(b) by 0 days.

(21) Appl. No.: 18/161,424

(22) Filed: Jan. 30, 2023

(51) Int. Cl.
*G10L 15/00* (2013.01)
*G10L 25/72* (2013.01)
*G10L 15/30* (2013.01)
*G10L 15/16* (2006.01)

(52) U.S. Cl.
CPC .............. *G10L 25/72* (2013.01); *G10L 15/16* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 9,014,661 | B2 * | 4/2015 | deCharms | H04L 65/403 348/14.02 |
| 9,820,120 | B2 * | 11/2017 | deCharms | H04W 4/02 |
| 11,011,164 | B2 * | 5/2021 | Bhaya | G10L 15/22 |
| 11,024,306 | B2 * | 6/2021 | Bhaya | G06F 40/216 |
| 11,145,300 | B2 * | 10/2021 | Bhaya | G10L 15/1815 |
| 11,514,907 | B2 * | 11/2022 | Bhaya | G10L 15/1822 |
| 2021/0287676 | A1 * | 9/2021 | Bhaya | G10L 15/22 |

FOREIGN PATENT DOCUMENTS

| | | | | |
|---|---|---|---|---|
| AU | 2014262897 A1 * | 12/2015 | ........... | G06Q 50/265 |
| EP | 2992692 A2 * | 3/2016 | ........... | G06Q 50/265 |
| WO | WO-0179876 A2 * | 10/2001 | ............. | G01C 21/28 |
| WO | WO-2005077077 A2 * | 8/2005 | ....... | G08B 13/19621 |
| WO | WO-2014182638 A2 * | 11/2014 | ........... | G06Q 50/265 |

* cited by examiner

*Primary Examiner* — Satwant K Singh
(74) *Attorney, Agent, or Firm* — Shumaker, Loop & Kendrick, LLP; Lloyd Wilson

(57) ABSTRACT

Systems and methods transmit, to a user device across a network, digital communication(s) thereby facilitating displaying the digital communication(s) via a user interface of the user device. Based on a user of the user device providing user input(s) in response to the digital communication(s) response data related to physical location(s) are received and data processing is performed thereon to determine whether additional data collection sequence(s) should be provided. Based on determining an additional data collection sequence should be provided, a condition-specific data collection sequence is provided via the user interface to facilitate obtaining condition-specific data related to a condition at a physical location, where the condition-specific data includes audio data collected via the user device and where the obtaining the condition-specific data comprises using a speech signal processing system to perform audio transduction to generate the audio data from a speech signal and facilitate performing natural language processing thereon.

20 Claims, 46 Drawing Sheets

1400 — 1402

RISK ASSESSMENT

Assessor - John Doe

Current controls for: Working at heights

| | | |
|---|---|---|
| Is the worker using lanyards to prevent falling objects? | PASS | FAIL |
| Is the worker using an approved anchor point? | PASS | FAIL |
| Is the worker wearing an approved and inspected harness? | PASS | FAIL |
| Is there an approved permit to work for the task? | PASS | FAIL |

← BACK    NEXT →

RISK ASSESSMENT

Assessor - John Doe

Current controls for: Lifting and Rigging

| | | |
|---|---|---|
| Is the risk assessment/SLAM done and available to inspect? | PASS | FAIL |
| All lifting components used are inspected and certified | PASS | FAIL |
| Is the drop zone completely barricaded and properly posted? | PASS | FAIL |
| Is the required competent person or supervisor overseeing the lift at all times? | PASS | FAIL |

← BACK    NEXT →

RISK ASSESSMENT

Assessor - John Doe

Ask the person you are observing if they agree or disagree with the following statements.

| Managers always put safety first | AGREE | DO NOT AGREE |
| This company not really care about employees | AGREE | DO NOT AGREE |
| When you break a safety rule, are you treated fairly | AGREE | DO NOT AGREE |
| We are often unhappy with management's decisions on safety | AGREE | DO NOT AGREE |

1604

⇐ BACK                                                                 NEXT ⇒

RISK ASSESSMENT — 1702

Assessor - John Doe

Did you see any examples today of a manger or supervisor who

| Accepted other views | AGREE | DO NOT AGREE |
| Listened carefully | AGREE | DO NOT AGREE |
| Worked well together | AGREE | DO NOT AGREE |
| Simplified a task | AGREE | DO NOT AGREE |
| Sparked fresh thinking | AGREE | DO NOT AGREE |
| Took bold actions | AGREE | DO NOT AGREE |

1704

[← BACK]   [NEXT →]

RISK ASSESSMENT — 1802

Assessor - Jane Doe

Ask the person you are observing if they agree or disagree with the following statements.

| Even under pressure, people still work cautiously | AGREE | DO NOT AGREE |
| If you raise a safety concern, you often hear nothing of it again. | AGREE | DO NOT AGREE |
| In this company safety comes first | AGREE | DO NOT AGREE |
| People are reluctant to report all accidents and injuries | AGREE | DO NOT AGREE |

1804

[← BACK]   [NEXT →]

FIG. 18

RISK ASSESSMENT

Assessor - John Doe

What were the good practices that you saw?*

[ ↑ RECORD ]

What actions did you take today to reduce or remove risks?*

[ ↑ RECORD ]

* Text description or audio required

[⇐ BACK]  [NEXT ⇒]

FIG. 19

During your shift today, did you see or hear ANY manager or supervisor who:

| | | |
|---|---|---|
| Made a good decision, to get a job done | YES | NO |
| Offered or asked for a good idea on safety | YES | NO |
| Helped to make a job simpler and safer | YES | NO |
| Created good team work on a task | YES | NO |
| Listened carefully to the views of others | YES | NO |
| Accepted the ideas or suggestions of others | YES | NO |

FIG. 20

RISK ASSESSMENT RESULTS

| Observed from date | Observed to date | Observed Id |
|---|---|---|
| yyyy-mm-dd | yyyy-mm-dd ☐ | |

Location — --Any location-- ▾
Sublocation — --Any area-- ▾

Critical risk — --Any critical risk-- ▾
Shift — --Any shift-- ▾

Impact — --Any impact-- ▾
Six Why — --Any Six Why-- ▾

Supervisors Feedback — --Any supervisor feedback-- ▾
Risk Level — --Any risk level-- ▾

☐ Supervisors requires further action

Signed Off — --Any-- ▾
Supervisor — Any part of name

HPH — --Any-- ▾
Requires Further Action (Admin) — --Any-- ▾
Noteworthy — --Any-- ▾
Quality of observation — --Any quality of observation-- ▾

Close observation — --Any-- ▾
Date marked for closure — yyyy-mm-dd ☐
Noteworthy — yyyy-mm-dd
Prize — --Any-- ▾

[SEARCH]

Results: 1 to 32 of 2016

FIG. 24

RISK ASSESSMENT RESULTS

⊙ DASHBOARD/COMPANY/WORKSITE/REPORT

| Observed from date | Observed to date | Observed Id |
|---|---|---|
| yyy-mm-dd | yyy-mm-dd | |

Location  Sublocation  Shift
--Any location--  --Any area--  --Any shift--

Critical risk
✓ --Any location--
- None of the below
- Confined Space
- ELECTRICAL FIRE
- Electrocution
- Emergency Situation
- Equipment safeguarding
- Falling overboard
- Falling Through Openings
- Fire hazard
- Flooding
- Fuel spill
- Hand injury
- Hazardous Energy Isolation
- Hazmat
- Helicopter Operations
- Hotwork
- Lifting Six Why
--Any Six Why--

Risk Level
--Any risk level--

Quality of observation
--Any quality of observation-- further action oteworthy   Prize
--Any--    --Any-- oteworthy
yyy-mm-dd

Results: 1 to 32 of 2016

FIG. 25

RISK ASSESSMENT RESULTS

Observed from date: yyyy-mm-dd
Observed to date: yyyy-mm-dd
Observed Id:

Location: --Any location--
Sublocation: --Any area--
Shift: --Any shift--

Critical risk

Six Why: --Any Six Why--

Risk Level

Impact
- ✓ --Any impact--
- Major Catastrophe
- Multiple Fatalities (or worse)
- Fatality (or worse)
- Serious injury - life altering (or worse)
- Serious injury - recoverable (or worse)
- Lost time injury (or worse)

...y of observation
...y quality of observation

Prize: --Any--

Results: 1 to 32 of 2016

FIG. 26

RISK ASSESSMENT RESULTS

@ DASHBOARD/COMPANY/WORKSITE/REPORT

Observed from date | Observed to date | Observed Id
yyyy-mm-dd | yyyy-mm-dd |

Location | Sublocation | Shift
--Any location-- | --Any area-- | --Any shift--

Critical risk
--Any critical risk--

Six Why
✓ --Any Six Why--
Overlooked
Underestimated
Shortcut
Work Pressure
Inherent
Tolerated Impact
--Any impact--

Supervisors Feedback | | Supervisors require
--Any supervisor feedback-- |

Signed Off | Supervisor
--Any-- | Any part of name

HPH | Requires Further Action (Admin)
--Any-- | --Any--

Close observation | Date marked for closure
--Any-- | yyyy-mm-dd

SEARCH

FIG. 27

Critical Controls Pass/Fail

03 Aug 2021 to 28 Sep 2022

| CriticalRisk | Fail | Pass | CriticalRisk | Fail | Pass |
|---|---|---|---|---|---|
| ☐ Confined Space | 15.54% | 84.46% | ☐ Hotwork | 4.30% | 95.70% |
| Are all people involved with the entry listed on the permit? | 18.92% | 81.08% | Are fuels protected from ignition? | 4.30% | 95.70% |
| Is access to the confined space controlled? | 18.92% | 81.08% | Ar ignition sources from the hotwork contained to the protected area? | 7.53% | 92.47% |
| Is there a specific rescue plan and equipment? | 13.51% | 86.49% | Is there a Firewatch who knows how long to stay after the hot work is completed? | 2.15% | 97.85% |
| Is there a spotter/lookout/guard to check the area? | 10.81% | 89.19% | Is there an approved permit for the task? | 3.23% | 96.77% |
| ☐ Equipment Safeguarding | 27.86% | 72.14% | ☐ Lifting | 15.48% | 84.52% |
| Are all machine guards in place? | 42.86% | 57.14% | Are tag lines used to guide the load? | 16.42% | 83.58% |
| Emergency stops are within easy access of the related machine? | 10.71% | 89.29% | Are the anchor points (if used) certified for the load being lifted? | 15.96% | 84.04% |
| Equipment is locked, tagged and tried before use? | 14.29% | 85.71% | Barriers and exits | 85.71% | 14.29% |
| There are no gaps in the guards? | 43.57% | 56.43% | Is the dropzone effectively controlled? | 14.41% | 85.59% |
| ☐ Flooding | 20.00% | 80.00% | Is the load weight within 90% of the rated capacity of the equipment? | 810.24% | 89.76% |
| Classified doors are closed and locked? | 20.33% | 80.00% | Proper PE | 54.55% | 45.45% |
| ☐ Hazzardous Energy Isolation | 11.88% | 88.12% | Proper Procedures | 45.45% | 54.55% |
| Does the operator or mechanic have control of their personal key? | 12.87% | 87.13% | warning signs | 55.50% | 44.44% |
| Has the "Try" test been applied to ensure there is no energy? | 8.91% | 91.09% | ☐ Refueling at sea | | 100.00% |
| Is the equipment locked with a signed and dated tagged? | 13.86% | 86.14% | Fuel rate and tank level monitored? | | 100.00% |
| Is there an approved Permit To Work (PTW) for the task? | 11.88% | 88.12% | Is a radio link established? | | 100.00% |
| ☐ Hazmat | 13.33% | 86.67% | ☐ Working at heights | 22.57% | 77.43% |
| Are hazardous materials store correctly in an appropriate cabinet or designated area? | 20.00% | 60.00% | Is the worker using an approved anchor point? | 40.78% | 59.22% |
| Are ventilation fans working? | | 100.00% | Is the worker using lanyards to prevent falling objects? | 19.42% | 80.58% |
| Do all containers have labels identifying their contents? | 13.33% | 86.67% | Is the worker wearing an approved and inspected harness? | 17.48% | 82.52% |
| Is access controlled to hazardous material? | 20.00% | 80.00% | Is there an approved permit to work for the task? | 12.52% | 87.38% |
| ☐ Helicopter Operations | 1.25% | 98.75% | | | |
| Are landing conditions confirmed as green (Check with CNO or bridge). | | 100.00% | | | |
| Ensure no loose items/articles/debris on deck | 5.00% | 95.00% | | | |
| Is an H4O at the CO2 lance and dressed in complete fire fighting suit? | | 100.00% | | | |
| The foam system is lined up and ready for use and the valvve is open, then closed after. | | 100.00% | | | |

FIG. 37

SPEECH SIGNAL PROCESSING SYSTEM FACILITATING NATURAL LANGUAGE PROCESSING USING AUDIO TRANSDUCTION

FIELD OF THE INVENTION

This invention relates generally to the field of data collection, and more particularly embodiments of the invention relate to systems and methods for collecting data using a speech signal processing system that uses audio transduction to facilitate natural language processing.

BACKGROUND OF THE INVENTION

Many enterprises (e.g., companies, universities, organizations, institutions, etc.) commonly utilize data collection systems to obtain information from various users, such as employees, in order to obtain information, feedback, and/or opinions about various subjects. For instance, certain data collection systems may provide a record of various actions taken by employees to document workflows, processes, systems, and/or other organizational matters. In general, common techniques for gathering data may include observation, interviews, questionnaires, surveys, schedules, tracking, and monitoring. Once the data is collected, these enterprises may then analyze the data to perform various assessments and interpretations. Various systems and methods have been developed to collect data that are more meaningful and/or to provide analysis that is more impactful.

For many industries, providing a safe workplace is critical for protecting workers from injury and illness and can also create a productive work environment, boost employee morale, protect company assets, enhance brand value and goodwill, help win and retain customers, increase productivity, reduce absenteeism, reduce insurance claims, and reduce disruptions to business operations. Various systems exist for providing workplace safety training, ensuring and monitoring compliance with government rules and regulations, identifying hazardous risks, performing site evaluations, and documenting procedures and workplace conditions. Some of these systems are designed to identify, mitigate, or prevent potentially dangerous scenarios that may include unsafe environmental conditions, worker behaviors, and/or machinery functionality. For instance, one example safety procedure referred to "lockout tagout" can help to ensure that equipment is adequately shut down and inoperable until maintenance or repair work has been completed in order to keep employees safe from equipment or machinery. Another example is the use of equipment checklists that may be used by workers to inspect, maintain, take inventory of, and/or manage conditions of various equipment in certain industries (e.g., construction, manufacturing, or retail industries). However, existing systems and methods used to identify, mitigate, or prevent potentially dangerous scenarios may not always be adequate or may not be properly implemented, which can result in catastrophic scenarios for many enterprises. For instance, unexpected harmful events of large magnitude and consequence may be beyond the realm of normal expectations and as such may be extremely difficult to predict. These types of unexpected events often have a large impact in industries such as mining, defense, construction, utilities, military, and industrial manufacturing where certain events can cause employees to be severely or fatally injured. Thus, many enterprises utilize various data collection and analysis systems and methods to decrease the likelihood that these types of unexpected events occur.

The computing technology used to implement these data collection and analysis processes and systems is constantly evolving, and there is an ever-growing need for enterprises to improve their data collection and analysis processes with advancements in technology. As part of that adaptation process, enterprises may seek to incorporate improved methodologies and systems that provide more meaningful data collection and analysis in order to reduce the likelihood that harmful events of large magnitude and consequence occur.

Thus, a need exists for improved systems and methods for data collection and analysis.

BRIEF SUMMARY

Shortcomings of the prior art are overcome and additional advantages are provided through the provision of a speech signal processing system facilitating natural language processing using audio transduction. The system includes one or more processors and at least one computer readable storage medium that stores program instructions executable by the one or more processors. In particular, the program instructions are executable to, in part, transmit, to a user device across a network, one or more digital communications, the transmitting facilitating displaying the one or more digital communications via a user interface of the user device. Based on a user of the user device providing one or more user inputs in response to the one or more digital communications, response data related to one or more physical locations is received and data processing is performed thereon to determine whether one or more additional data collection sequences should be provided. Based on determining an additional data collection sequence should be provided, a condition-specific data collection sequence is provided via the user interface of the user device to facilitate obtaining condition-specific data related to a condition at a physical location, where the condition-specific data includes audio data collected via the user device, and where the obtaining the condition-specific data includes using a speech signal processing system to perform audio transduction to generate the audio data from a speech signal and facilitate performing natural language processing thereon.

Additionally, disclosed herein is a computer system for providing a condition-specific data collection sequence. The computing system includes one or more processors and at least one computer readable storage medium that stores program instructions executable by the one or more processors. In particular, the program instructions are executable to, in part, transmit, to a user device across a network, one or more digital communications, the transmitting facilitating displaying the one or more digital communications via a user interface of the user device. Based on a user of the user device providing one or more user inputs in response to the one or more digital communications, response data related to one or more physical locations is received and data processing is performed thereon to determine whether one or more additional data collection sequences should be provided. Based on determining an additional data collection sequence of the one or more data collection sequences should be provided, the additional data collection sequence that includes a condition-specific data collection sequence is provided, where the additional data collection sequence is provided via the user interface of the user device to facilitate obtaining condition-specific data related to a condition at a physical location.

Also disclosed herein is a computer-implemented method for facilitating natural language processing using audio transduction. The computer-implemented method includes, in part, transmitting, to a user device across a network, one or more digital communications, where the transmitting facilitates displaying the one or more digital communications via a user interface of the user device. Based on a user of the user device providing one or more user inputs in response to the one or more digital communications, response data related to one or more physical locations is received and data processing is performed thereon to determine whether one or more additional data collection sequences should be provided. Based on determining a data collection sequence should be provided, a condition-specific data collection sequence is provided via the user interface of the user device to facilitate obtaining condition-specific data related to a condition at a physical location, where the condition-specific data includes audio data collected via the user device, and where the obtaining the condition-specific data includes using a speech signal processing system to perform audio transduction to generate the audio data from a speech signal and facilitate performing natural language processing thereon.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 14 depicts an example user interface of a user device for providing user input(s) to evaluate a risk condition, in accordance with an embodiment of the present invention;

FIG. 15 depicts an example user interface of a user device for providing user input(s) to evaluate a risk condition, in accordance with an embodiment of the present invention;

FIG. 16 depicts an example user interface of a user device for providing user input(s) to evaluate company management, in accordance with an embodiment of the present invention;

FIG. 17 depicts an example user interface of a user device for providing user input(s) to evaluate company management, in accordance with an embodiment of the present invention;

FIG. 18 depicts an example user interface of a user device for providing user input(s) to survey individuals at a work site, in accordance with an embodiment of the present invention;

FIG. 19 depicts an example user interface of a user device for providing user input(s) that include an audio input, and/or written description, in accordance with an embodiment of the present invention;

FIG. 20 depicts an example user interface of a user device for providing user input(s) that include observations of company management, in accordance with an embodiment of the present invention;

FIG. 24 depicts an example user interface of a user device for providing user input(s) to search stored risk condition data, in accordance with an embodiment of the present invention;

FIG. 25 depicts an example user interface of a user device for providing user input(s) to search stored risk condition data based on risk type, in accordance with an embodiment of the present invention;

FIG. 26 depicts an example user interface of a user device for providing user input(s) to search stored risk condition data based on risk impact, in accordance with an embodiment of the present invention;

FIG. 27 depicts an example user interface of a user device for providing user input(s) to search stored risk condition data based on risk classification, in accordance with an embodiment of the present invention;

FIG. 37 depicts an example user interface of a user device for presenting analysis of passage or failure of critical controls, in accordance with an embodiment of the present invention;

DETAILED DESCRIPTION

Figure 1:
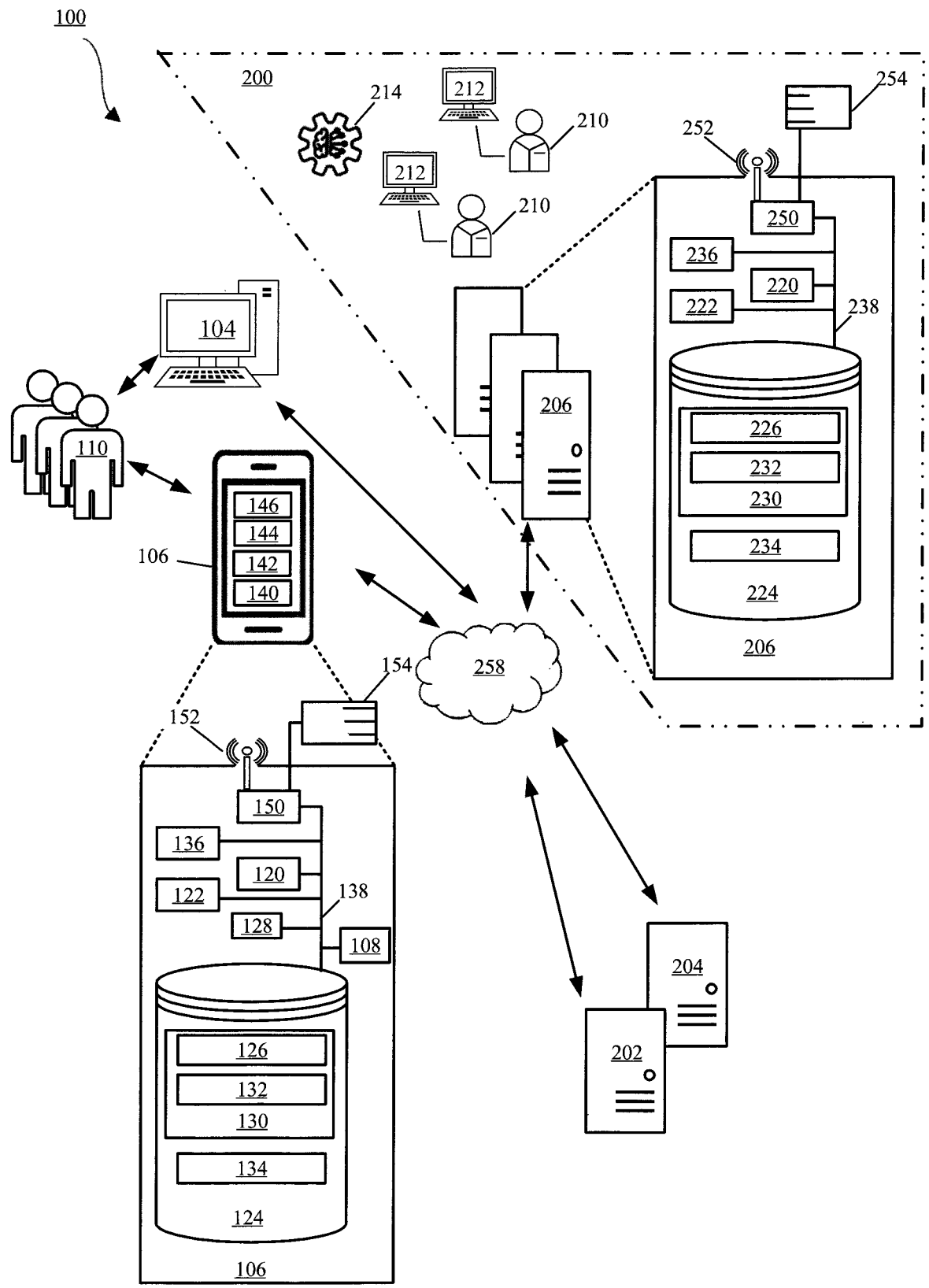
FIG. 1 illustrates an enterprise system, and environment thereof, for providing a condition-specific data collection sequence and/or facilitating natural language processing using audio transduction, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment", "an embodiment", "various embodiments", "one or more embodiments", etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terms "couple", "coupled", "couples", "coupling", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. Additionally, "electrically coupled" and the like should be broadly understood and include coupling involving any electrical signal, whether a power signal, a data signal, and/or other types or combinations of electrical signals.

In addition, as used herein, the terms "about", "approximately", or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise that hosts, maintains, or uses the disclosed systems and methods. The term enterprise generally describes a person or business enterprise providing goods or services. Interactions between an enterprise and its employees or users, can be implemented as an interaction between a computing system of the enterprise and a user device of the employee or other user. Each interaction may produce response data via one or more inputs provided by the employee or other user. Such inputs may be converted and stored as response data files and aggregated with response data collected from other employees or users. Example user inputs or responses may include, for example, responses to one or more digital communications related to one or more physical locations.

As used herein, the terms "employee", "assessor", or "user" may be used interchangeably and generally describe any person that interfaces with a computing device to which one or more digital communications are transmitted and from which response data is received that may be directly or indirectly associated with the enterprise. For instance, the "user" could be anyone conducting a risk assessment of a worksite associated with the enterprise. As used herein "physical location", "facility", or "worksite" may be used interchangeably and generally describe any indoor or outdoor location, area, or facility including, for example, a building or portion thereof (e.g., a manufacturing facility, a manufacturing equipment station, a production zone, etc.), a vehicle (e.g., a commercial sailing vessel, automobile, rail transport vehicle, airplane, etc.), an offshore oil production platform, a dock, an amusement park or portion thereof (attractions, amusement rides, etc.), a power station, a waste management facility, a nuclear waste disposal facility, or any other place, amenity, piece of equipment, building, structure, geographic area, and/or region.

Disclosed systems and methods transmit, across a network, one or more digital communications, which facilitates displaying the one or more digital communications via a user interface of a user device. Based on a user of the user device providing one or more user inputs in response to the one or more digital communications, response data related to one or more physical locations is received and data processing is performed thereon to determine whether one or more additional data collection sequences should be provided. Various embodiments described herein are in reference to utilizing the disclosed systems and methods in an environment where a risk assessment is being conducted. However, those of ordinary skill in the art will appreciate that the disclosed systems and methods are not limited to use in a risk assessment environment. The systems and methods described herein a generally applicable in other context in which a user interacts with a computing system. Other example interactions may include an interaction with respect to a condition-specific data collection sequence related to a condition at a physical location.

FIG. 1 illustrates a computing system 100 and environment thereof, according to at least one embodiment. The computing environment generally includes a user 110 that benefits through use of services and products offered by a provider through an enterprise system 200. The computing environment may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities. According to various embodiments, the one or more user devices may include an electroacoustic transducer (e.g., a microphone) that the user 110 may utilize to communicate with the enterprise system 200. Such electroacoustic transducer of user device 104, 106 may facilitate recording sound (e.g., a human voice or human-like voice, real or synthesized, in whole or in part) and transmission of sound. For instance, the electroacoustic transducer may incorporate magnetic induction where a sound wave causes a diaphragm attached to a coil to vibrate, which may cause a small magnet located inside the coil to oscillate thereby generating current where the current matches the sound waves. In other embodiments, the small magnet may be connected to the diaphragm. The diaphragm may be incorporated as a plate of a parallel-plate capacitor and the plates may be given a permanent electrical charge. Further, the relative motion of the magnet and coil may cause the voltage across the plates to change, which creates an electrical signal that can be amplified and transmitted to a recording device. In other embodiments, a piezoelectric crystal may be utilized. The electrical current that is generated may be propagated for the use of facilities for the transmission of communication (e.g., a wire, cables, wireless communication, or other connection between the point of origin and the point of reception) where the point of reception of the communication may be associated with the enterprise system 200 and may store the communication for to be replayed in the future reference.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system used on personal computers, central computing systems, phones, and other devices.

The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The user device 104, 106, but as illustrated with reference to the mobile device 106, includes components such as, at least one of each of a processor 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, or required or related to any or all of the applications or programs 130.

The memory device 122 is operatively coupled to the processor 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory additionally or alternatively can include an electrically erasable programmable read-only memory (EEPROM), flash memory or the like.

According to various embodiments, the memory device 122 and storage device 124 may be combined into a single storage medium. The memory device 122 and storage device 124 can store any of a number of applications that comprise computer-executable instructions and code executed by the processing device 120 to implement the functions of the user device 104, 106 described herein. For example, the memory device 122 may include such applications as a conventional web browser application and/or an enterprise-distributed application. These applications also typically provide a graphical user interface (GUI) on the display 140 that allows the user 110 to communicate via the user device 104, 106 with, for example, an enterprise system 200, and/or other devices or systems. In one embodiment, when the user 110 decides to participate in a digital data collection program, the user 110 may download or otherwise access an enterprise-based digital data collection program from an enterprise system 200 or from a distinct application server. In some embodiments, such as during a real-time, live digital data collection program, multiple user devices 140, 106 may communicate across a network with the enterprise system 200 and may transmit responses to the enterprise system 200 directly via one or more inputs. In other embodiments, the user 110 interacts with the enterprise system 200 via a web browser application in addition to, or instead of, an enterprise-distributed application.

The integrated software applications also typically provide a graphical user interface ("GUI") on the user computing device display screen 140 that allows the user 110 to utilize and interact with the user-computing device. The GUI display screens may include features for displaying information and accepting inputs from users, such as text boxes, data fields, hyperlinks, pull down menus, check boxes, radio buttons, and the like.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. In some embodiments, the mobile device 106 is or incorporates an audience response device or other personal response systems (e.g., a student response system).

The input and output system 136 includes an electroacoustic transducer 144 (e.g., a microphone) or other audio recording device. The electroacoustic transducer 144 may be configured to convert acoustic signals to electrical signals. For instance, the electroacoustic transducer 144 may utilize a sound wave that causes vibration of a diaphragm to cause vibration of the structure of the electroacoustic transducer 144 to produce a varying magnetic force, which in turn causes molecules to be temporarily condensed (i.e., condensation) and then these molecules return to their original position (i.e., rarefaction). Oscillating rarefactions and condensations of the molecules generate a propagating an analog electrical current flowing through a coil of wire that can be propagated from the electroacoustic transducer 144. In one particular example, the input and output system 136 employs an analog-to-digital converter (ADC) that converts the analog signal received by the electroacoustic transducer 144 of the mobile device 106 into a digital signal.

The input and output system 136 may also include other components enabling the computing device 104 or mobile device 106 to receive various inputs via, for example, button manipulations or screen touches from the user 110. Other non-limiting examples of input and output devices or components utilized by the input and output system 136 may include one or more of each, any, and all of a keypad, a wireless or wired keyboard, a touch-screen, a touchpad, an electroacoustic transducer (e.g., microphone) 142, a mouse, a joystick, a pointer device, a button, a switch, a light, an LED, a soft key, an infrared sensor, personal response device (e.g., student response systems or "clickers"), a camera 146 (e.g., a digital camera), a buzzer, a bell, a printer and/or other input and output device(s). The input and output devices may be used by the user 110 to communicate with the computing device 104 or mobile device 106 to in whole or in part access, use, or control the computing device 104 or mobile device 106. For example, the user 110 can provide inputs via voice, text, or graphical indicia selections. In particular, the user 110 may provide various inputs to communicate the enterprise system 200, and in response, the enterprise system 200 may produce various outputs, thereby facilitating two-way communication between the user 110 and the enterprise system 200.

The input and output system 136 may be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. or combinations thereof. The user device 104, 106 may enable users to input any number or combination of authentication systems.

The user device, referring to either or both of the computing device 104 and the mobile device 106, may also include a positioning device 108, which can be for example a global positioning system device (GPS) configured to be used by a positioning system to determine a physical location of the computing device 104 or mobile device 106 in order to associate response data with a physical location. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a worksite or other location to determine that the mobile device 106 is located proximate these known devices.

In the illustrated example, a system intraconnect 138 (e.g., system bus), connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, Global Positioning System (GPS) may be included for navigation and location-related data exchanges, ingoing and/or outgoing. Communications may also or alternatively be conducted via the connector 154 for wired connections such as by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can be accessed, used, or controlled, in whole or in part, by an enterprise (e.g., companies, employers, organizations, institutions, etc.) directly or tangentially associated with the user 110. For instance, as non-limiting examples, the enterprise may be an employer of the user 110 and/or a third-party commercial research company. Various other enterprises are also contemplated herein.

The enterprise system 200 may employ various automated or digital services or products accessible to the user 110 via the computing device 104 or mobile device 106. For instance, one such service or product accessible to the user 110 may include a risk assessment program or system. Various embodiments of the program or system may utilize some, all, or none of several functionalities, tools, components, or processes such as data processing, resource allocation, monitoring activities, disk and file management, communications, presentations, cybersecurity, artificial intelligence, machine learning, etc. The program or system may be compiled or otherwise generated, transmitted, and/or distributed, using machine code that can be executed by the computing device 104 or mobile device 106. Compilation of the program, system or portions thereof may be fully automated and/or incorporate user-assisted automation. For instance, the programs or systems for performing a risk assessment may utilize human(s) 210 and/or automated system(s) 214 that generate one or more digital communications and/or data collection sequence(s) that can be transmitted or otherwise distributed or provided to the user device 104, 106. Any number of human(s) 210 and/or automated system(s) 214 may be employed or utilized by the enterprise system 200. Non-limiting examples of human(s) 210 can include employees, contractors, consultants, advisors, managers, or other individuals associated with the enterprise system 200.

In various examples, the program or system may be compiled utilizing a Platform as a Service (PaaS) or Infrastructure as a Service (IaaS) that the human(s) 210 can access to compile the program or system. A PaaS does not permit the human(s) 210 to manage or control the underlying cloud infrastructure, but this service may enable the human(s) 210 to deploy user-created or acquired applications onto the cloud infrastructure using programming languages and tools provided by the provider of the application. A IaaS provides the human(s) 210 with permission to provision processing, storage, networks, and other computing resources as well as run arbitrary software (e.g., operating systems and applications) thereby giving the human(s) 210 full control over operating systems, storage, deployed applications, and potentially select networking components (e.g., host firewalls).

Human(s) 210 may utilize enterprise devices 212 to assist in compiling the program or system. The enterprise devices 212 can be a personal computer, a smart phone, or tablet computing device, and/or other mobile/computing device(s). Further, in some examples, the diagrammatic representation of the components of user device 104, 106 also apply to the enterprise devices 212. Enterprise device(s) 212 individually or collectively include input and output devices, (e.g., a touch screen, a monitor, a keyboard, etc.) for the human(s) 210 to input and receive information. Other non-limiting examples of input and output devices or components utilized by the enterprise device(s) 212 include one or more of each, any, and all of a keypad, a wireless or wired keyboard, a touch-screen, a touchpad, a microphone, a speaker, a mouse, a joystick, a pointer device, a button, a switch, a light, an LED, a soft key, an infrared sensor, personal response device, a camera (e.g., a digital camera), a buzzer, a bell, a printer and/or other input and output device(s). Inputs made via the input/output devices of the enterprise device(s) 212 by one or more human(s) 210 can be made via voice, text or graphical indicia selections in order to facilitate compilation of the program or system that is to communicate with the user device 104, 106. According to various embodiments, enterprise device(s) 212 may primarily serve as inputs or outputs to the computing system 206 of the enterprise system 200. Automated system(s) 214 may incorporate or otherwise utilize artificial intelligence to facilitate compilation of the program or system. For instance, the automated system(s) 214 may generate digital communications (e.g., queries, questions, inquiries, etc.) and/or data collection sequences (e.g., queries, questions, audio submission requests, image submission requests, description requests, etc.) Automated system(s) 214 may also perform natural language processing on audio data obtained once a speech signal processing system performs audio transduction on a speech signal to generate the audio data. According to various embodiments, automated system(s) 214 may primarily serve as inputs or outputs to the computing system 206 of the enterprise system 200.

The enterprise system 200 can be configured to generate data manually or to obtain data from a third party source such as, for example, a cloud storage service or remote database. Such data that may be generated, downloaded, or otherwise obtained may include, for example, industry-specific data that can be used by a computing system 206 to analyze and compare aggregated response data from the user 110 to measure performance of the enterprise relative other enterprises of a similar industry. In one example, the automated system(s) 214 or human(s) 210 may access third party systems using a software application (e.g., an integrated mobile software application or an application programming interface (API) software application) compatible with the third party system that can be integrated with the computing system 206 and accessible via the enterprise device(s) 212 to facilitate communication between software and systems by mapping computer-readable commands and data formats between systems. In another embodiment, the human(s) 210 access the third party system using a web browser application software to access a web-based software interface (e.g., a website).

The computing system 206 may have various components similar to the user device 104, 106. For instance, in one example the computing system 206 may include at least one of each of a processing device 220, and a memory device 222 for use by the processing device 220, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data and files, such as those for user accounts or user profiles, worksite data, enterprise data, company data, industry data, historical data, files downloaded or received from other devices, and other data items preferred by the enterprise or required or related to any or all of the applications or programs 230. In one non-limiting example, the computing system 206 may include applications or programs 230 that incorporate software that provides natural language processing and/or image recognition.

As illustrated, the computing system 206 includes an input/output system 236, which generally refers to, includes, and/or is operatively coupled with agent devices 212 and automated agents 214, as well as various other input and output devices. According to various embodiments, the computing system 206 may be used to distribute the digital data collection program as, for example a Software-as-a-Service (SaaS) that can be accessed by the user device 104, 106 on a subscription basis via a web browser or mobile application. SaaS may provide a user 110 with the capability to use applications running on a cloud infrastructure of the enterprise system 200, where the applications are accessible using the user device 104, 106 via a thin client interface such as a web browser and the user 110 is not permitted to manage or control the underlying cloud infrastructure (i.e., network, servers, operating systems, storage, or specific application capabilities that are not user-specific) of the enterprise system 200.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device 104, 106.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS (Global Positioning System) may be included for navigation and location-related data exchanges, ingoing and/or outgoing. Communications may also, or alternatively, be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the enterprise device(s) 212, and the enterprise computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of this description. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMAX, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, frames using frame relay, voice, video, data, and other suitable information between network addresses. The network 258 may also include one or more local area networks (LANs), radio access networks (RANs), metropolitan area networks (MANs), wide area networks (WANs), personal area networks (PANs), WLANs, campus area network (CAN), metropolitan area network (MAN), storage-area network (SAN), all or a portion of the internet and/or any other communication system or systems at one or more locations.

The network 258 may incorporate a cloud platform/data center that support various service models including Platform as a Service (PaaS), Infrastructure-as-a-Service (IaaS), and/or Software-as-a-Service (SaaS). The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, third-party PaaS, third-party IaaS, external databases, business entities, enterprises, organizations, institutions, companies, government entities, clubs, and groups of any size are all within the scope of the description. In at least one example, the external systems 202 and 204 third-party systems that store industry-specific data that can communicate with or be accessed by the enterprise device(s) 212. According to various embodiments, external systems 202 and 204 may utilize software applications that function using external resources that are available through a third-party provider such as SaaS, PaaS, or IaaS service models. Such external systems 202 include the third party systems accessible via the agent devices 212 using a software application (e.g., an integrated mobile software application or an API software application) that can be integrated with the computing system 206 to facilitate communication between software and systems by mapping computer-readable commands and data formats between systems. In another embodiment, the third party system may be accessible by the agent devices 212 using a web-based software interface (e.g., a website).

In certain embodiments, one or more of the systems described herein such as the user device (referring to either or both of the computing device 104 and the mobile device 106), the enterprise system 200, and/or the external systems 202 and 204 are, include, or utilize virtual resources. Such virtual resources include cloud resources or virtual machines. The virtual resources may utilize a cloud-computing configuration to provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select a mobile application icon of a computing platform of the enterprise system, login via a website to the computing platform of the enterprise system, or perform various other actions using the user device 104, 106 to initiate the interaction with the enterprise system 200. The user 110 may initiate the interaction at periodic intervals (e.g., at the beginning or end of each work shift, every hour, each day, each week, each month, etc.) and repeat either the entirety or solely portions of a same or similar interaction with the enterprise system 200. In other embodiments, the enterprise system 200 may initiate the interaction with the user 110 via the user device 104, 106. For instance, periodically or at periodic intervals, the enterprise system 200 may transmit the digital communication(s) unprompted such that the digital communication(s) are transmitted at a predetermined time or in response to various trigger mechanisms. For example, the enterprise system 200 may transmit the digital communication(s) to the user device 104, 106 at a time corresponding to a new work shift so that a user 110 working during such work shift is reminded or prompted to interact with the enterprise system 200. In instances where the enterprise system 200 initiates the interaction, the enterprise system 200 may transmit a digital communication that includes an embedded link, a web address (e.g., a uniform resource locator (URL)), a scannable code (e.g., a quick response (QR) code, barcode, etc.) to prompt the user 110 to interact with the enterprise system 200.

Further, the digital communication(s) may include any data transmission or communication in the form of a digital bit stream or a digitized analog signal that is transmitted across the network 258. The digital communication(s) are associated with the program or system that is compiled by the human(s) 210 and/or automated system(s) 214. Transmission of the digital communication(s) facilitates displaying the digital communication(s) via a user interface of the user device 104, 106. Based on the user 110 of the user device 104, 106 providing one or more user inputs (e.g., via the user interface, via a speech signal processing system, etc.) in response to the digital communication(s) response data related to physical location(s) is received and data processing is performed thereon using, for example, processing device 220. This received response data may then be stored to the storage device 224 or to a third party storage resource such as, for example, a cloud storage service or remote database. Additionally, this collected response data may be aggregated in order to allow the enterprise to have a sampling of responses from multiple users 110.

According to one embodiment, the collected response data may be stored to a relational database such as storage device 224 that stores associations associated with the response data such as, for example, based on classification of the user 110. For instance, the users 110 may be classified based on their titles, position, level of authority within the enterprise, department, job functions, geographic regions, work shifts, level of association with the enterprise, group assignment, team, or various other classifiers. Example position or title classifications may include senior management, middle managers, specialists, administration, administrative staff, supervisors, operators, contractors, contractor supervisors, contractor operators, employees, etc. Example department classifications may include accounting, management, customer service, information technology (IT), legal, human resources, sales, manufacturing, logistics, marketing, etc. Example association classifications may label the respondents based on user characteristics such as political party affiliation, intrinsic characteristics, economic affluence, education level, etc. Storing the collected response data to the relational database may facilitate sorting of the data to generate a report or performing analysis on the response data based on the responses. According to one embodiment, the enterprise system 200 may maintain the interaction or relational database that stores such data in order to access this data in future user interactions. In another embodiment, external systems 202, 204 may store the interaction or relational database.

The collected response data may also have metadata associated therewith that can be accessed by the enterprise system 200. The metadata may include, for example, (i) sequencing data representing the data and time when the response data was created, (ii) subject identifier data that characterizes the risk condition, (iii) weighting data representing the relative importance or magnitude of the risk condition, (iv) user identifier data identifying the user 110 such as, for example, a name of the user, a job title or role, department, work shift, etc., (v) provider identifier data identifying the owner of the data (e.g., the entity that operates the enterprise system 200), (vi) industry identification data identifying the industry associated with the data, (vii) a detailed risk score of the risk condition, and/or (viii) other types of data that could be helpful to the enterprise in order to classify and analyze the collected response data.

With respect to the user identifier data that may be included within the metadata, a database, such as storage device 224, may include database records that correspond to individual participants of the risk assessment. The database records may store a variety of data about the user including, without limitation, (a) a user identifier, (b) user work experience, (c) user supervisors, and/or (d) user activity data (including prior risk assessments completed by the user). The user identifier data may enable the enterprise to evaluate how thorough certain users are in performing the risk assessments.

In some embodiments, the enterprise system 200 may be configured to determine a geographic location of the user 110 based on the IP address of the user device 104, 106, which may facilitate evaluation of the risk assessment process. When a user 110 accesses the enterprise system 200 through the user device 104, 106, the enterprise system 200 can also capture additional information such as, for example, data indicating the amount of time it took the user 110 to conduct the risk assessment, tracking data of the user device 104, 106 to ensure that the user carried the device throughout the worksite to evaluate all locations that needed to be evaluated, audio data related to the environment and/or spoken information, and/or image data of various locations and conditions.

According to various embodiments, the human(s) 210 and/or automated system 214 of the enterprise system 200 may access an interaction database storing various data related to a user interaction with the enterprise system 200 to classify aspects of the response data. For instance, the response data may be classified based on risk level/magnitude in order to analyze the severity of various risk conditions or of a specific risk condition over time.

According to some embodiments, the user 110, via user device 104, 106, can access the enterprise system 200 using an Internet browser software application to access a web server in order to display a webpage of the enterprise. Alternatively, according to other embodiments, the enterprise system 200 can be accessed through an enterprise mobile software application installed on the user device 104, 106 that displays a GUI screen. In accessing the enterprise system 200, the user device 104, 106 transmits a user-interface-transmit command to the web server that can include the device IP address for the user device 104, 106 and system configuration data. In response to the user interface transmit command, the web server returns enterprise display data. Upon receiving the enterprise display data, the user device 104, 106 processes the display data and renders a GUI screen that is presented to the user 110, such as a provider website or a GUI within a provider mobile software application.

In some embodiments, the user device 104, 106 may also transmit system configuration data to the enterprise system 200, which may be used to authenticate the user device 104, 106. System configuration data can include, without limitation: (i) a unique identifier for the user device 104, 106 (e.g., a media access control (MAC) address hardcoded into a communication subsystem); (ii) a MAC address for the local network (e.g., a router MAC address); (iii) copies of key system files that are unlikely to change between instances when accessing the enterprise system 200; (iv) a list of applications running or installed on the user device 104, 106; and (v) any other data useful for ascertaining the identifiers underlying a support request or user communication.

According to some embodiments, the enterprise system 200 may apply the collected response data to a trained model that incorporates machine-learning algorithms in order to categorize or otherwise classify the response data. For example, the response data may include audio data derived from a speech signal and a natural language processing model may be used to interpret or "understand" the audio data in order to generate a textual comment corresponding to the speech signal. In other examples, the response data may include digital image data obtained via an image capturing input of the user device 104, 106 and an image recognition model may be used to identify various conditions from the digital image data.

According to various embodiments, the audio data and/or digital image data may undergo pre-processing using reduction analysis to produce reduced data. A reduction analysis may perform a qualification operation that removes unqualified audio data and/or digital image data that does not meaningfully contribute to the risk assessment analysis according to criteria defined by the enterprise. In some example embodiments, the reduced content may then be analyzed using various techniques to identify words from the audio data or to identify objects from digital image data. This analysis may utilize predictive processing that creates weight matrices that densely carry contextual (e.g., semantic) information from the selected corpus of audio data and/or digital image data.

Analysis of the audio data may facilitate deriving meaning or context from a speech signal comprised of unstructured data that includes natural language expression (e.g., of words and phrases) in order to generate text. In particular, during analysis each meaningful unit of the natural language expression may be interpreted as expressing relationships between elements of the speech signal as part of a natural language understanding (NLU) process. The NLU process may be programmed to understand meaning even due to mispronunciations.

For instance, the NLU process may analyze the audio data through, for example, semantic segmentation to identify attributes of the audio data. Attributes include, for instance, parts of speech, such as the presence of particular interrogative words, such as who, whom, where, which, how, or what. In another example, the content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques. Additionally, the NLU process can incorporate Part of Speech ("POS") tagging software code that assigns words a part of speech depending upon the neighboring words, such as tagging words as a noun, pronoun, verb, adverb, adjective, conjunction, preposition, or other relevant parts of speech. In this instance, the NLU process can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer."). POS tagging in conjunction with Named Entity Recognition ("NER") software processing techniques can be used to identify various content sources within the content data. NER techniques are utilized to classify a given word into a category, such as a person, product, organization, or location. Using POS and NER techniques to process the audio data allows for identifying particular words and text as a noun and as representing a person providing the speech signal (e.g., a content source).

As used herein, an artificial intelligence (AI) system, AI algorithm, AI module, program, and the like, generally refer to computer-implemented programs that are suitable to simulate intelligent behavior (i.e., intelligent human behavior) and/or computer systems and associated programs suitable to perform tasks that humans are typically required to performed. An AI system may include, for example, at least one of a series of associated if-then logic statements, a statistical model suitable to map raw sensory data into symbolic categories and the like, or a machine-learning program. A machine learning program, machine learning algorithm, or machine learning module, as used herein, is generally a type of AI including one or more algorithms that can learn and/or adjust parameters based on input data provided to the algorithm. In some instances, machine learning programs, algorithms, and modules are used at least in part in implementing AI functions, systems, and methods.

AI and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine-learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine-learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine-learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine-learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DB-SCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like According to various embodiments, a natural language processing system may process a natural language input and/or input audio data using a content driver software service that processes various data using natural language processing (NLP) technology (e.g., ASR technology, and NLU technology and/or combinations thereof) using one or more artificial intelligence software applications and/or systems (e.g., an ASR-NLU system). The artificial intelligence software applications and/or systems may implement, according to various embodiments, neural networks. NLP technology analyzes one or more content data files (e.g., audio files that include audio data) that include various communication elements such as (a) alphanumeric data composed of individual words, symbols, numbers, (b) vocal qualities or speech patterns (c) stylistic communication approaches (e.g., abbreviations, acronyms, etc.), and/or (d) various other communication elements that provide meaningful communicative features.

According to various embodiments, the system (e.g., the ASR-NLU system) that performs the NLP technology may reside on one or more distributed devices that may be distributed in a cloud system network 258 or other network as part of an enterprise system 200 and may incorporate various logic, circuitry, code, etc. necessary to perform the various functions described herein. In some embodiments, the system may include one or more gateways configured to receive various forms of information and transfer that information as data across the network 258. The gateway may act as a bridge for secure data transfer, according to one embodiment, and may enable communication between the enterprise computer system 200 and one or more user devices 104, 106. The processing device 220 may include the ASR-NLU system and may receive, via a wireless device 242 (e.g., a transceiver) or other device, audio data from the user device 104, 106.

The ASR-NLU system may map speech signals and extract words in order to recognize speech from the audio data. For instance, the ASR-NLU system may match sound parts of the audio data to words or phrases stored in a database that stores grammar and/or vocabulary files, which may include various words, names, abbreviations, etc. In one example, the ASR-NLU system may compare speech patterns to potential word matches and compare the likelihood that a word corresponds to the speech patterns. In some embodiments, filters may be utilized to reduce or minimize extraneous noise. Further, the ASR-NLU system may return multiple possible words with corresponding confidence levels assigned to each word and use predictions to determine the most likely word spoken by the user. The ASR-NLU system may then generate textual data or a transcript of the most likely words spoken by the user. This textual data may then be accessed to display the text via the user interface of the user device 104, 106.

NLP technology may be implemented using the described machine learning models such as unsupervised learning techniques that identify and characterize hidden structures of unstructured and unlabeled content data, or supervised techniques that operate on labeled content data and include instructions informing the system which outputs are related to specific input values. In such instances, software processing can rely on iterative training techniques and training data to configure neural networks with an understanding of individual words, phrases, subjects, sentiments, and parts of speech. As an example, training data is utilized to train a neural network to recognize certain risk conditions like "hazard" or "dangerous".

In general, machine-learning models may include supervised techniques that can operate on labeled content data and include instructions informing the system which outputs are related to specific input values, or unsupervised learning techniques that can identify and characterize hidden structures of unlabeled content data.

In such instances, supervised software processing can rely on iterative training techniques and training data to configure neural networks with an understanding of individual words, phrases, subjects, sentiments, and parts of speech. As an example, training data is utilized to train a neural network to recognize that certain phrases all relate to the same general subject matter when the words are observed in proximity to one another at a significant frequency of occurrence. Supervised learning software systems are trained using content data that is well-labeled or "tagged." During training, the supervised software systems learn the best mapping function between a known data input and expected known output (i.e., labeled or tagged content data). Supervised learning software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability. Supervised learning software systems implement techniques that include, without limitation, Latent Semantic Analysis ("LSA"), Probabilistic Latent Semantic Analysis ("PLSA"), Latent Dirichlet Allocation ("LDA"), and Bidirectional Encoder Representations from Transformers ("BERT").

In contrast, unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-means clustering, Mean-Shift clustering, Density-based clustering, Spectral clustering, Principal Component Analysis, and Neural Topic Modeling ("NTM").

The user device 104, 106 or computing system 206 that performs the NLP techniques may utilize one or more supervised or unsupervised software processing techniques to generate speech. Suitable software processing techniques can include, without limitation, Latent Semantic Analysis, Probabilistic Latent Semantic Analysis, Latent Dirichlet Allocation, Non-Matrix Factorization, Correlated Topic Model ("CTM"), and/or K-Means or other types of clustering.

In general, neural networks are a subfield of machine learning that take inspiration from biological neural networks. A neural network includes interconnected units that process information by responding to external inputs to find connections and derive meaning from undefined data. A neural network can learn, in a sense, to perform tasks by interpreting numerical patterns that take the shape of vectors and by categorizing data based on similarities, without being programmed with any task-specific rules. A neural network generally includes connected units, neurons, or nodes (e.g., connected by synapses) and may allow the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks. Neural networks are trained using training set content data that comprise sample tokens, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a labeling software application can be used by a human 210 to review training set content data to identify and tag or "annotate" various parts of speech, subjects, interrogatories, content sources, and sentiments. The training set content data may then be fed to a content driver software service neural network to identify subjects, content sources, or sentiments and the corresponding probabilities.

Turning now to processing digital image data captured via an image capturing input of the user device 104, 106 by using an image recognition model, a neural network is trained using a database having a large collection of pre-labeled images. After training the neural network, digital image data is processed by the image recognition model, which processes the individual pixels of an image by assigning a matrix of numerical values with each pixel. For instance, the intensity of the different pixels may average to a single value that is numerically represented in a matrix format. The image recognition model may then maps out a relationship or pattern.

In particular, neural networks may perform a supervised learning process where known inputs and known outputs are utilized to categorize, classify, or predict a quality of a future input. However, additional or alternative embodiments of the machine-learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem.

Generally, the machine-learning algorithm may adjust the weight coefficients until any error in the output data generated by the algorithm is less than a predetermined, acceptable level. For instance, the training process may include comparing the generated output, produced by the network in response to the training data, with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine-learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

Various neural networks exist that may be utilized by various AI systems described herein. For instance, an artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is performed.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine-learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
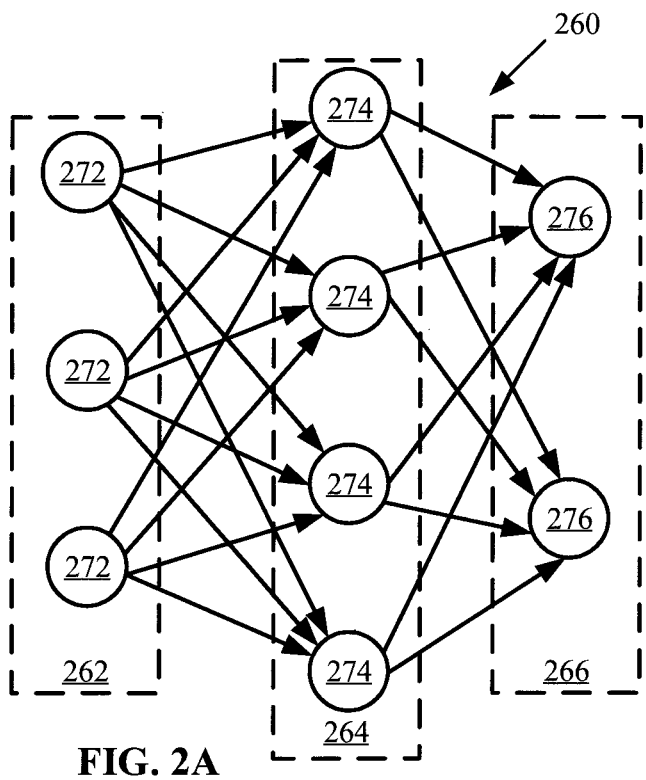
FIG. 2A is a diagram of a feedforward network, according to at least one embodiment, utilized in machine learning.
Figure 2C:
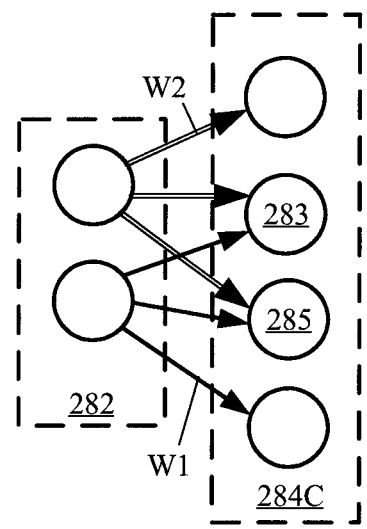
FIG. 2C is a diagram of a portion of the convolution neural network of FIG. 2B, according to at least one embodiment, illustrating assigned weights at connections or neurons.
Figure 2B:
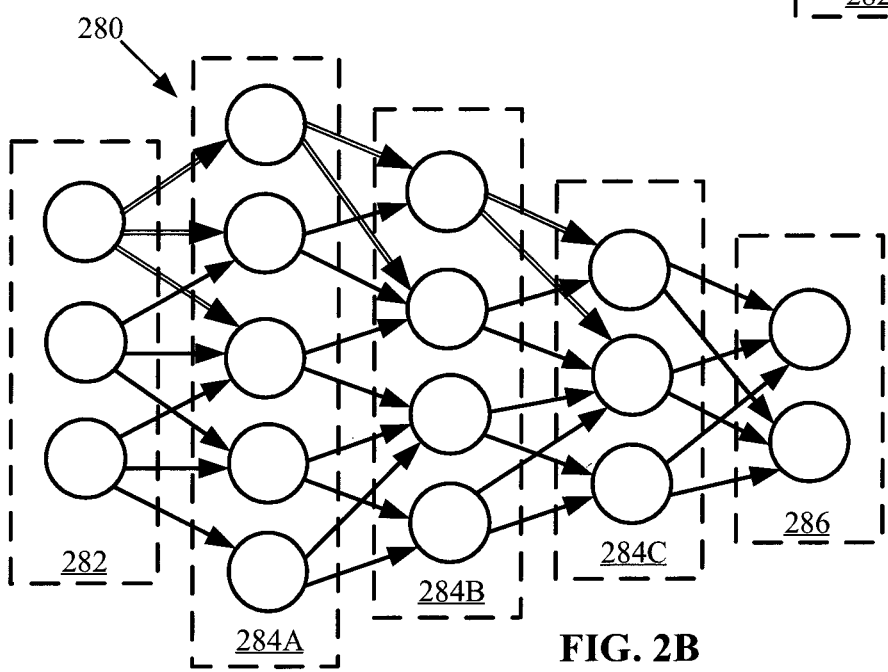
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
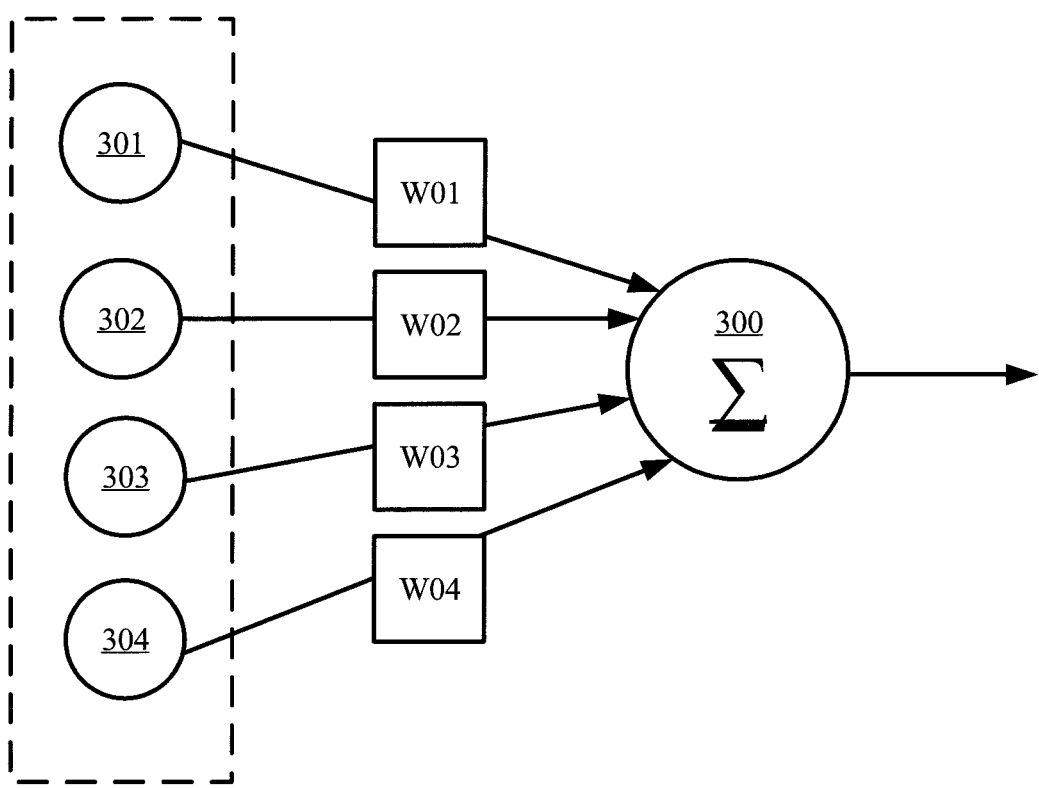
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine-learning program may include a feedback system suitable to provide the connection(s) between subsequent and previous layers of the network.

Figure 4:
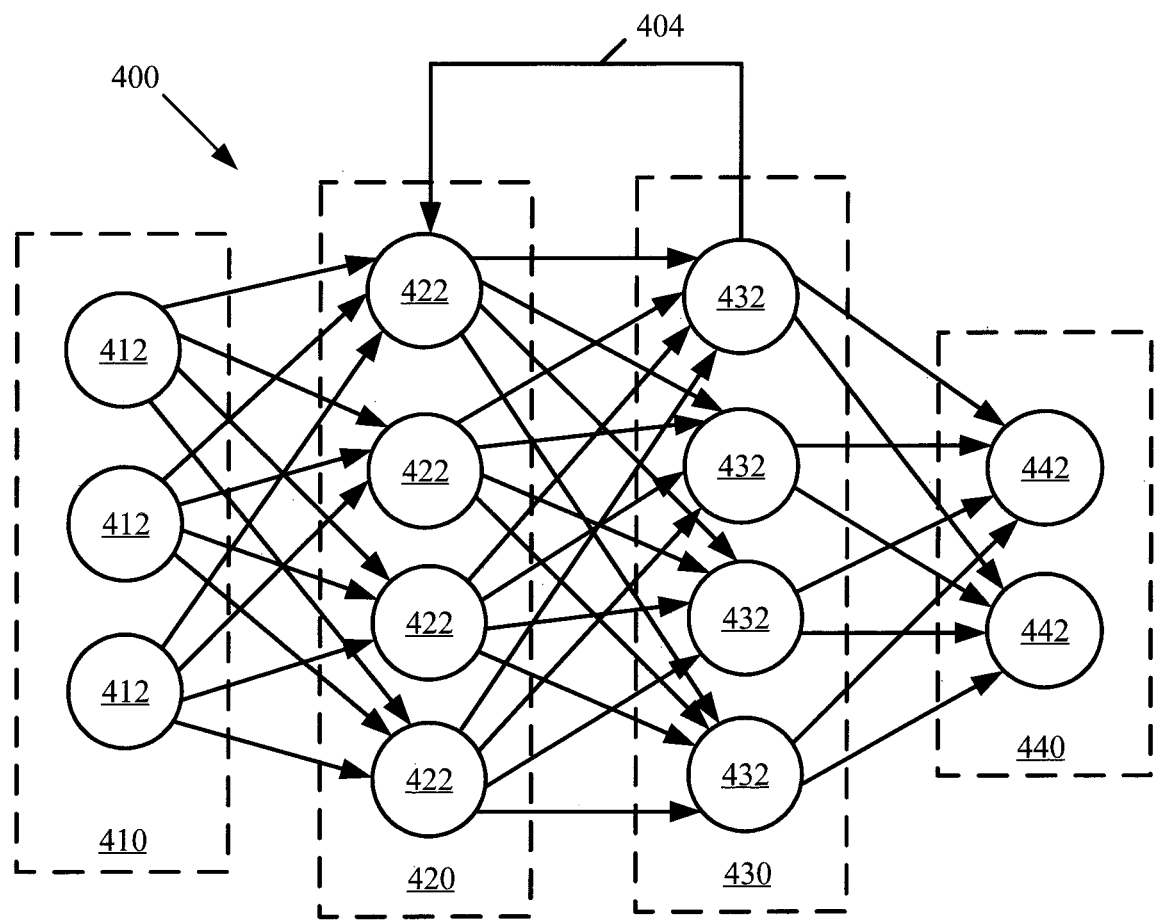
FIG. 4 is a diagram of a Recurrent Neural Network (RNN), according to at least one embodiment, utilized in machine learning.

An example for an RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of non-sequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
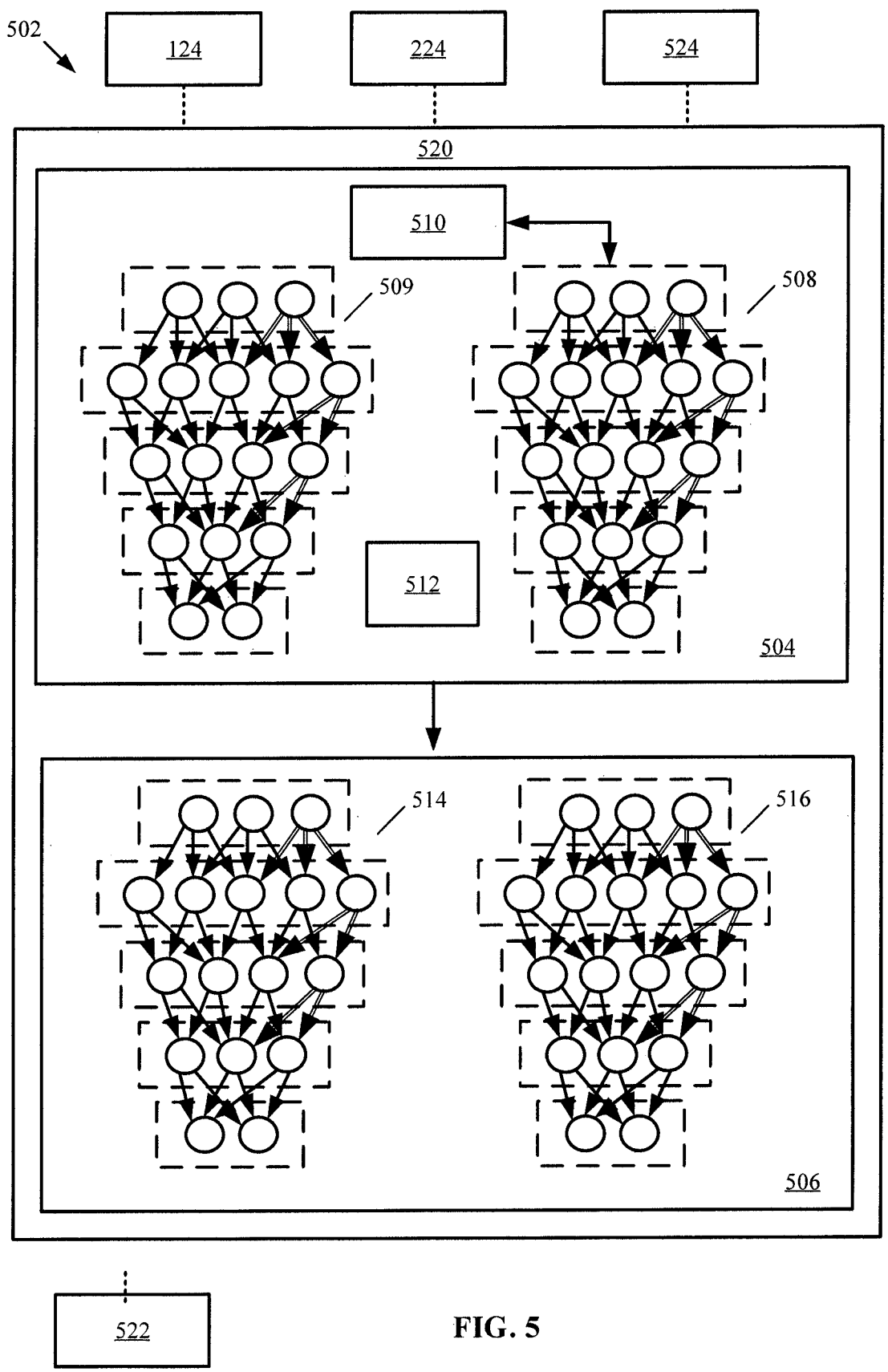
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, RNNs, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance, and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 522 (e.g., hardware). The machine learning framework may include an index of basic operations, subroutines, and the like (primitives) typically implemented by AI and/or machine learning algorithms. Thus, the AI program 502 may be configured to utilize the primitives of the framework 522 to perform some or all of the calculations required by the AI program 502. Primitives suitable for inclusion in the machine learning framework 522 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks.

To implement natural language processing technology, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) Long Short-Term Memory ("LSTM") network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

With respect to clustering software processing techniques that implement unsupervised learning, suitable neural network architectures can include, but are not limited to: (i) Hopefield Networks; (ii) a Boltzmann Machines; (iii) a Sigmoid Belief Net; (iv) Deep Belief Networks; (v) a Helmholtz Machine; (vi) a Kohonen Network where each neuron of an output layer holds a vector with a dimensionality equal to the number of neurons in the input layer, and in turn, the number of neurons in the input layer is equal to the dimensionality of data points given to the network; (vii) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (viii) a Centroid Neural Network that is premised on K-means clustering software processing techniques.

Figure 6:
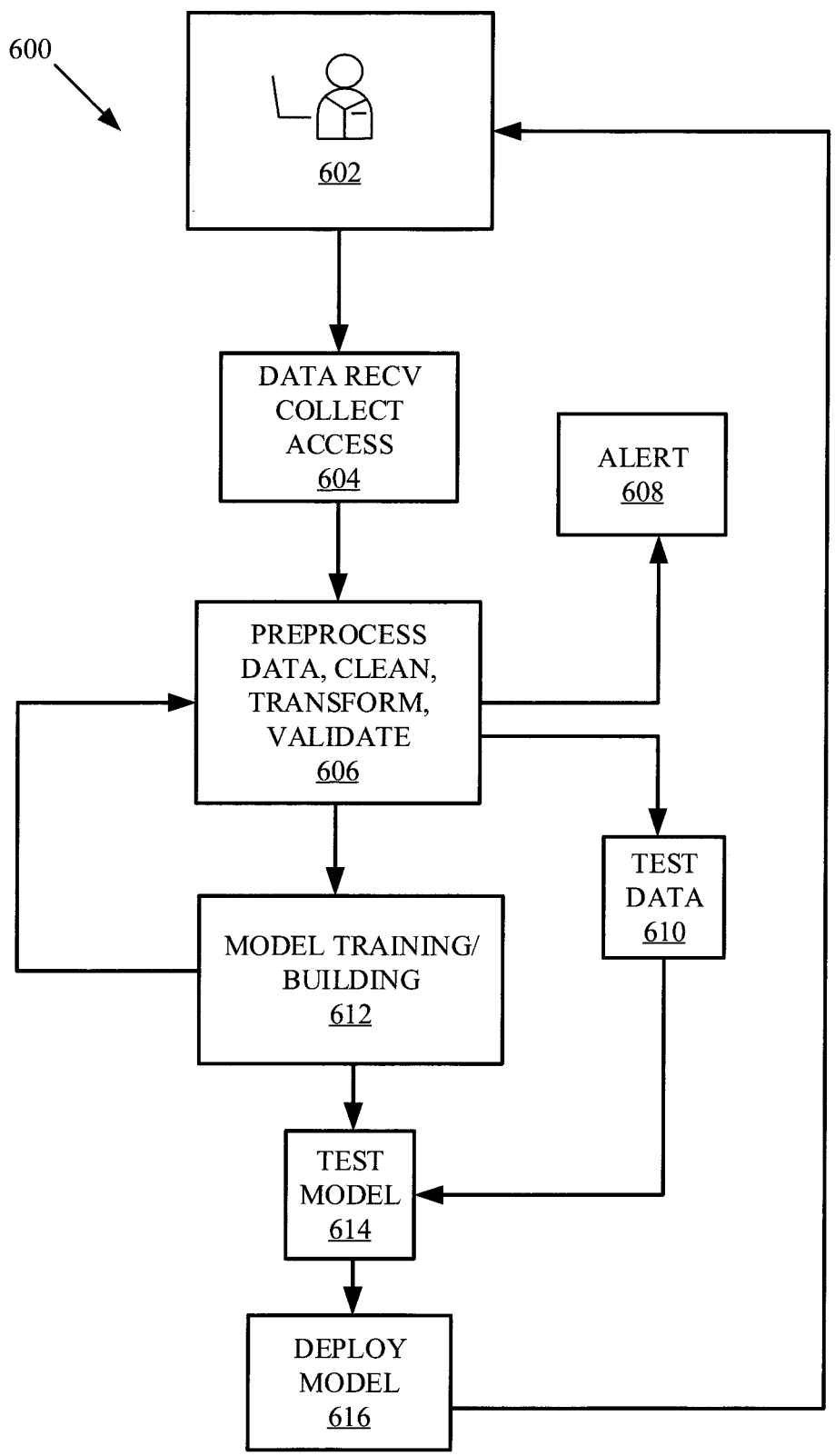
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning workflow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

In general, disclosed herein is a system of risk observations and team engagement that may be deployed in any front-line work team. According to one embodiment, each member of the team would participate as an assessor for a given period of time (e.g., a work shift) and would be required to perform a predetermined number (e.g., two or three) risk observation round(s) during the given period of time. According to one embodiment, each risk observation round may last for approximately thirty to forty-five minutes. During the risk observation round(s), the assessor may perform a number of risk observations, may engage with team members at the work site for discussions related to risk conditions, and may exchange information on work performance progress. At the conclusion of the given period of time (e.g., at the end of the work shift), according to one embodiment, the assessor may provide results of the risk observation round(s) to a manager/supervisor (e.g., during an in-person meeting, via email, based on uploading the results to a database accessible to the manager/supervisor, etc.). In response, according to one embodiment, the manager/supervisor may provide feedback to the assessor (e.g., as part of a report card).

In contrast to "static" risk discover systems (e.g., golden rules, a risk register, etc.), the disclosed system provides enterprises with a dynamic risk discovery system that would allow for discovery of constantly shifting risks. In particular, the system allows for identifying changes in likelihood of a risk, exposure or potential impact of a risk, risk location migration, responses to risks, etc. Additionally, the system disclosed herein allows for appointing an assessor as a leader, which enables the assessor to feel authorized to approach other team members during engagement and may encourage team members to more readily accept the assessor's authority as well. In addition, the system provides for interaction between the assessor and managers/supervisors that encourages open and honest discussion on potential risks, which is designed to foster a more open culture among team members and management.

Latent indicators or resilience metrics may be used to measure the quality of the dynamic risk observation process. In particular, the system may provide better visibility into near miss reporting, the ratio of hideable verses non-hideable near misses, the ratio of upstream versus downstream risk control focus and causation models, the level of risk transparency, the level of risk readiness, as well as the width, depth and variability of the critical risk focus. The system ensures that all assessors use the same risk observation framework to identify and discuss risks based on whether the risks are overlooked, underestimated, balanced, inherent, rewarded, and/or tolerated.

The system may be designed such that a "lead" member of the management team (e.g., a head of a department, senior manager, processing manager, etc.) takes responsibility for deployment and success of the system at a physical location. A "support" member (e.g., human resource manager, safety manager, etc.) may provide support to the lead member to ensure that the system is adequately deployed and that assessors are properly trained. A "master" member (e.g., middle management, lower management, supervisors, example employees, etc.) from within each department provide guidance and on-site training to other assessors. An "assessor" may be the individuals on the front line that is responsible for performing the risk observation.

Figure 7:
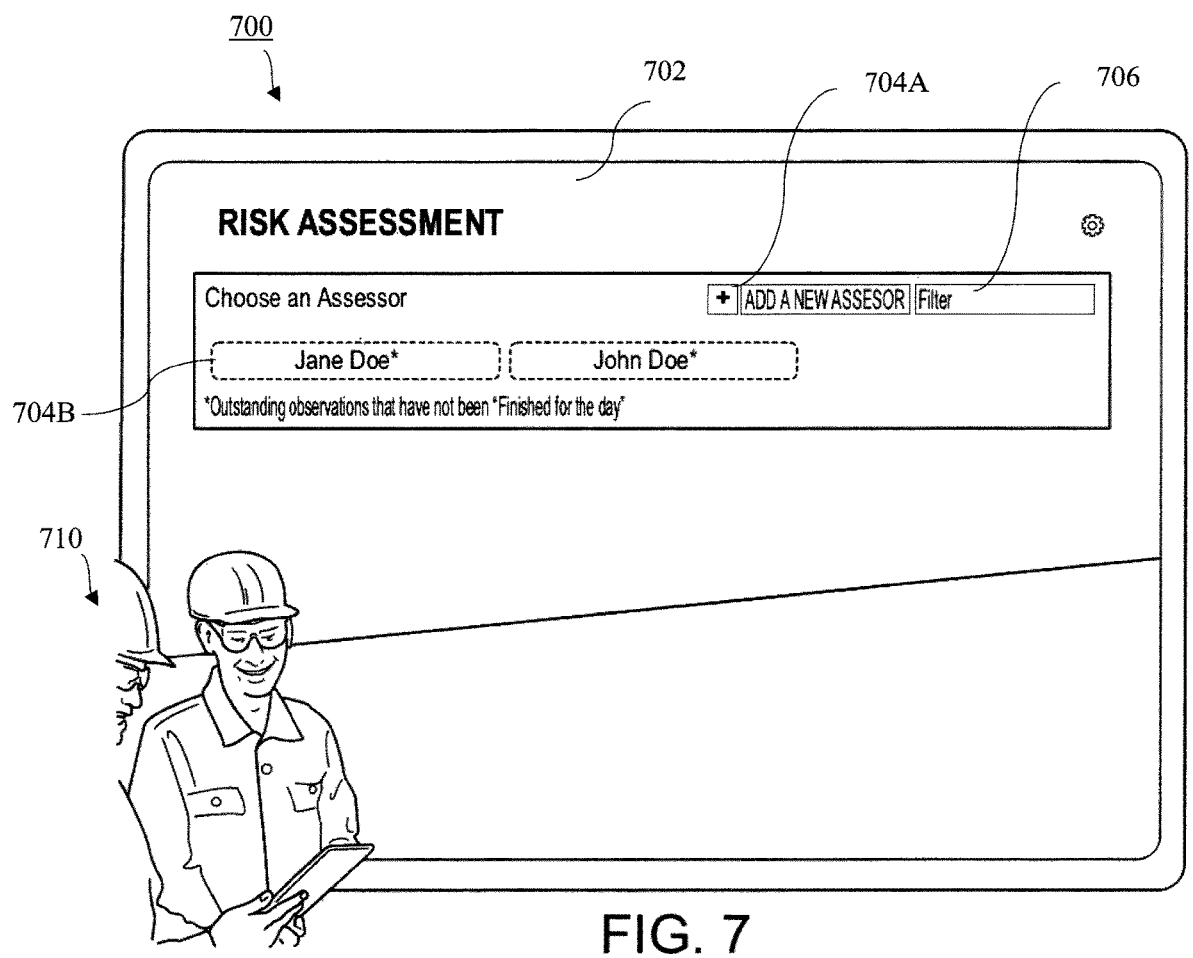
FIG. 7 depicts an example user interface of a user device for providing user input(s) for selecting an assessor to perform a risk assessment, in accordance with an embodiment of the present invention.

FIG. 7 depicts an example user interface 702 of a user device 700 for providing user input(s) for selecting an assessor 710 to perform a risk assessment, in accordance with an embodiment of the present invention. In particular, the user interface 702 may display selectable parameters 704A, 704B that are provided to the assessor 710 via the user interface 702 as part of a digital communication received by the user device 700. Based on the user device 700 displaying the selectable parameters 704A, 704B via the user interface 702, the assessor 710 may provide various user inputs. For instance, if the assessor 710 is scheduled to perform the risk assessment, the name of the assessor 710 may be displayed via the user interface and have a selectable parameter 704B associated therewith. Alternatively, if the name of the assessor 710 is not listed, a different selectable input 704A may be selected to add a new name. Additionally, a filter parameter 706 may also be displayed via the user interface 702 that may allow the assessor 710 to filter a list of assessor names that may have outstanding tasks to perform observations as part of the risk assessment.

Figure 8:
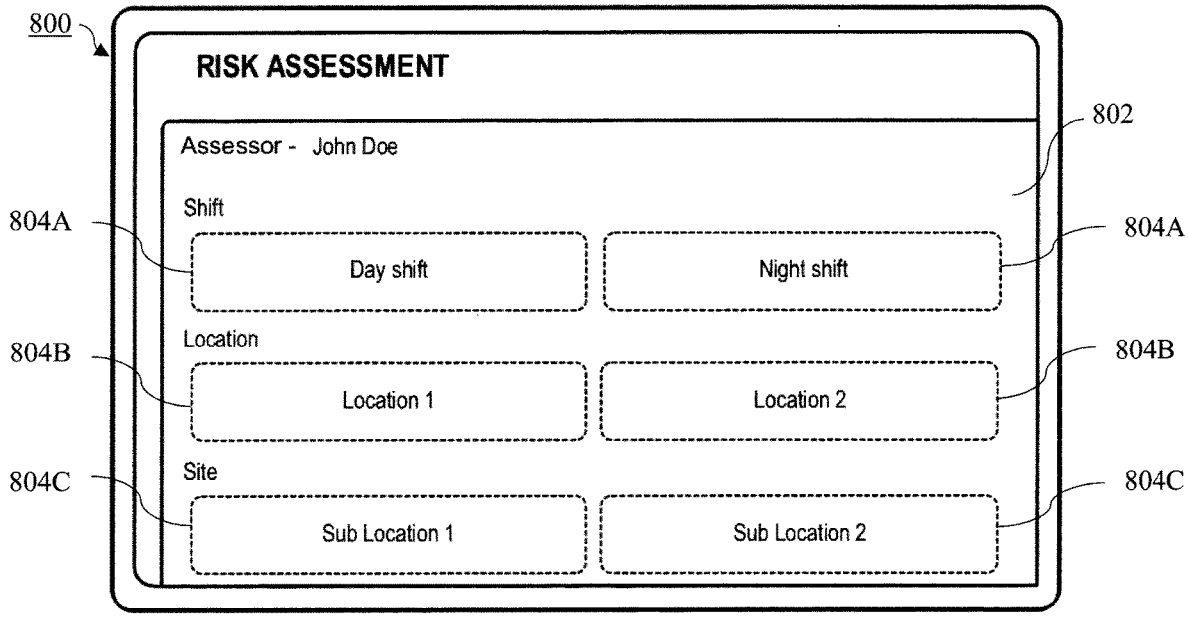
FIG. 8 depicts an example user interface of a user device for providing user input(s) selecting a work shift, location, and/or sub-location, in accordance with an embodiment of the present invention.
Figure 9:
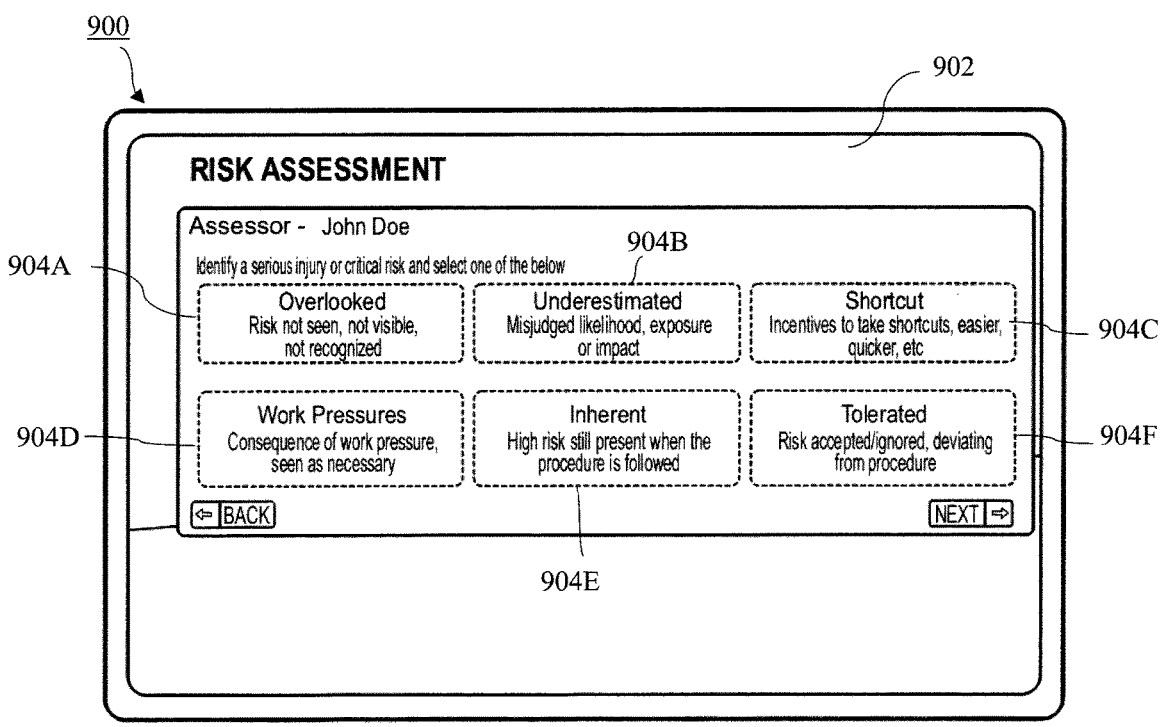
FIG. 9 depicts an example user interface of a user device for providing user input(s) that identify and/or classify a risk condition, in accordance with an embodiment of the present invention.

FIG. 8 depicts an example user interface 802 of a user device 800 for providing user input(s) selecting a work shift, location, and/or sub-location, in accordance with an embodiment of the present invention. In particular, the user interface 802 may display various selectable parameters such as, for example, work shift selectable parameter(s) 804A, location selectable parameter(s) 804B, and/or sub-location selectable parameter(s) 804C. This allows the individual performing the risk assessment to FIG. 9 depicts an example user interface 902 of a user device 900 for providing user input(s) that identify and/or classify a risk condition, in accordance with an embodiment of the present invention. In particular, the user interface 902 may display various selectable parameters that a user can select in order to identify and/or classify the risk condition. The selectable parameters selection of which allows the user to indicate the rationale for why the risk condition exists and can include, for instance, an overlooked parameter 904A where the risk condition was not seen/visible/recognized, an underestimated parameter 904B where the risk condition exists because someone may have misjudged the likelihood of the risk or the exposure/impact of the risk, a shortcut parameter 904C where the risk condition exists because of incentives to take shortcuts or to not take necessary precautions because it is easier/quicker, a work pressures parameter 904D where the risk condition exists as a consequence of work pressure (e.g., deadlines causing workers to be rushed), an inherent parameter 904E where the risk condition inherently exists and is present even when safety precaution procedures are followed, and/or a tolerated parameter 904F where the risk is accepted/ignored in a deviation from procedure. Various other rationales and reasons for why a risk condition exists are also contemplated herein.

Figure 10:
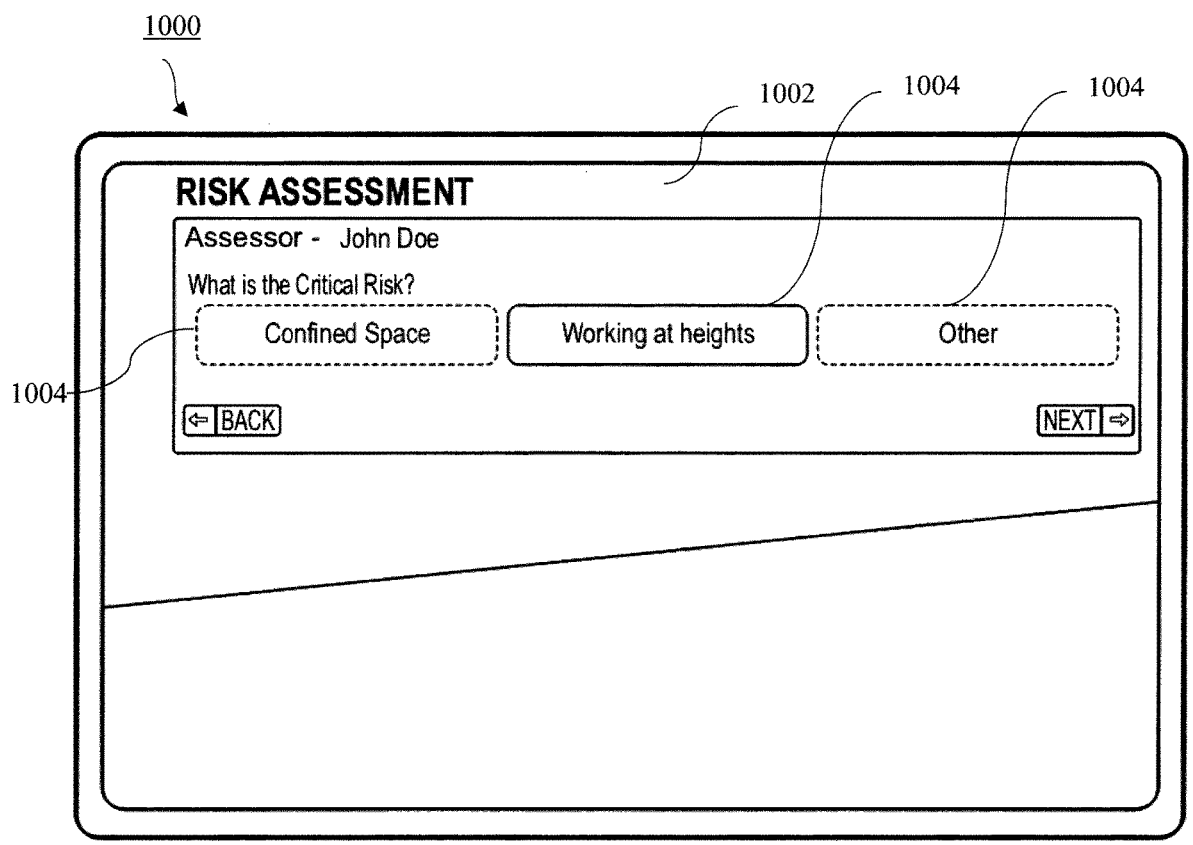
FIG. 10 depicts an example user interface of a user device for providing user input(s) to further classify a risk condition, in accordance with an embodiment of the present invention.

FIG. 10 depicts an example user interface 1002 of a user device 1000 for providing user input(s) to further classify a risk condition, in accordance with an embodiment of the present invention. In particular, the user interface 1002 may display various selectable parameters 1004 that a user can select in order to indicate what the risk condition or critical risk is or to classify the risk condition or critical risk. For example, the user may indicate that the critical risk is an inherent risk due to working at heights or working within a confined space, or the user may provide some other input indicating what the critical risk is or what the risk condition involves.

Figure 11:
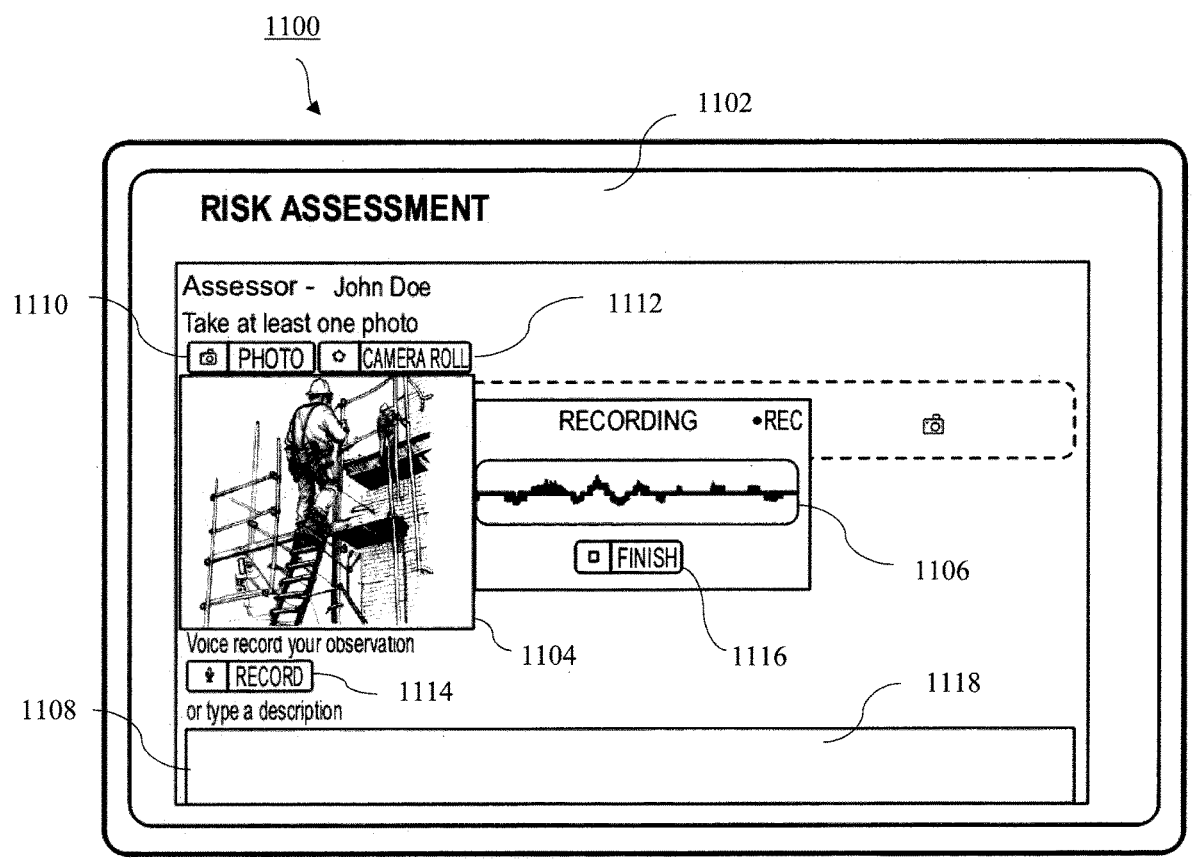
FIG. 11 depicts an example user interface of a user device for providing user input(s) that include an image input, audio input, and/or written description, in accordance with an embodiment of the present invention.

FIG. 11 depicts an example user interface 1102 of a user device 1100 for providing user input(s) that include an image input 1104, audio input 1106, and/or written description 1108, in accordance with an embodiment of the present invention. As part of the risk assessment, once response data has been provided indicating that a risk condition exists, data processing is performed thereon and based on the risk condition existing, which would require providing one or more additional data collection sequences, the system provides a condition-specific data collection sequence via the user interface 1102. In particular, the condition-specific data collection sequence facilitates obtaining condition-specific data related to a condition (e.g., a risk condition) at a physical location. The condition-specific data includes audio data that may be collected via, for example, a speech signal processing system that performs audio transduction (e.g. via a microphone) and generates audio data from an audio input 1106 (e.g., a speech signal). For instance, a microphone may perform audio transduction of a speech signal to produce an analog signal, which an analog-to-digital converter (ADC) then converts into a digital signal that can be processed by the digital signal processor (DSP) of the user device 1100 to convert to audio data. Additionally, the user device 1100 may transmit, via a network, the audio data to an enterprise system for performing natural language processing thereon.

In one example, the speech signal may be provided based on the user selecting a selectable record parameter 1114, selection of which allows the user to provide the audio input 1106. In some embodiments, the user interface may display a waveform of the speech signal of the audio input 1106 and may provide a visual indication that the user device 1100 is recording sounds received by the microphone. According to various embodiments, the audio input 1106 may include an audible description of the risk condition at the physical location. Once the user provides the audible description, the user may then indicate that the audio recording is complete by selecting a finish parameter 1116.

According to some embodiments, the condition-specific data may also include digital image data that includes one or more digital images collected via an image capturing input (e.g., a camera) of the user device 1100. In particular, the image input 1104 may include one or more digital images that capture a condition (e.g., a risk condition or critical risk) at a physical location. According to various embodiments, the image capturing input of the user device 1100 may include an image sensor that receives photons and converts the received photons into an electrical signal, which then is converted into a digital signal that the user device then converts to digital image data. Additionally, the user device 1100 may transmit, via a network, the digital image data to an enterprise system for performing image recognition processing thereon via an image recognition model.

According to one embodiment, the user interface 1102 may display a selectable photo parameter 1110 for providing the image input 1104 and/or a selectable camera roll parameter 1112 for providing the image input 1104, where selection of the photo parameter 1110 allows the user to provide an image input 1104 that includes a still image of a condition at a physical location and selection of the camera roll parameter 1112 allows the user to provide an image input 1104 that includes a video of a condition at a physical location. For instance, the image input 1104 may depict a risk condition at a worksite that has various hazards or risks.

According to various embodiments, the user interface 1102 may display a textual input box 1118 through which a user may provide a written description 1108 of a condition at a physical location. For instance, a user may select the textual input box 1118 and then provide a textual input, based on typing alphanumeric characters via a touch-screen keyboard or other keyboard device.

Figure 12:
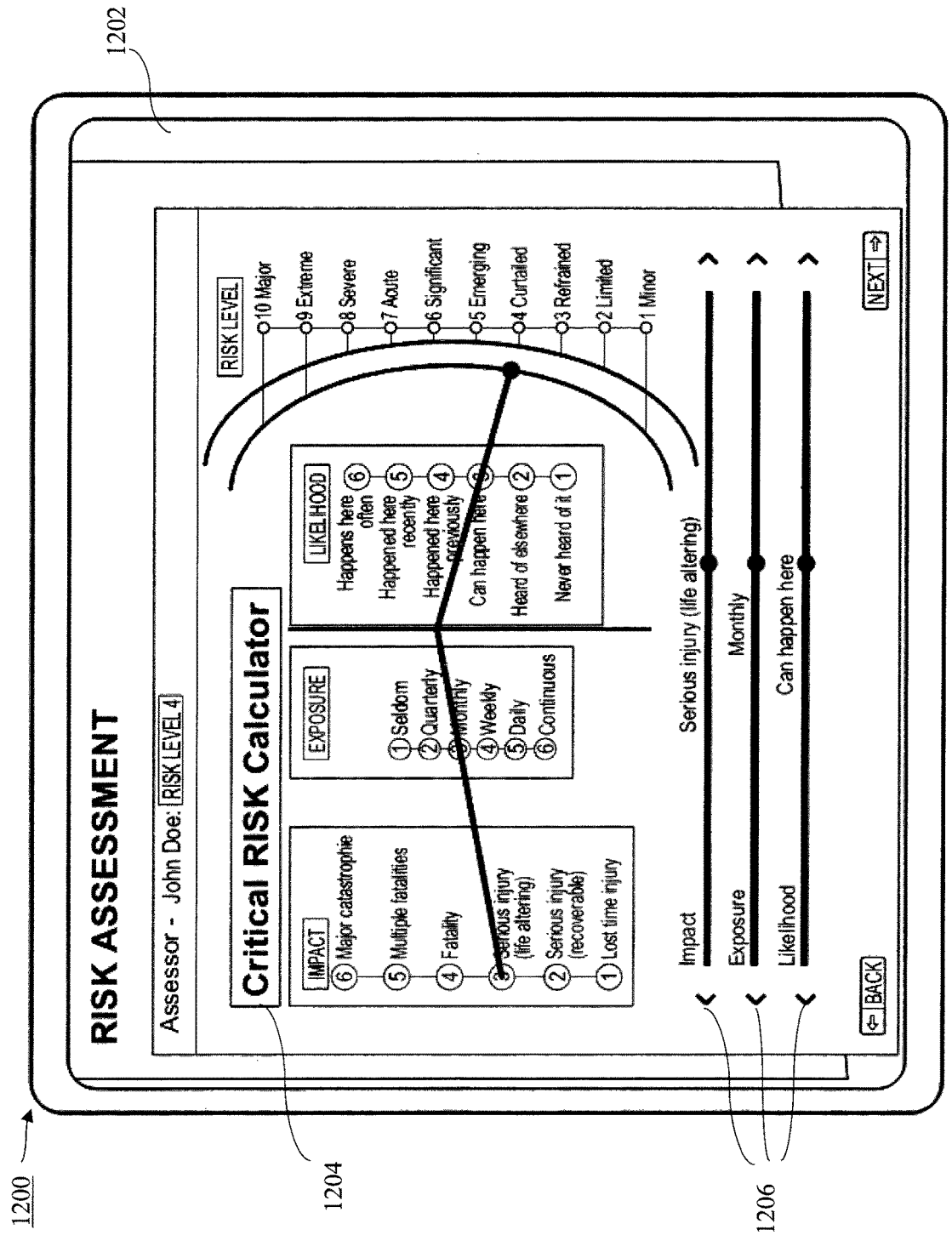
FIG. 12 depicts an example user interface of a user device that provides analysis of a risk condition, in accordance with an embodiment of the present invention.
Figure 13:
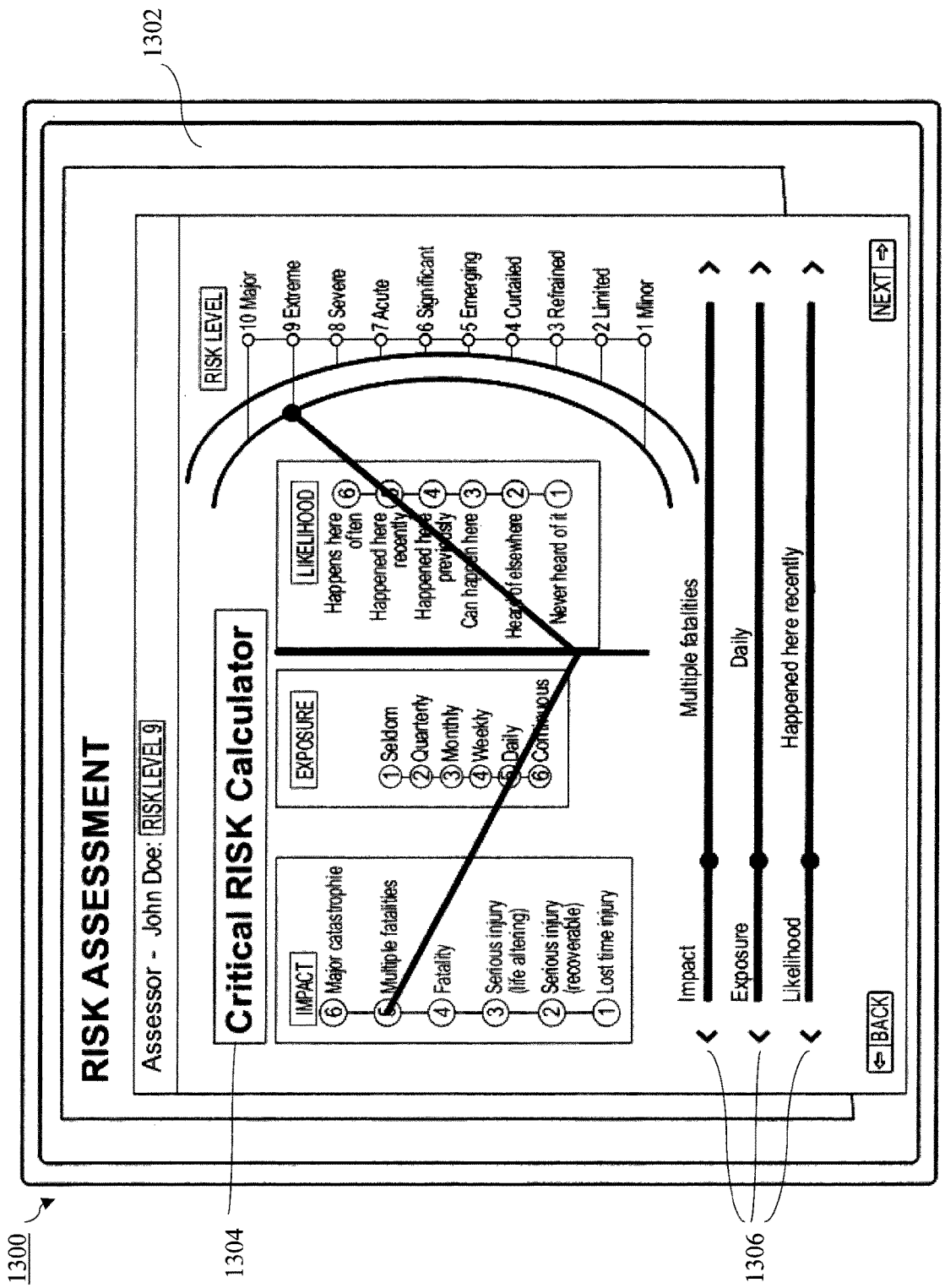
FIG. 13 depicts an example user interface of a user device that provides analysis of a risk condition, in accordance with an embodiment of the present invention.

FIGS. 12-13 depicts an example user interfaces 1202 and 1302, respectively, of user devices 1200 and 1300, respectively, that provide analysis of risk conditions, in accordance with an embodiment of the present invention. For instance, FIG. 12 depicts a critical risk calculator 1204 that calculates a risk level of a risk condition based on the user selecting or otherwise defining specific aspect of the risk condition. In various embodiments, the user may define the impact, the exposure, and the likelihood of the risk condition. In this particular example, the user provided multiple inputs via different parameter selections 1206 where the user indicated that the potential impact of the risk condition could be a "serious injury", that this risk condition occurs "monthly" (e.g., as part of monthly maintenance), and the likelihood of the serious injury is that it "can happen here". Based on these user inputs, the computing system may apply an algorithm that applies weights or performs various calculations to derive a risk level, which in this case the computing system calculates would be assigned to a risk level of "4". Referring now to FIG. 13, a critical risk calculator 1304 is depicted and the user provided multiple inputs via different parameter selections 1306 where the user indicated that the potential impact of the risk condition could be "multiple fatalities", that this risk condition occurs "daily" (e.g., as part of daily production), and the likelihood of the serious injury is that it "happened here recently". Based on these user inputs, the computing system may apply an algorithm that applies weights or performs various calculations to derive a risk level, which in this case the computing system calculates would rise to a risk level of "9".

According to various embodiments, the critical risk calculators 1204, 1304 may utilize heat maps, color-coding, or other visualization techniques to visually indicate the severity of the risk level. For instance, in some embodiments the heat maps or color coding may utilize the color green to indicate if the risk level is minor (e.g., a risk level of 1) and would not require immediate corrective action, whereas the heat maps or color coding may utilize the color red to indicate if the risk level is major (e.g., a risk level of 10) and requires immediate corrective action. Any intermediate risk level (e.g., limited, retained, curtailed, emerging, significant, acute, severe, extreme, etc.) may be represented with various shades ranging from light green to yellow, to orange, to light red. Various other visualization techniques may also be used to represent the severity of the risk level according to multiple embodiments.

FIG. 14 depicts an example user interface 1402 of a user device 1400 for providing user input(s) to evaluate a risk condition, in accordance with an embodiment of the present invention. In particular, if a risk condition for "working at heights" is identified, the user may select various selectable parameters 1404 indicating whether certain conditions "pass" or "fail". Non-limiting example classifications and criteria upon which the evaluation is provided may include, for example, whether the worker that is working at an elevated height is using lanyard to prevent falling objects, whether the worker is using an approved anchor point, whether the worker is wearing an approved and inspected harness, and/or whether there is an approved permit to work on the task. The risk assessor may then select selectable parameters 1404 associated with each inquiry to indicate whether the worker passes or fails.

Similarly, FIG. 15 depicts an example user interface 1502 of a user device 1500 for providing user input(s) to evaluate a risk condition. In particular, if the risk condition is "lifting and rigging", the user may select various selectable parameters 1504 indicating whether certain conditions "pass" or "fail". Non-limiting example classifications and criteria upon which the evaluation is provided may include, for example, whether a "stop, look, analyze, and manage" (SLAM) assessment is completed and available to inspect, whether all lifting components used are inspected and certified, whether the drop zone is completely barricaded and properly posted, and/or whether the required competent person or supervisor is overseeing the lift at all times. The risk assessor may then select selectable parameters 1504 associated with each inquiry to indicate whether the worker passes or fails.

FIG. 16 depicts an example user interface 1602 of a user device 1600 for providing user input(s) to evaluate company management, in accordance with an embodiment of the present invention. For instance, the risk assessment may prompt the assessor to ask the person they are observing if they would agree or disagree with various statements related to company management. Non-limiting example questions may include questions to ask the person being observed about whether managers always put safety first, whether the company really cares about employees, whether they are treated fairly when they break a safety rule, and whether they are unhappy with management's decisions on safety. The assessor may then select the appropriate selectable parameters 1604 associated with the person's response.

FIG. 17 depicts an example user interface 1702 of a user device 1700 for providing user input(s) to evaluate company management, in accordance with an embodiment of the present invention. In particular, the risk assessment may prompt the user to provide feedback directed to whether, in their opinion, a manager or supervisor accepted other views, listened carefully, worked well together, simplified a task, sparked fresh thinking and/or took bold actions. For each quality/classification assessment, the assessor may indicate by selecting parameters 1704 whether they agree or do not agree that this quality/classification applies to the manager or supervisor.

FIG. 18 depicts an example user interface 1802 of a user device 1800 for providing user input(s) to survey individuals at a work site, in accordance with an embodiment of the present invention. In particular, the risk assessment may prompt the user to provide feedback directed to whether a person being observed by the assessor agrees or disagrees with various statements. For instance, the risk assessment may include statements indicating "even under pressure people still work cautiously", "if you raise a safety concern, you often hear nothing of it again", "in this company safety comes first", and/or "people are reluctant to report all accidents and injuries". Each of these statements may have associated selectable parameters 1804 where the assessor may indicate whether the person they are observing agrees or does not agree with each respective statement.

FIG. 19 depicts an example user interface 1902 of a user device 1900 for providing user input(s) that include an audio input, and/or written description, in accordance with an embodiment of the present invention. In particular, the risk assessment may prompt the assessor to indicate the good practices that the assessor saw. In response, the assessor may provide response data by selecting a "record" parameter 1904A to initiate an audio recording and, as a result of performing natural language processing, generate a textual input that can be visually represented (e.g., using alphanumeric text) in a response box 1906A responding to the prompt. Similarly, the risk assessment may prompt the assessor to indicate the actions that the assessor took to reduce or remove risks. In order to respond to the prompt, the user may select a different "record" parameter 1904B associated with response box 1906B to initiate an audio recording, perform natural language processing thereon, and generate a textual input that can be visually represented (e.g., using alphanumeric text) in response box 1906B.

FIG. 20 depicts an example user interface 2002 of a user device 2000 for providing user input(s) that include observations of company management, in accordance with an embodiment of the present invention. In particular, the risk assessment may prompt the assessor to indicate whether they saw or heard any manager or supervisor who made (a) made a good decision to get a job done, (b) offered or asked for a good idea on safety, (c) helped to make a job simpler and safer, (d) created good team work on a task, (d) listened carefully to the views of others, and/or (e) accepted the ideas or suggestions of others. The assessor may select selectable parameters 2004 associated with each question that indicate "yes" or "no" in order to respond to each question.

Figure 21:
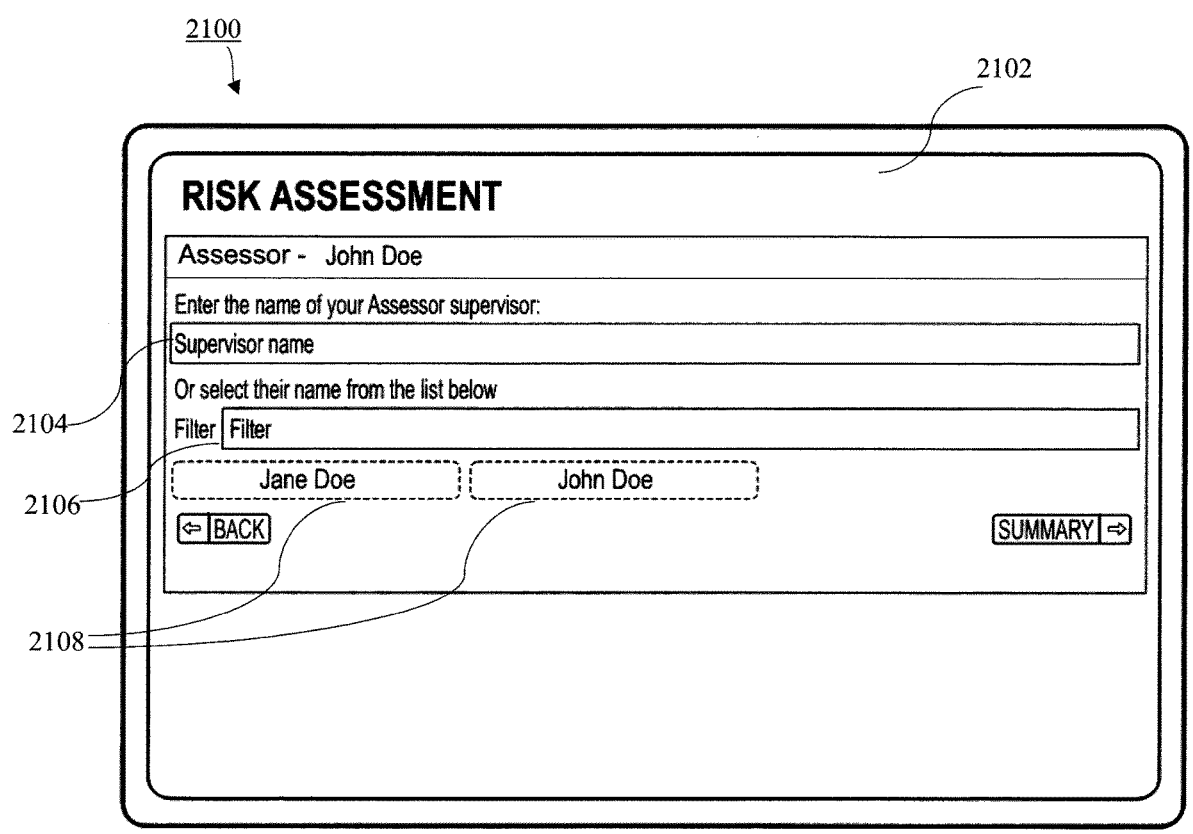
FIG. 21 depicts an example user interface of a user device for providing user input(s) selecting supervisor information of the person conducting the risk assessment, in accordance with an embodiment of the present invention.

FIG. 21 depicts an example user interface 2102 of a user device 2100 for providing user input(s) selecting supervisor information of the person conducting the risk assessment, in accordance with an embodiment of the present invention. In particular, the assessor may enter the name of their supervisor by typing the name into a fillable input box 2104 or by selecting the name from selectable name inputs 2108. In order to reduce the number of selectable name inputs 2108, the user may select a filter parameter 2106. Once the assessor provides the name of their supervisor, the risk assessment responses may be transmitted to a manager/supervisor device to review the assessor's responses.

Figure 22:
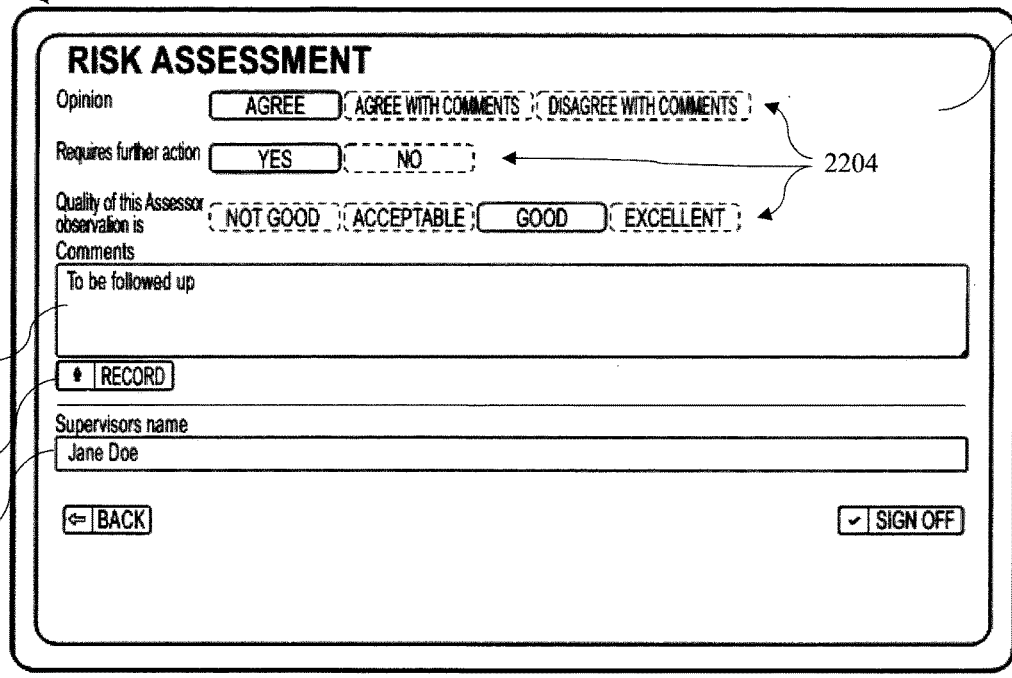
FIG. 22 depicts an example user interface of a user device for providing user input(s) related to a risk condition, in accordance with an embodiment of the present invention.

FIG. 22 depicts an example user interface 2202 of a user device 2200 for providing user input(s) related to a risk condition, in accordance with an embodiment of the present invention. In particular, once an assessor provides responses as part of the risk assessment, the risk assessment may be transmitted to the user device 2200 and accessed by an individual in management to review. In other embodiments, the assessor may utilize the user device 2200 to perform the risk assessment and may physically hand the user device 2200 to an individual in management to sign off on the risk assessment. The next step in the risk assessment may include various selectable inputs 2204 where an individual in management (e.g., manager/supervisor) can review and sign off on the risk assessment as provided by the assessor. For instance, the manager/supervisor may indicate based on selecting one of the selectable inputs 2204 whether they agree with the risk assessment, agree with the comments, or disagree with the comments. Further, the manager/supervisor may indicate, via the selectable inputs 2204, whether there is a risk condition that requires further action and whether the quality of the assessor observation is excellent, good, acceptable, or not good. The risk assessment may also allow the manager to provide an audio input, based on selecting a "record" parameter 2208 associated with response box 2206 to initiate an audio recording, perform natural language processing thereon, and generate a textual input that can be visually represented (e.g., using alphanumeric text) in response box 2206. Further, the manager/supervisor may input their name to sign off on the risk assessment.

Figure 23:
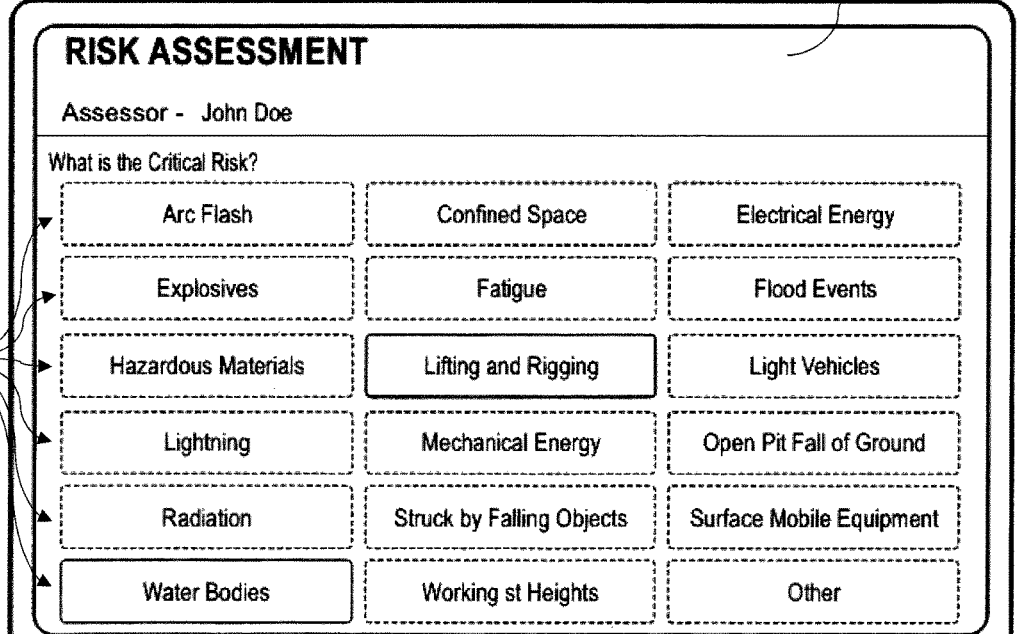
FIG. 23 depicts an example user interface of a user device for providing user input(s) related to a risk condition, in accordance with an embodiment of the present invention.

FIG. 23 depicts an example user interface 2302 of a user device 2300 for providing user input(s) related to a risk condition, in accordance with an embodiment of the present invention. In particular, various selectable parameters 2304 may be selected to identify and/or classify the critical risk. Example selectable parameters 2304 may include, for example, inputs indicating an arc flash, explosives, hazardous materials, lightning, radiation, water bodies, confined space, fatigue, lifting and rigging, mechanical energy, struck by falling objects, working at heights, electrical energy, flood events, light vehicles, open pit fall of ground, surface mobile equipment, and/or other.

FIG. 24 depicts an example user interface 2402 of a user device 2400 for providing user input(s) to search stored risk condition data, in accordance with an embodiment of the present invention. In particular, the user interface 2402 may display a dashboard of the company where an individual may review, based on selecting various drop down menus or other selectable inputs, stored risk assessment information. Various filters may be selected to indicate, for example, a date range, an observation identification number, a location, a sub-location, a shift, the critical risk, the impact, the supervisor feedback, the quality of the observation, whether the supervisor signed off and the name of the supervisor that signed off on the risk assessment. This dashboard may also allow the user to search risks where certain additional actions were needed, whether there were any noteworthy comments, prizes associated therewith, and/or the date the risk condition was closed.

FIG. 25 depicts an example user interface 2502 of a user device 2500 for providing user input(s) to search stored risk condition data based on risk type, in accordance with an embodiment of the present invention. In particular, the user may select a drop down menu 2504 displayed via the user interface 2502 in order to view various risk conditions that can be selected for review by the user. Similarly, FIG. 26 depicts an example user interface 2602 of a user device 2600 for providing user input(s) to search stored risk condition data based on risk impact, in accordance with an embodiment of the present invention. In particular, the user may select a drop down menu 2604 displayed via the user interface 2602 in order to view various impacts resulting from risk conditions that can be selected for review by the user. In another example, FIG. 27 depicts an example user interface 2702 of a user device 2700 for providing user input(s) to search stored risk condition data based on risk classification, in accordance with an embodiment of the present invention. In particular, the user may select a drop down menu 2704 displayed via the user interface 2702 to filter risk assessment results classified based on why the risk condition exists such as, for example, due to being overlooked, underestimated, a shortcut being taken, work pressure, an inherent risk, or due to the risk being tolerated.

Figure 28:
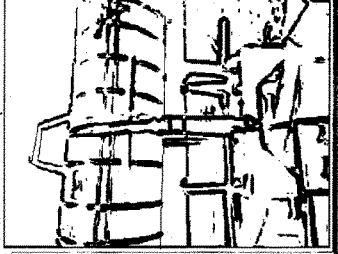
FIG. 28 depicts an example user interface of a user device for displaying a summary of selectable risk conditions for further review, in accordance with an embodiment of the present invention.

FIG. 28 depicts an example user interface 2802 of a user device 2800 for displaying a summary 2804 of selectable risk conditions for further review, in accordance with an embodiment of the present invention. The summary 2804 may populate as a result of the user selecting various filters. For instance, if the user were to select, via a drop down menu, that they wanted to view risk conditions the occurred during "shift A" between the dates of Oct. 13, 2022 through Oct. 15, 2022 then the summary 2804 may provide one or more selectable risk conditions that occurred during "shift A" between the provided date range.

Figure 29:
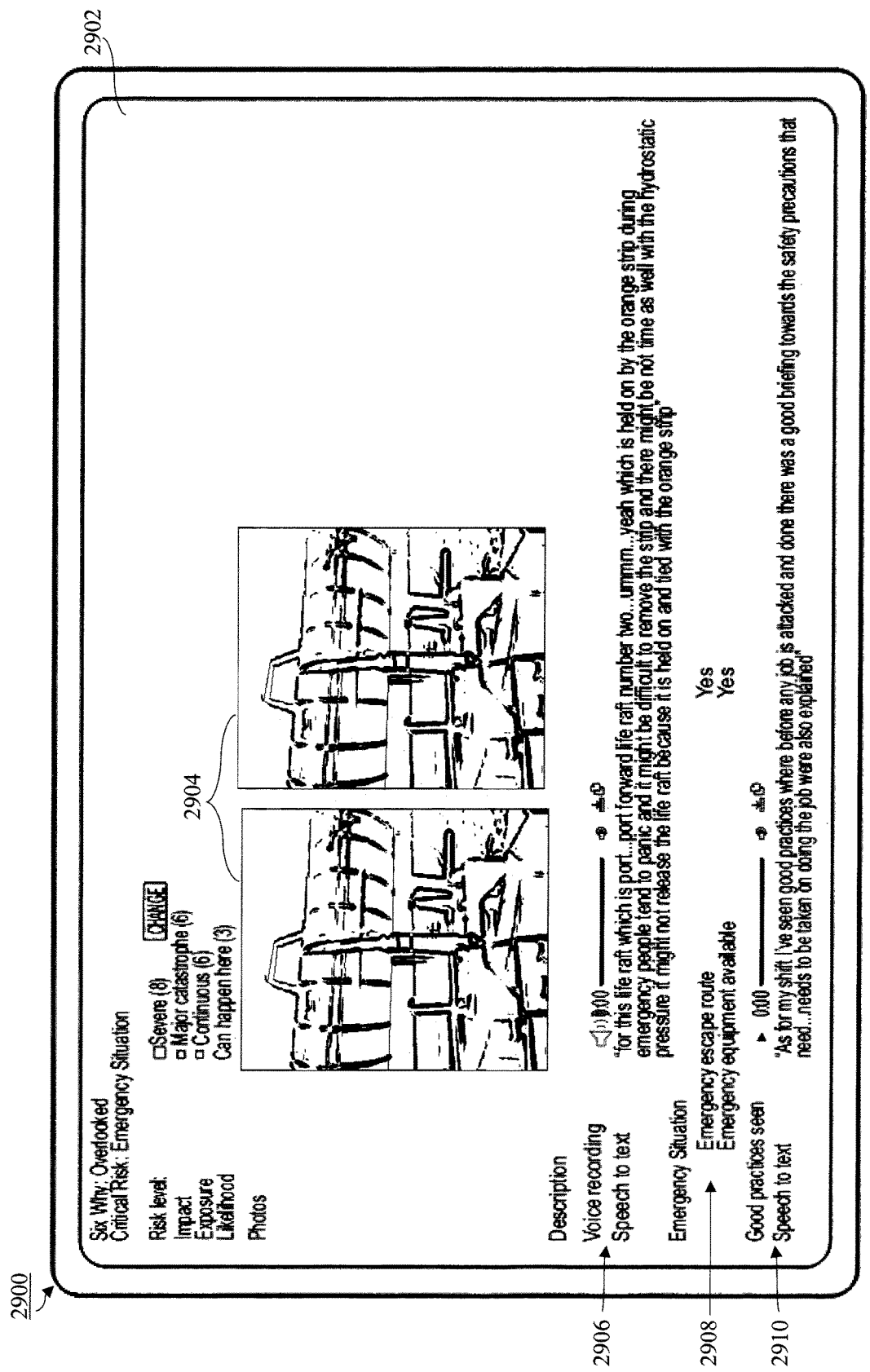
FIG. 29 depicts an example user interface of a user device for displaying a condition-specific summary of stored condition-specific data, in accordance with an embodiment of the present invention.

FIG. 29 depicts an example user interface 2902 of a user device 2900 for displaying a condition-specific summary of stored condition-specific data, in accordance with an embodiment of the present invention. In particular, once the user selects a selectable risk condition for further evaluation, stored condition-specific data may be displayed, via user interface 2902, to provide the user with information about the selected risk condition. The condition-specific data may include, for example, one or more digital images 2904 of the risk condition, a voice recording 2906 and associated text describing the risk condition, classification information 2908 classifying the risk condition, and/or an indication (e.g., voice recording and accompanying text) of good practices seen by the assessor.

Figure 30:
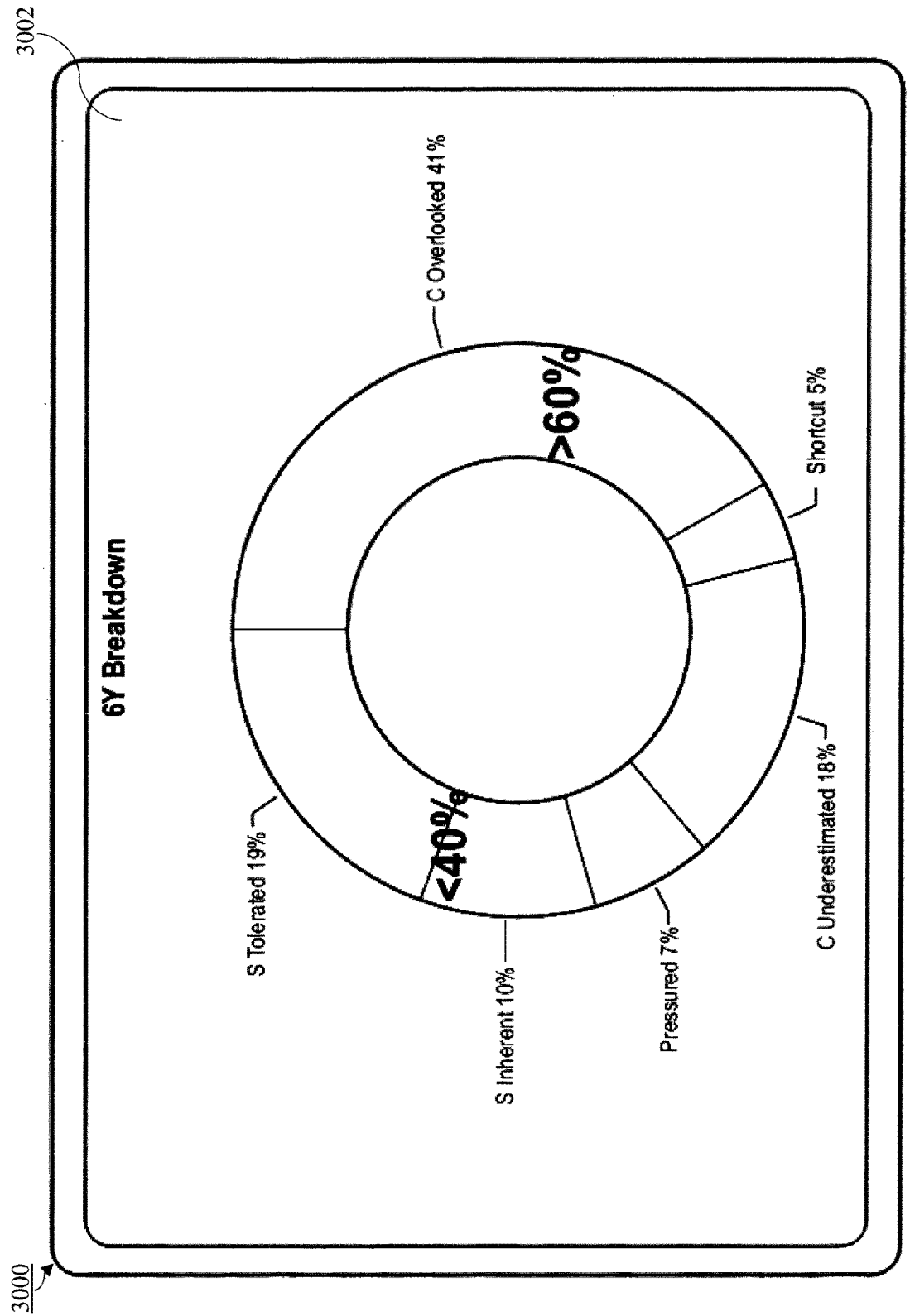
FIG. 30 depicts an example display screen to be displayed via a user interface of a user device for presenting analysis of risk categorization, in accordance with an embodiment of the present invention.

FIG. 30 depicts an example display screen to be displayed via a user interface 3002 of a user device 3000 for presenting analysis of risk categorization, in accordance with an embodiment of the present invention. For instance, once a user indicates that they want to view a six-year breakdown of reasons why risk conditions exist, the user interface 3002 may display a percentile representation indicating which reasons are more commonly indicated over the past six years.

Figure 31:
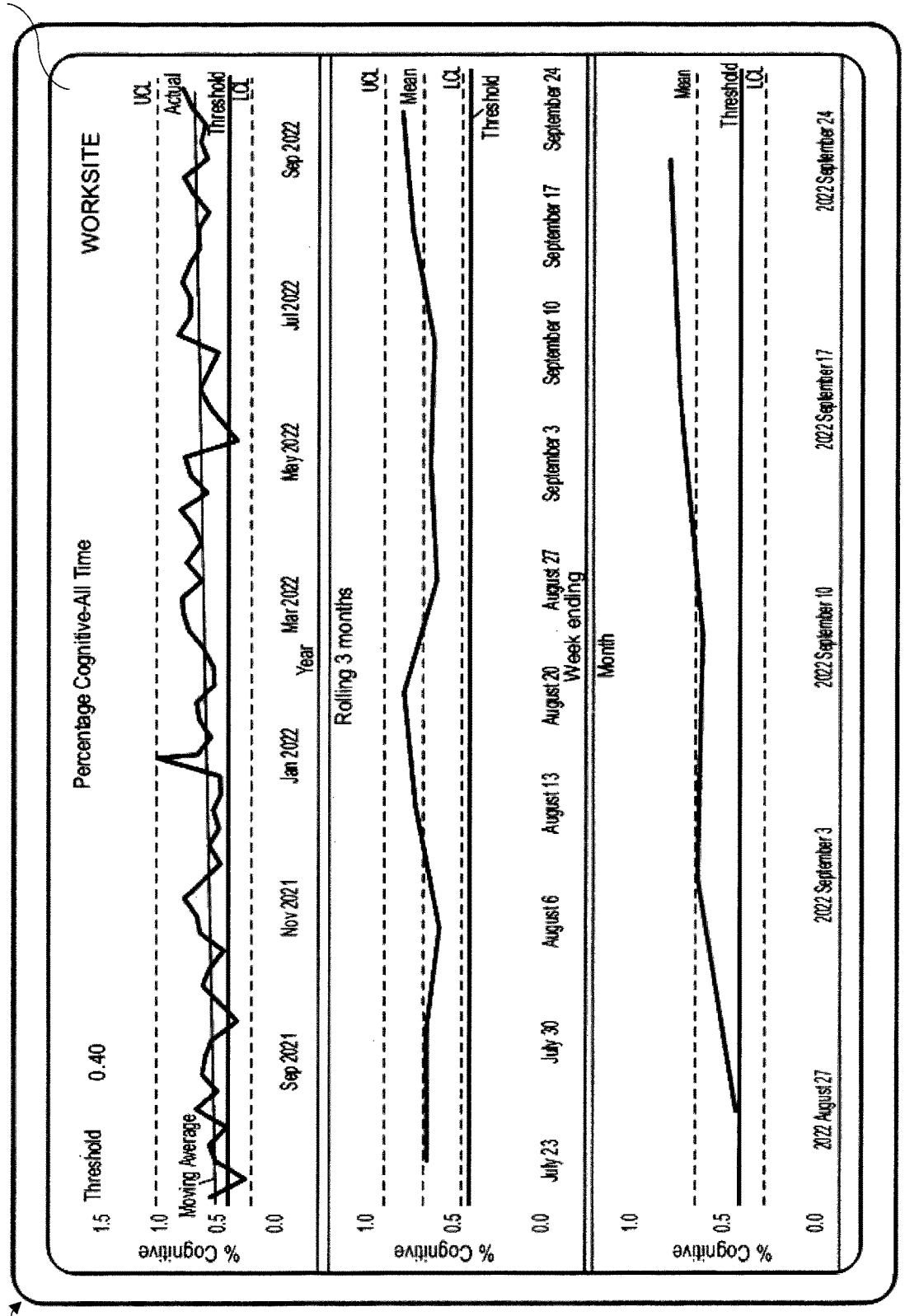
FIG. 31 depicts an example display screen to be displayed via a user interface of a user device for presenting graphical analysis of risk condition(s), in accordance with an embodiment of the present invention.
Figure 32A:
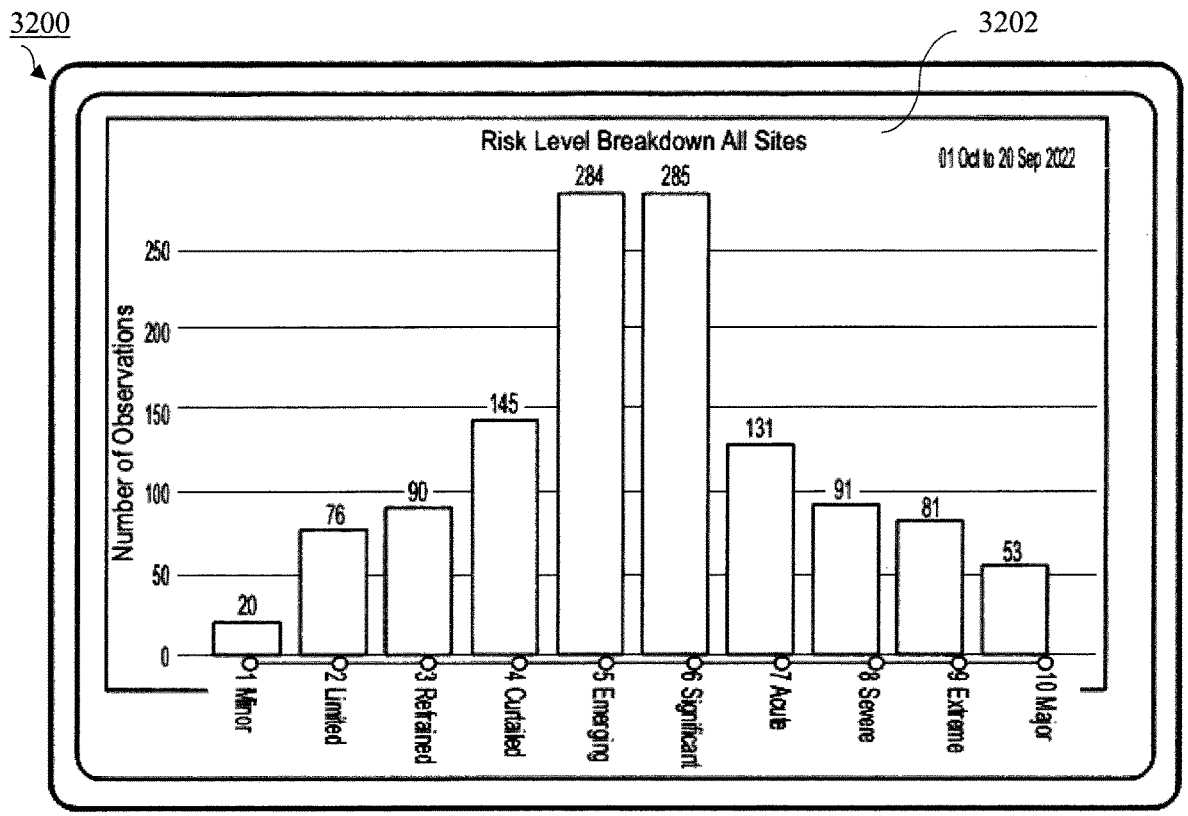
FIG. 32A depicts an example display screen to be displayed via a user interface of a user device for presenting graphical analysis of risk levels, in accordance with an embodiment of the present invention.
Figure 32B:
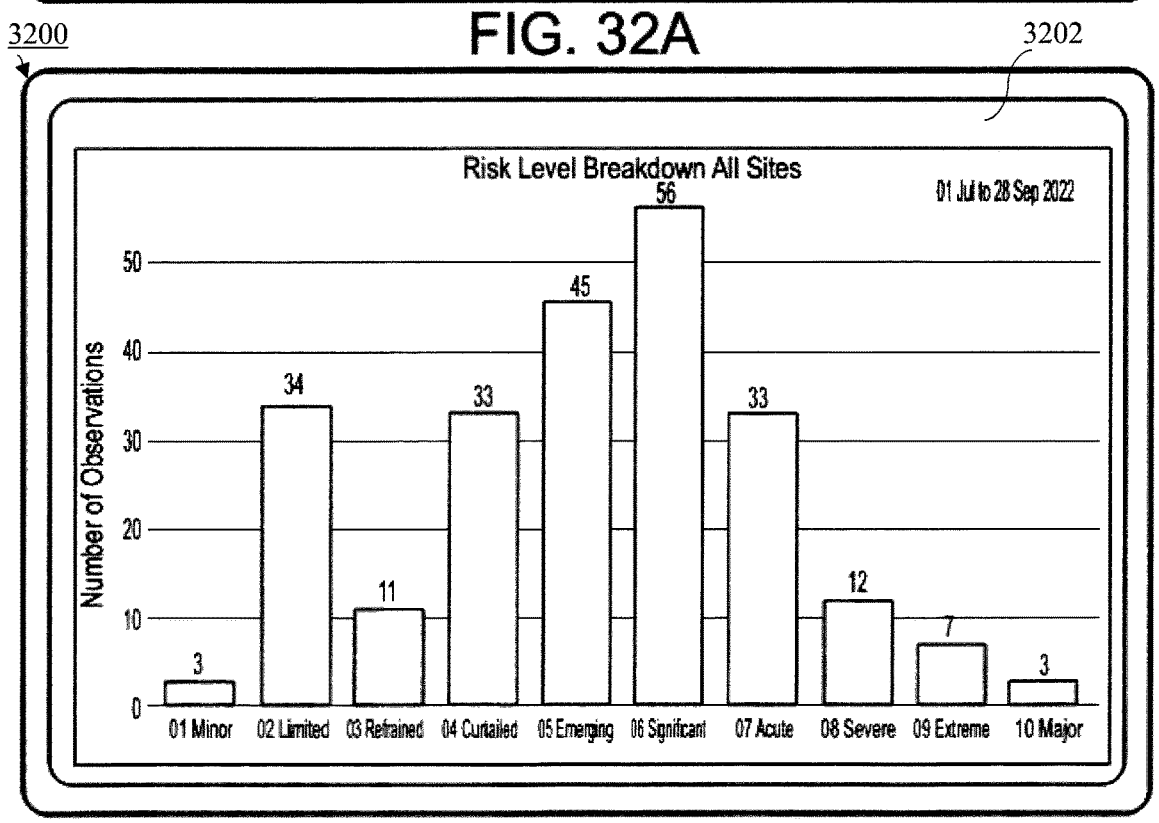
FIG. 32B depicts an example display screen to be displayed via a user interface of a user device for presenting graphical analysis of risk levels, in accordance with an embodiment of the present invention.
Figure 32C:
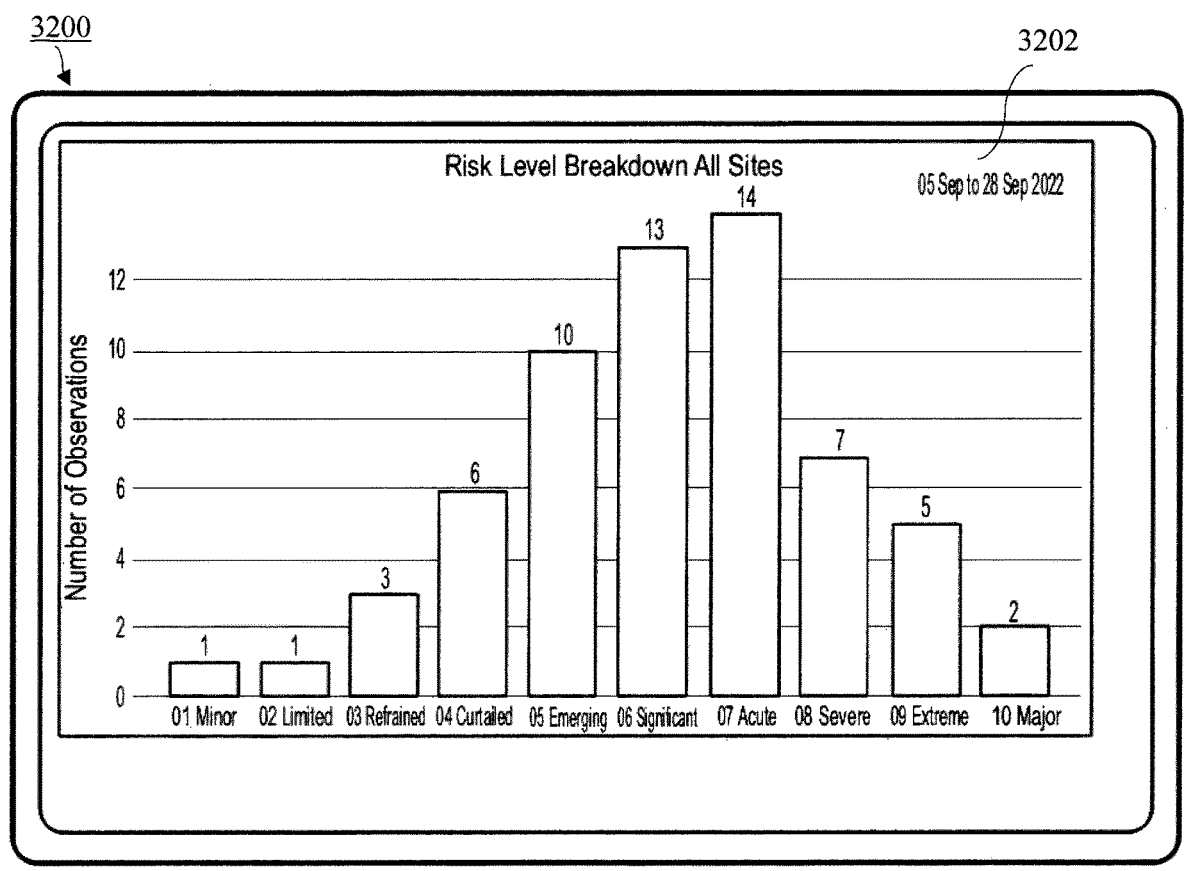
FIG. 32C depicts an example display screen to be displayed via a user interface of a user device for presenting graphical analysis of risk levels, in accordance with an embodiment of the present invention.

FIG. 31 depicts an example display screen to be displayed via a user interface 3102 of a user device 3100 for presenting graphical analysis of risk condition(s), in accordance with an embodiment of the present invention. For instance, the percentage of a specified risk condition may be displayed all time, over the past year, over the past three months, over the past month, and/or over other date ranges. Further, the actual percentage may be compared to a threshold level, and a moving average of the actual may be displayed to provide a better comparison to the threshold. In another representation, FIGS. 32A-32C depict an example display screen to be displayed via a user interface 3202 of a user device 3200 for presenting graphical analysis of risk levels, in accordance with various embodiments of the present invention. The graphical analysis may display the number of observations categorized within each risk level for the different date ranges (e.g., all time, three months, one month, etc.).

Figure 33:
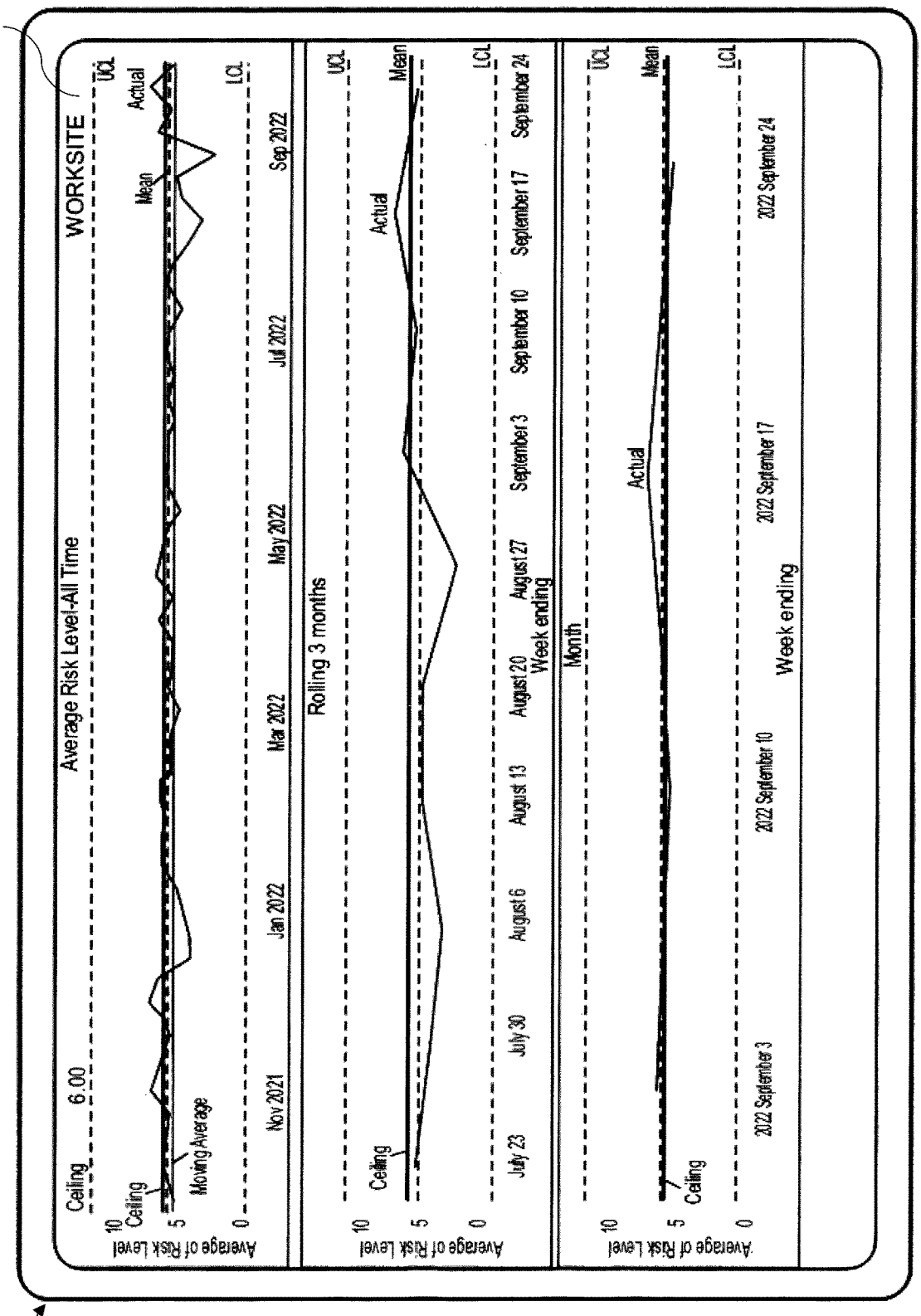
FIG. 33 depicts an example display screen to be displayed via a user interface of a user device for presenting graphical analysis of risk levels, in accordance with an embodiment of the present invention.
Figure 34A:
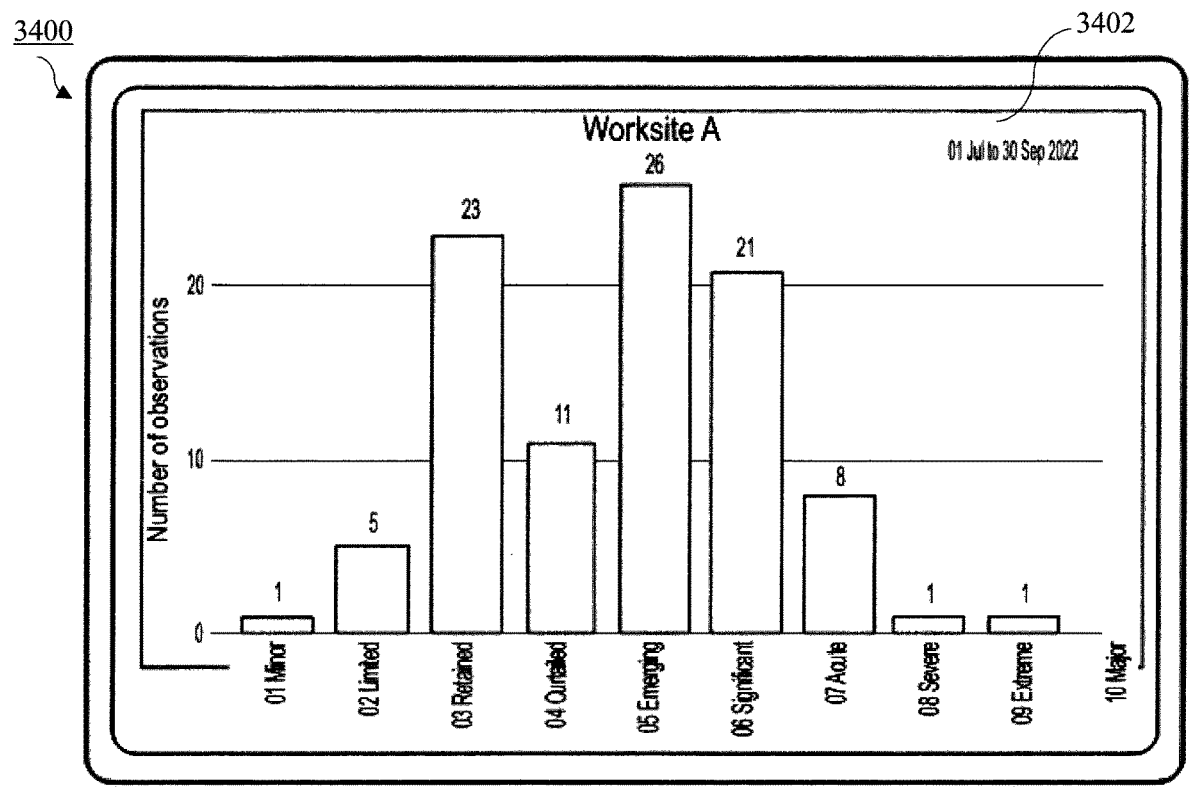
FIG. 34A depicts an example display screen to be displayed via a user interface of a user device for presenting graphical analysis of risk levels based on worksite observations, in accordance with an embodiment of the present invention.
Figure 34B:
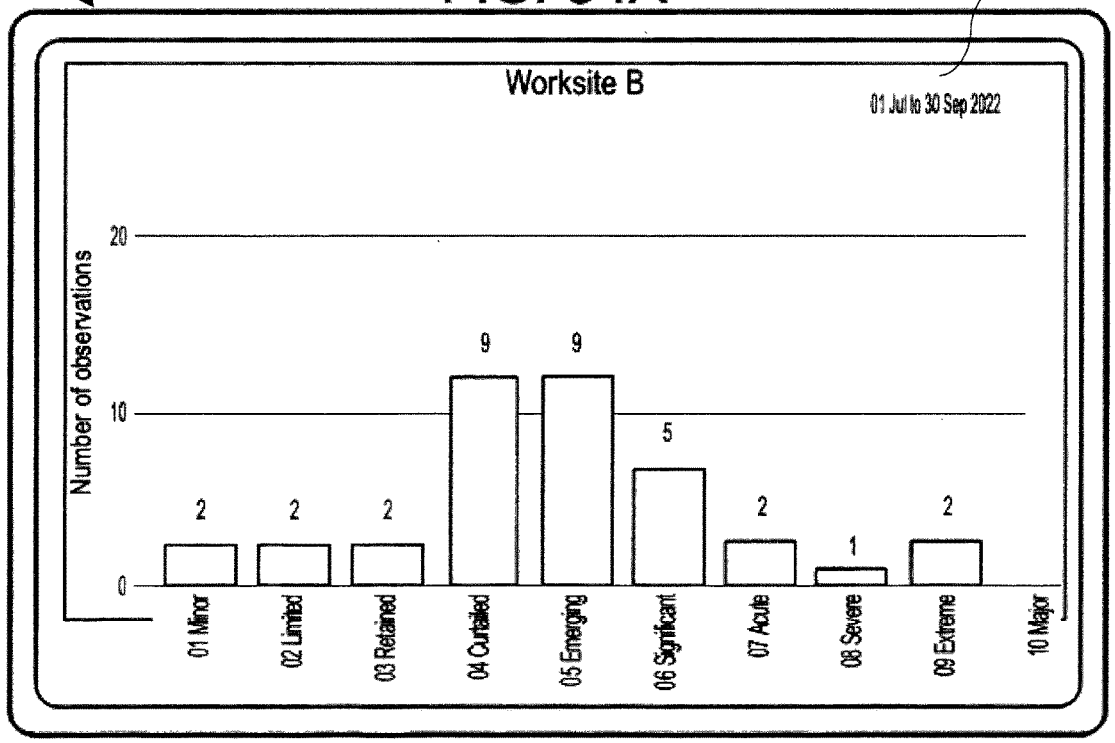
FIG. 34B depicts an example display screen to be displayed via a user interface of a user device for presenting graphical analysis of risk levels based on worksite observations, in accordance with an embodiment of the present invention.
Figure 34C:
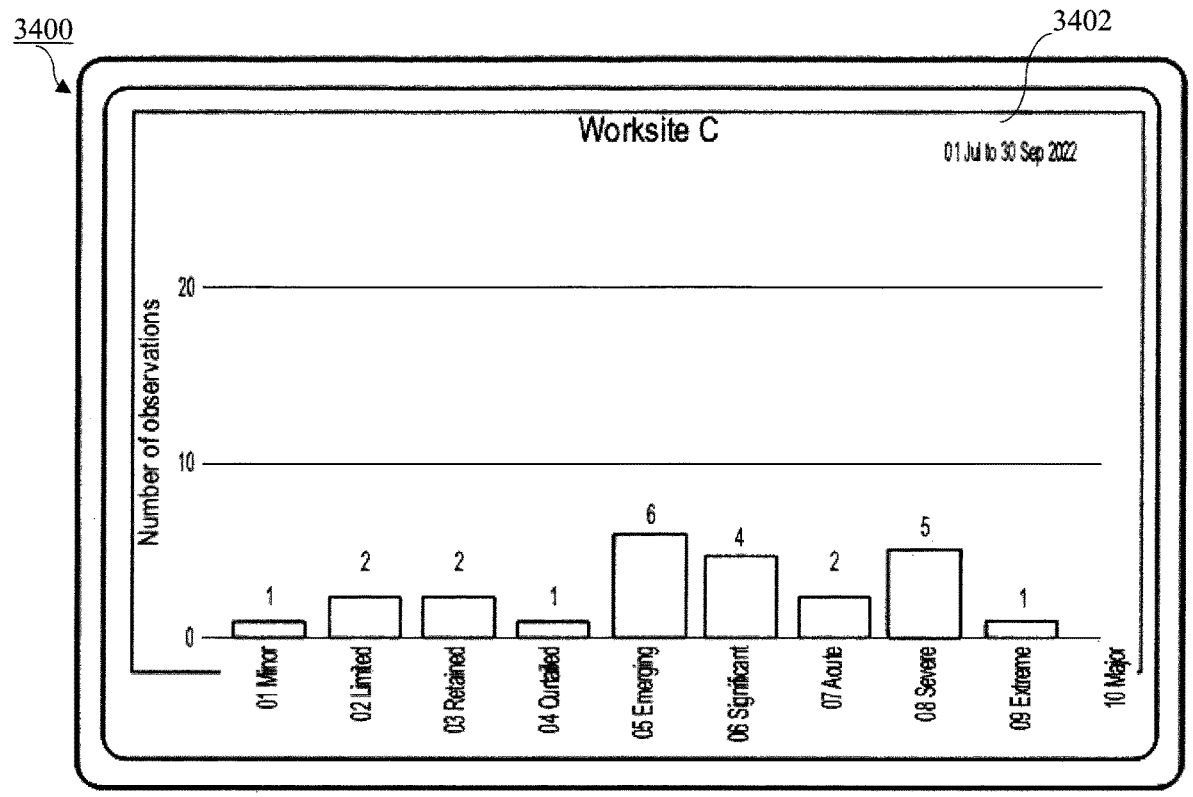
FIG. 34C depicts an example display screen to be displayed via a user interface of a user device for presenting graphical analysis of risk levels based on worksite observations, in accordance with an embodiment of the present invention.
Figure 34D:
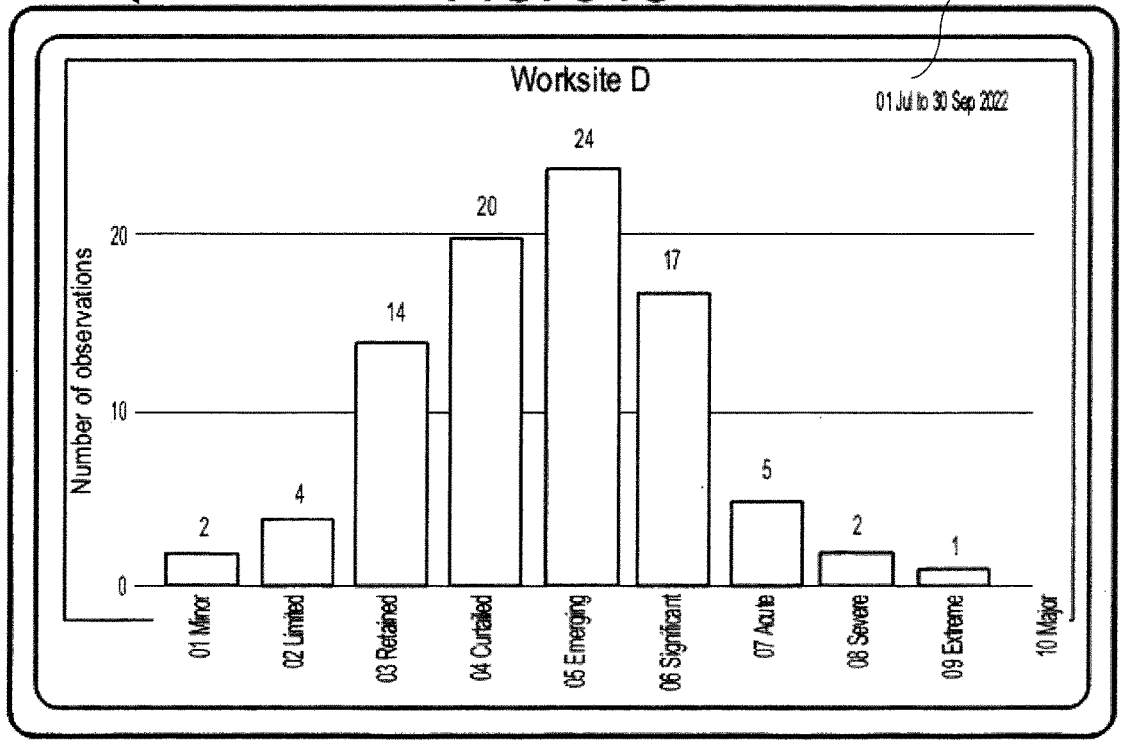
FIG. 34D depicts an example display screen to be displayed via a user interface of a user device for presenting graphical analysis of risk levels based on worksite observations, in accordance with an embodiment of the present invention.
Figure 34E:
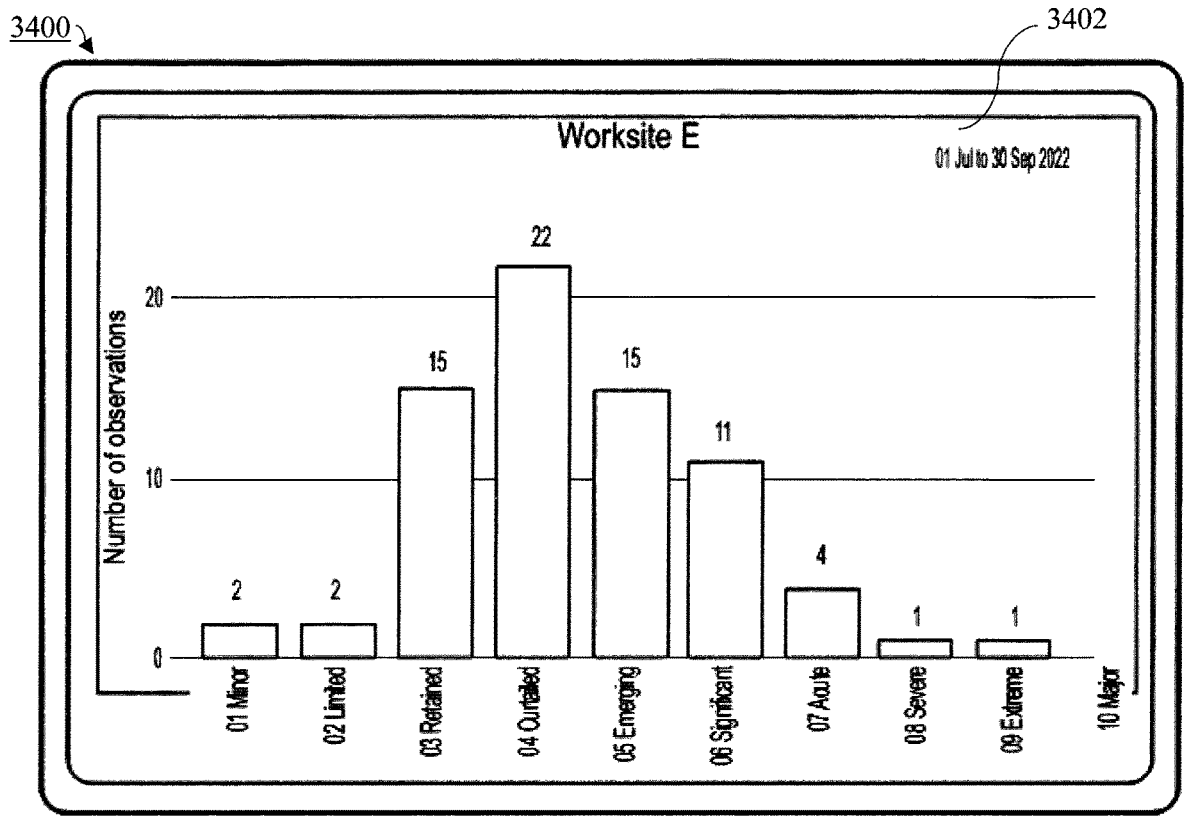
FIG. 34E depicts an example display screen to be displayed via a user interface of a user device for presenting graphical analysis of risk levels based on worksite observations, in accordance with an embodiment of the present invention.
Figure 34F:
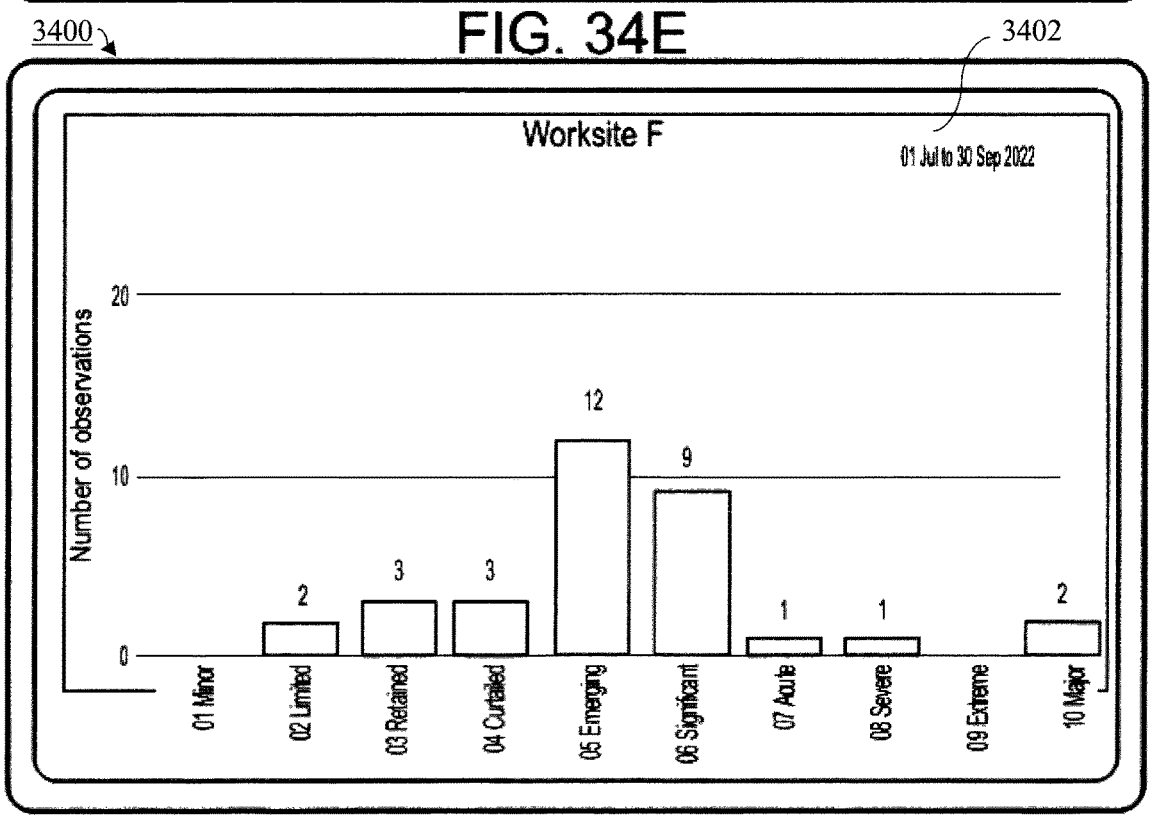
FIG. 34F depicts an example display screen to be displayed via a user interface of a user device for presenting graphical analysis of risk levels based on worksite observations, in accordance with an embodiment of the present invention.
Figure 34G:
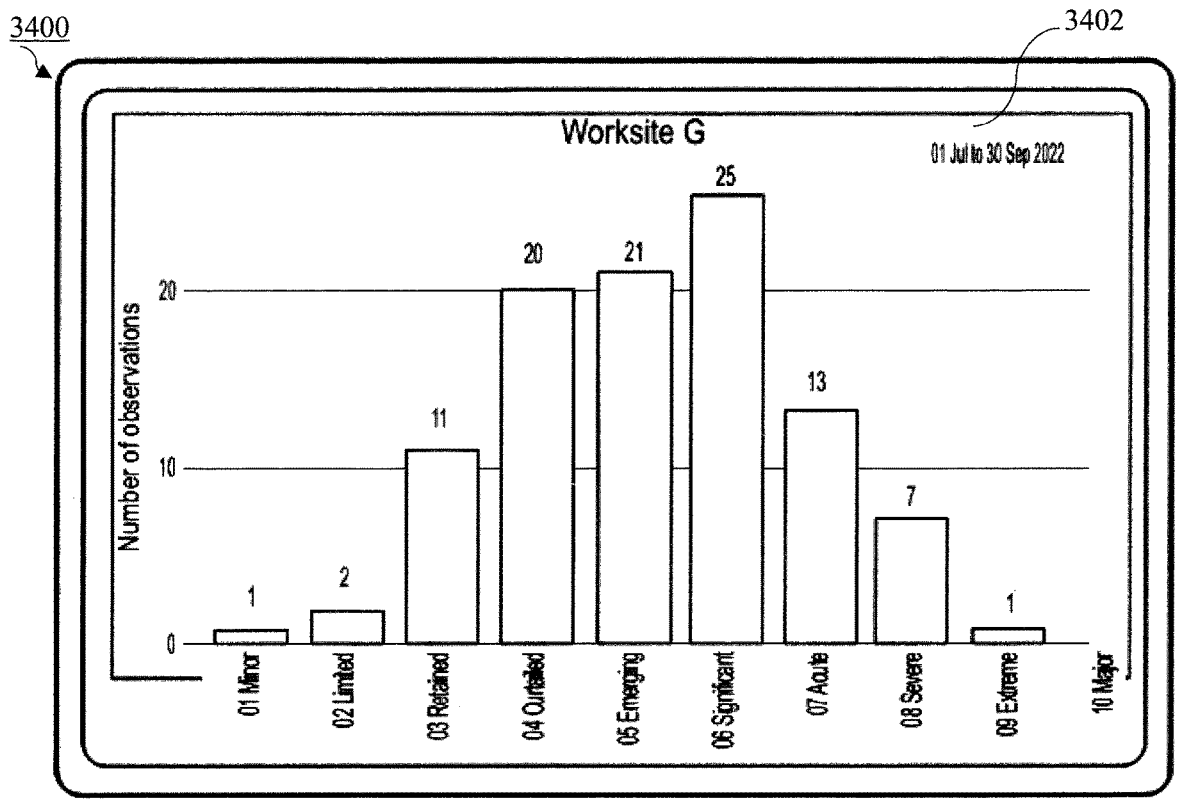
FIG. 34G depicts an example display screen to be displayed via a user interface of a user device for presenting graphical analysis of risk levels based on worksite observations, in accordance with an embodiment of the present invention.
Figure 34H:
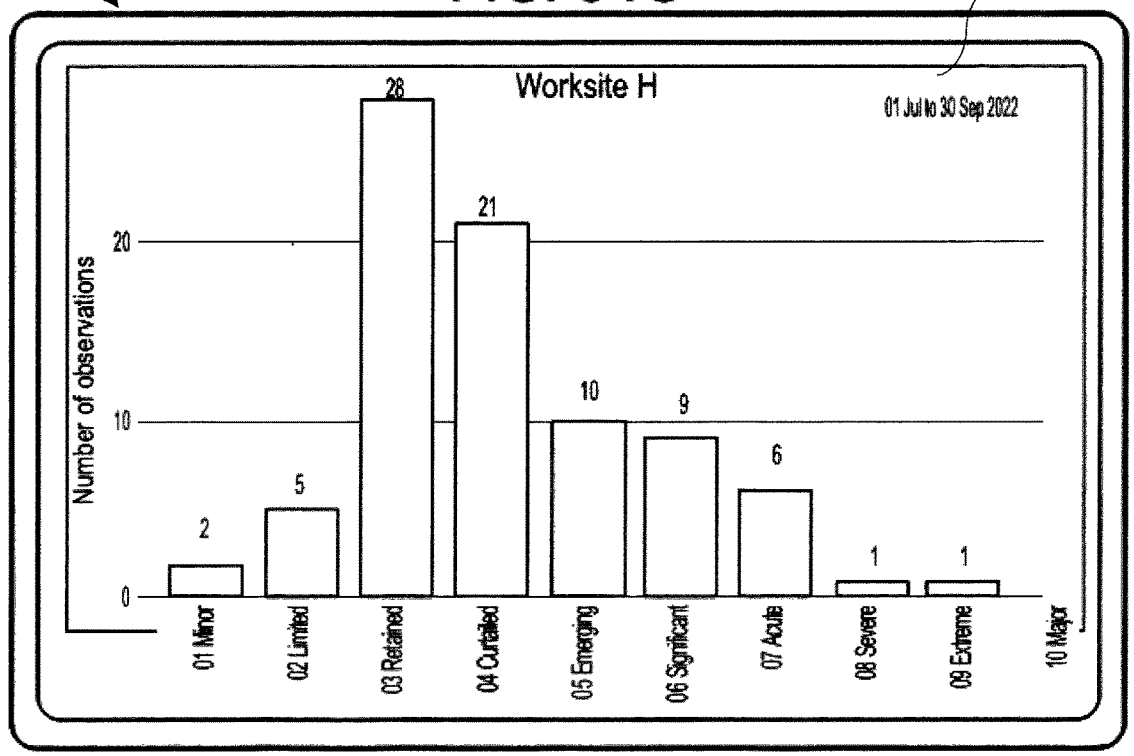
FIG. 34H depicts an example display screen to be displayed via a user interface of a user device for presenting graphical analysis of risk levels based on worksite observations, in accordance with an embodiment of the present invention.

FIG. 33 depicts an example display screen to be displayed via a user interface 3302 of a user device 3300 for presenting graphical analysis of risk levels, in accordance with an embodiment of the present invention. In particular, the average risk level at a particular worksite over a period of time (e.g., all time, over three months, over a single month, etc.) may be displayed.

FIGS. 34A-34H depict example display screens to be displayed via a user interface 3402 of a user device 3400 for presenting graphical analysis of risk levels based on worksite observations, in accordance with various embodiments of the present invention. The graphical analysis may display the number of observations that occurred at various different worksites (e.g., worksites A, B, C, D, E, F, G, H, etc.) for a given date range (e.g., three months).

Figure 35:
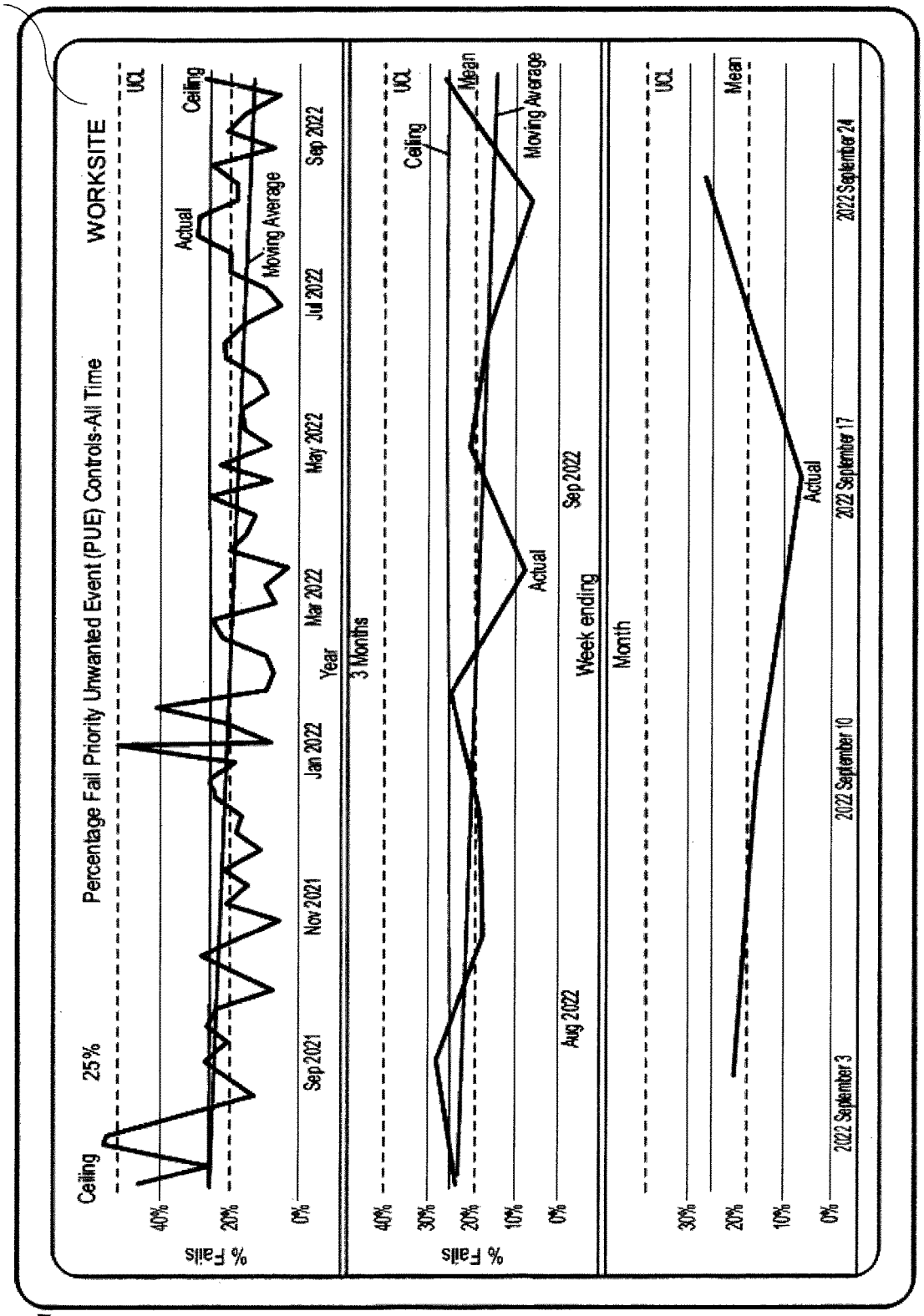
FIG. 35 depicts an example display screen to be displayed via a user interface of a user device for presenting graphical analysis of failure of controls, in accordance with an embodiment of the present invention.
Figure 36:
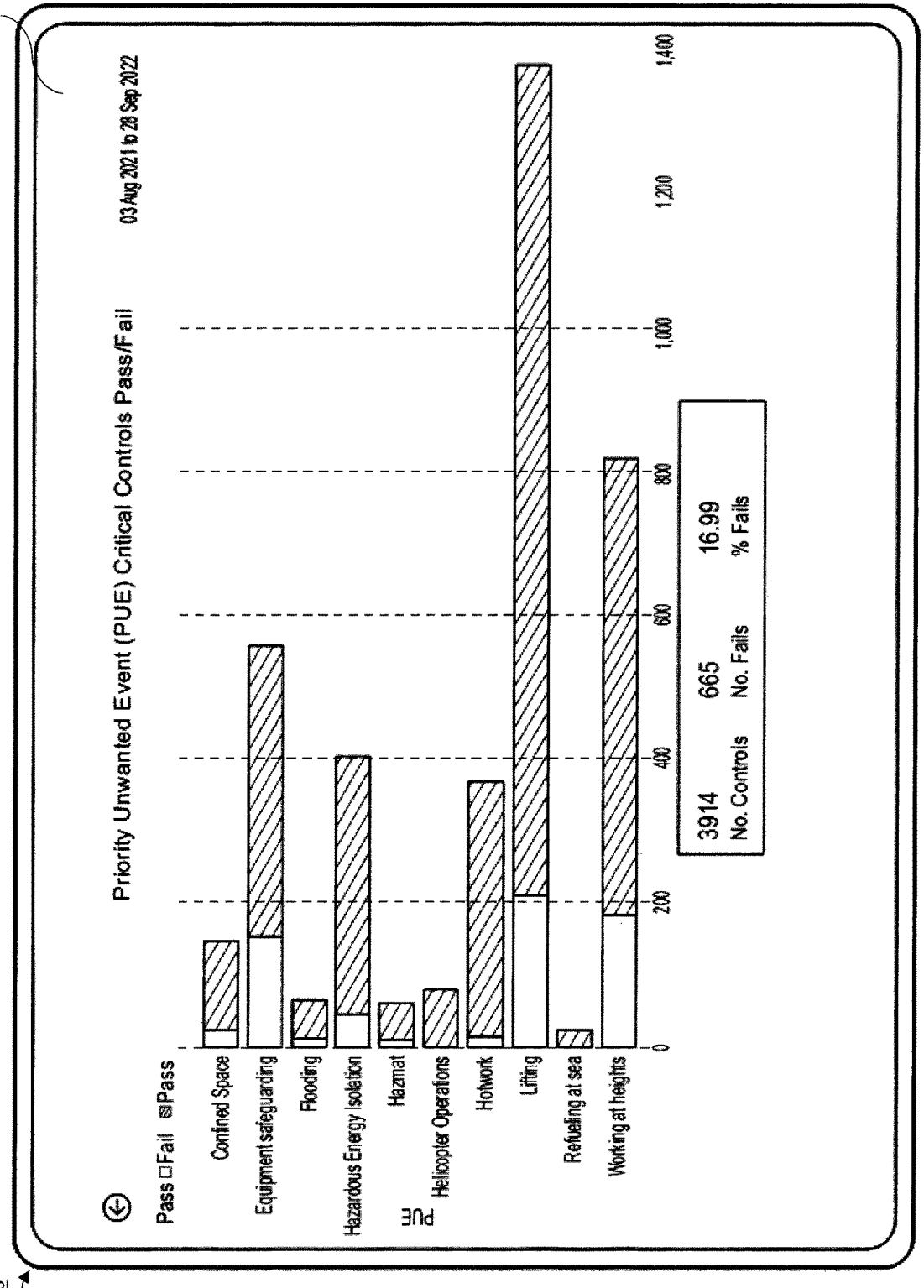
FIG. 36 depicts an example display screen to be displayed via a user interface of a user device for presenting graphical analysis of controls passing or failing, in accordance with an embodiment of the present invention.

FIG. 35 depicts an example display screen to be displayed via a user interface 3502 of a user device 3500 for presenting graphical analysis of failure of controls, in accordance with an embodiment of the present invention. In particular, the percentage of control failures at a given worksite may be displayed over a given date range (e.g., all time, three months, one month, etc.). In another representation, FIG. 36 depicts an example display screen to be displayed via a user interface 3602 of a user device 3600 for presenting graphical analysis of controls passing or failing, in accordance with an embodiment of the present invention. Instead of displaying a line graph, a bar graph representation may indicate the percentage of control failures and may also indicate the risk conditions associated with each control failure. Further, FIG. 37 depicts an example user interface 3702 of a user device 3700 for presenting analysis of passage or failure of critical controls, in accordance with an embodiment of the present invention. In particular, the percentage of control failures over a given date range for various risk conditions may be extrapolated to provide a more granular representation of what may have contributed to the critical control failure.

Figure 38:
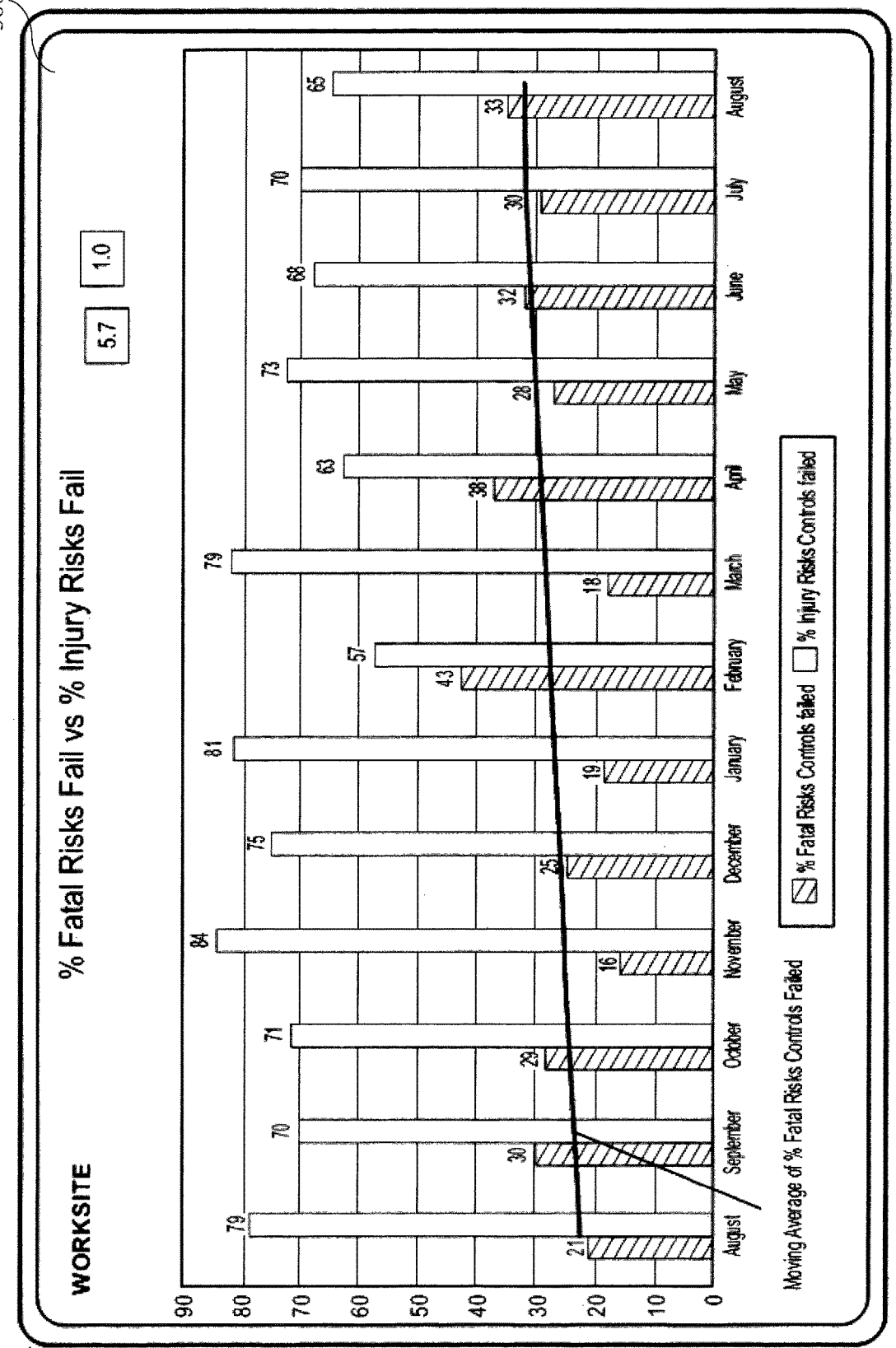
FIG. 38 depicts an example display screen to be displayed via a user interface of a user device for presenting graphical analysis of fatal risk failures versus injury risk failures, in accordance with an embodiment of the present invention.

FIG. 38 depicts an example display screen to be displayed via a user interface 3802 of a user device 3800 for presenting graphical analysis of fatal risk failures versus injury risk failures, in accordance with an embodiment of the present invention. In particular, the percentage of fatal risk failures versus the percentage of injury risk failures at a given worksite may be displayed on a month-by-month basis.

Figure 39:
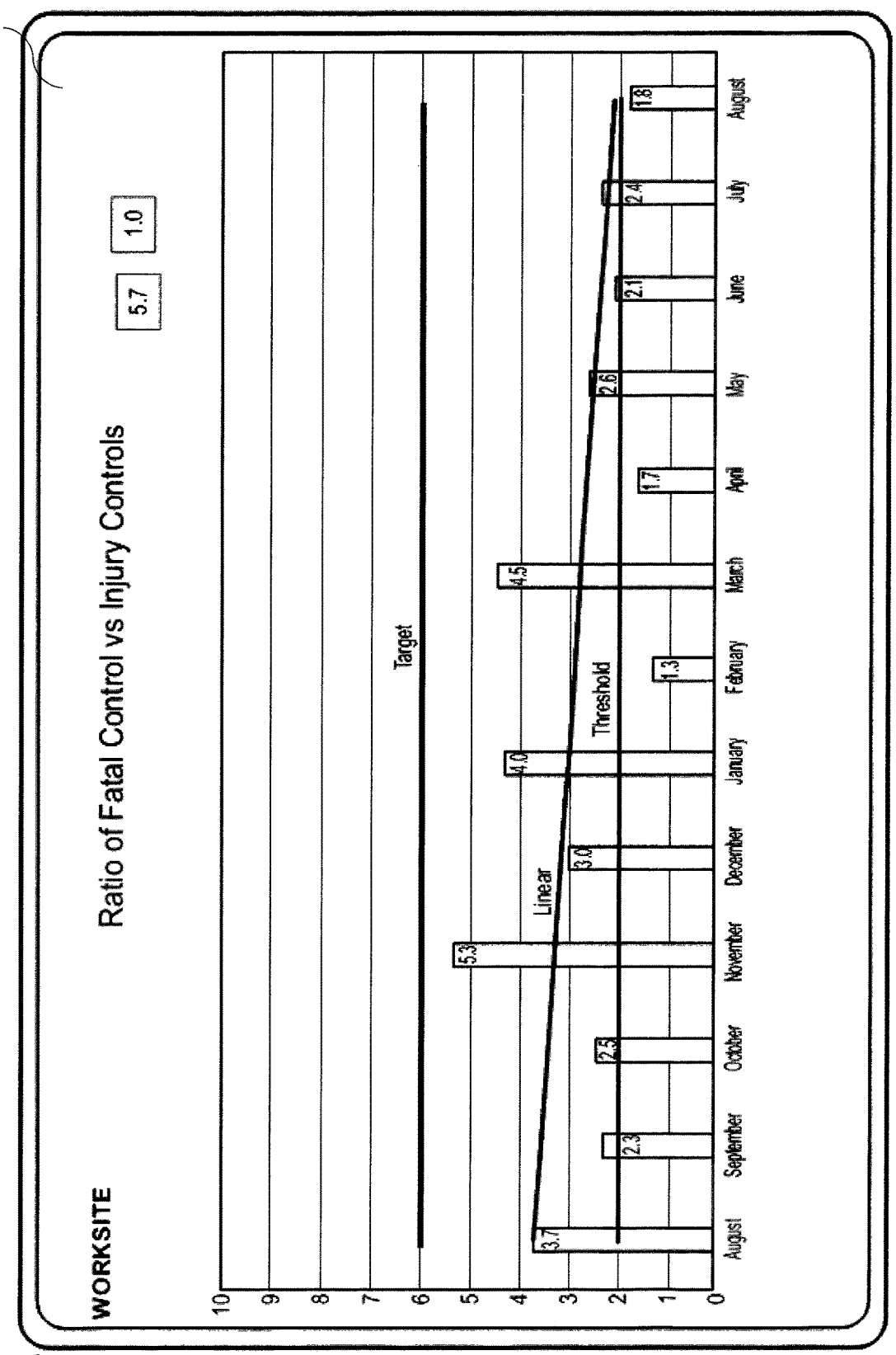
FIG. 39 depicts an example display screen to be displayed via a user interface of a user device for presenting graphical analysis of a ratio of fatal control versus injury controls, in accordance with an embodiment of the present invention.
Figure 40A:
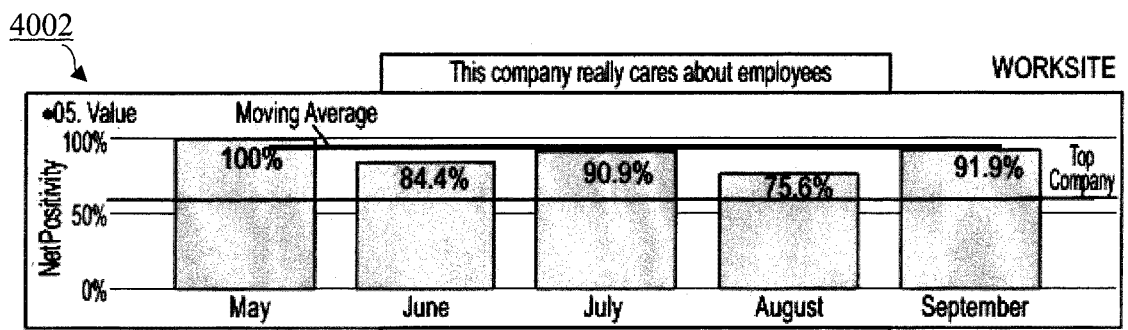
FIG. 40A depicts an example display screen to be displayed via a user interface of a user device for presenting graphical analysis of company feedback, in accordance with an embodiment of the present invention.
Figure 40B:
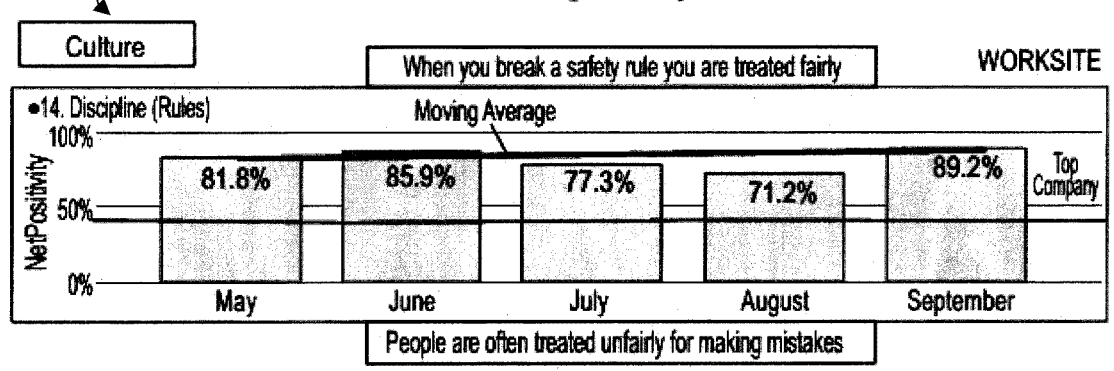
FIG. 40B depicts an example display screen to be displayed via a user interface of a user device for presenting graphical analysis of employee treatment, in accordance with an embodiment of the present invention.
Figure 40C:
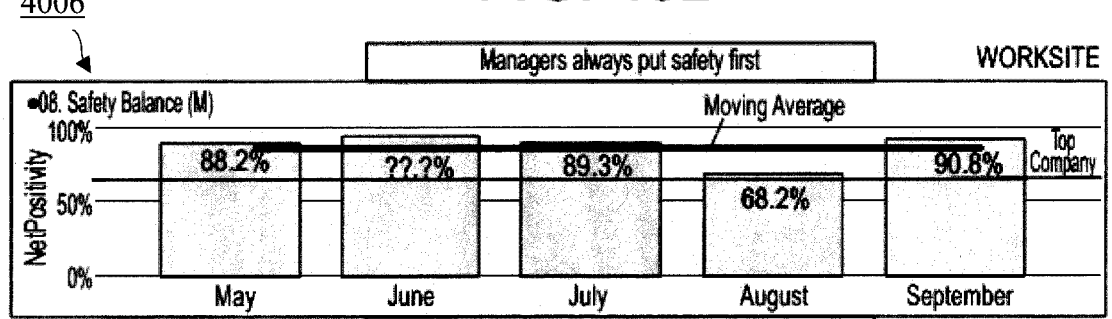
FIG. 40C depicts an example display screen to be displayed via a user interface of a user device for presenting graphical analysis of opinions of management, in accordance with an embodiment of the present invention.
Figure 40D:
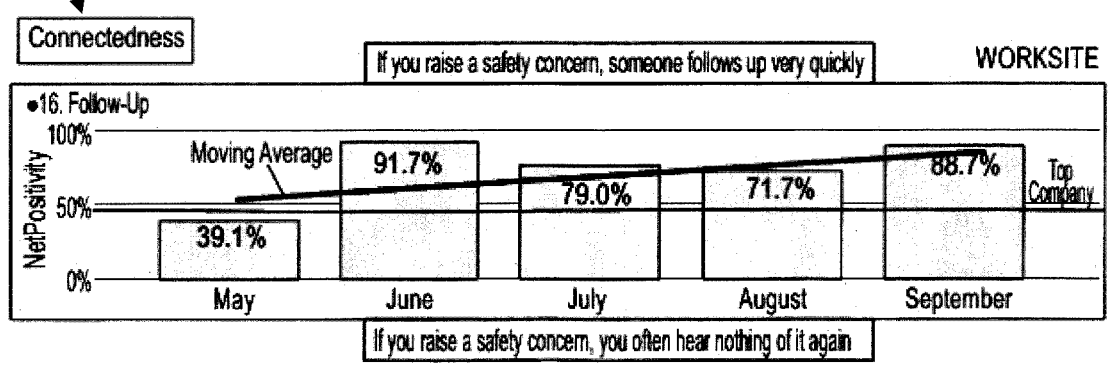
FIG. 40D depicts an example display screen to be displayed via a user interface of a user device for presenting graphical analysis of company response rate, in accordance with an embodiment of the present invention.
Figure 40E:
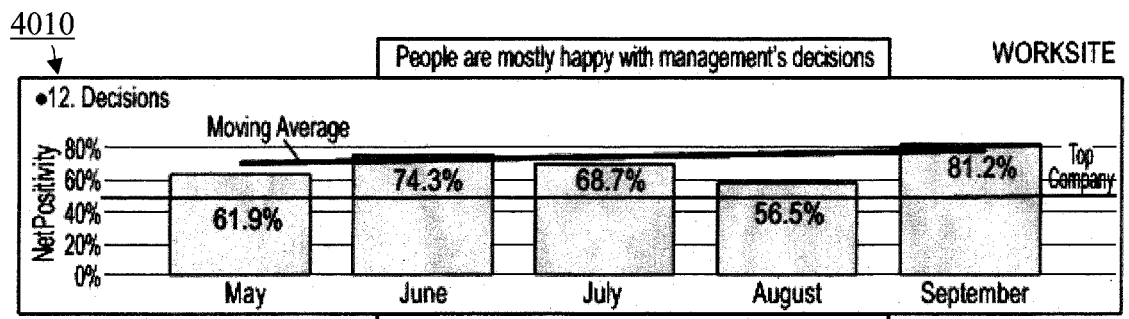
FIG. 40E depicts an example display screen to be displayed via a user interface of a user device for presenting graphical analysis of perspectives of management decisions, in accordance with an embodiment of the present invention.
Figure 40F:
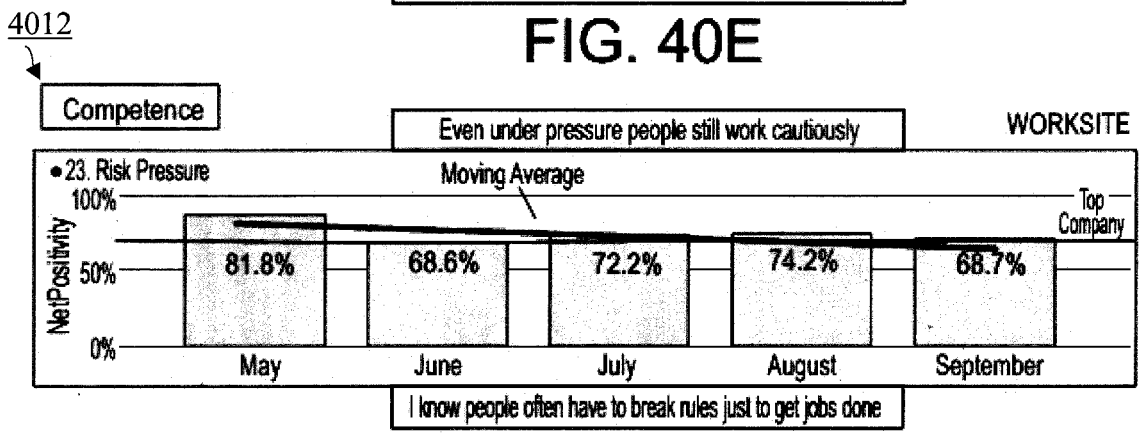
FIG. 40F depicts an example display screen to be displayed via a user interface of a user device for presenting graphical analysis of work conditions under pressure, in accordance with an embodiment of the present invention.
Figure 40G:
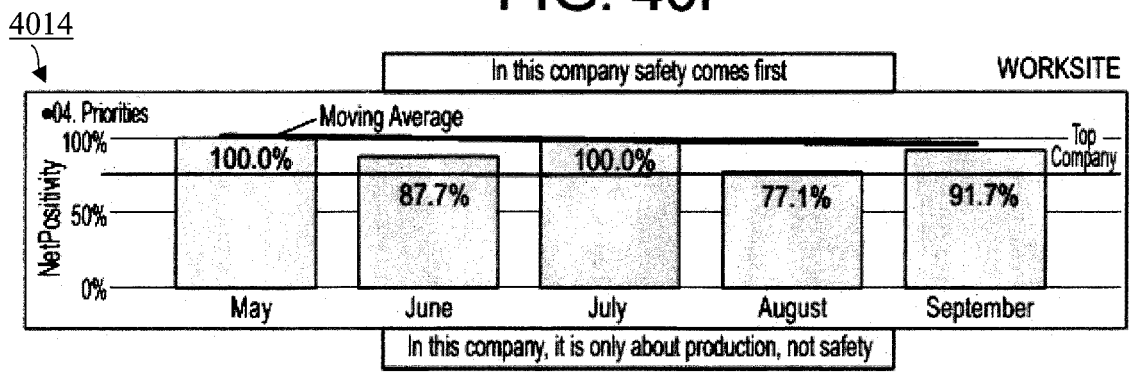
FIG. 40G depicts an example display screen to be displayed via a user interface of a user device for presenting graphical analysis of feedback regarding company priorities, in accordance with an embodiment of the present invention.
Figure 40H:
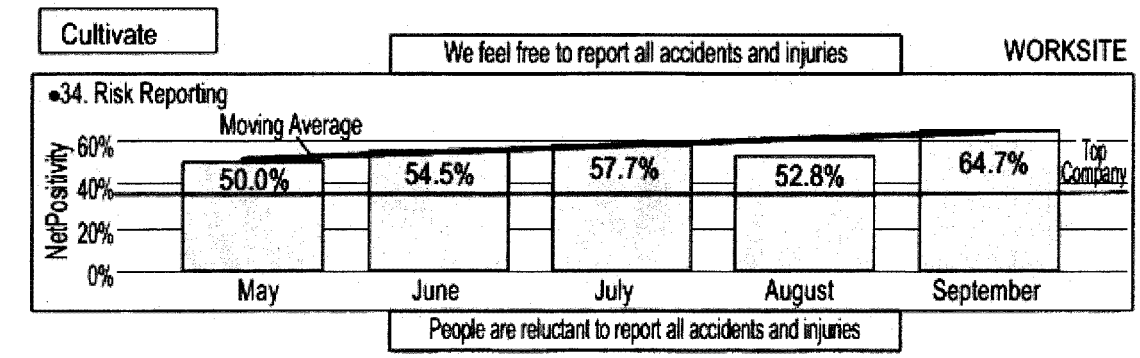
FIG. 40H depicts an example display screen to be displayed via a user interface of a user device for presenting graphical analysis of feedback regarding accident reporting, in accordance with an embodiment of the present invention.

FIG. 39 depicts an example display screen to be displayed via a user interface 3902 of a user device 3900 for presenting graphical analysis of a ratio of fatal control versus injury controls, in accordance with an embodiment of the present invention. In particular, the ratio of fatal controls versus injury controls may be displayed relative to the "target" and "threshold" levels.

FIGS. 40A-40H depict example display screens to be displayed via a user interface of a user device for presenting graphical analysis of various conditions including, for example, company feedback 4002, employee treatment 4004, opinions of management 4006, company response rate 4008, perspectives of management decisions 4010, work conditions under pressure 4012, feedback regarding company priorities 4014, and feedback regarding accident reporting 4016, in accordance with various embodiments of the present invention.

Figure 41:
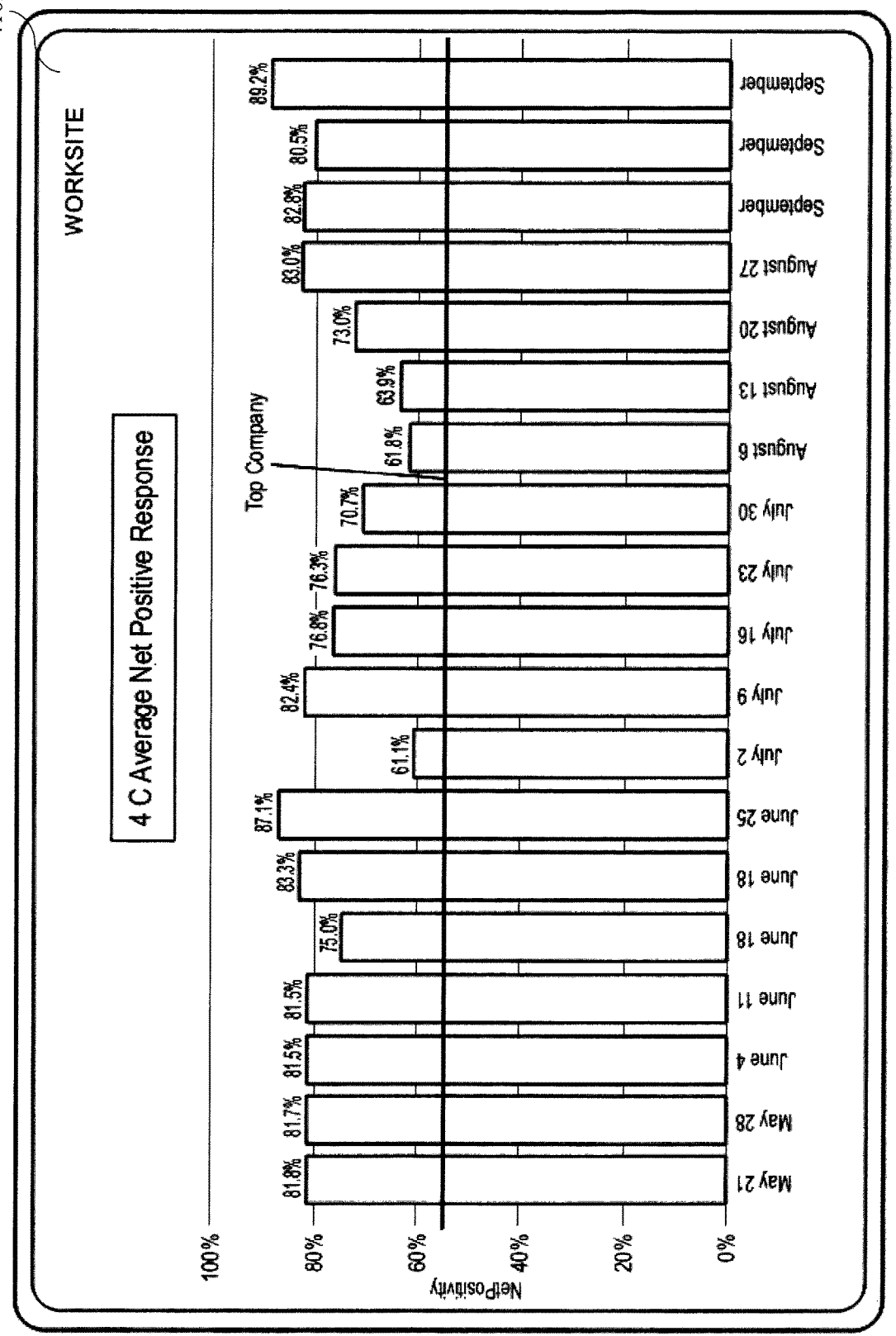
FIG. 41 depicts an example display screen to be displayed via a user interface of a user device for presenting graphical analysis of responses related to risk classifications, in accordance with an embodiment of the present invention.

FIG. 41 depicts an example display screen to be displayed via a user interface 4102 of a user device 4100 for presenting graphical analysis of responses related to risk classifications, in accordance with an embodiment of the present invention. In particular, the percentage of net positivity of average responses (e.g., feedback provided by workers) at a worksite are displayed on a weekly basis and compared to the average net positivity of another company. For instance, the top company net positivity rating may be another company in a similar industry, with a similar business structure, of a similar employee headcount, etc.

Figure 42A:
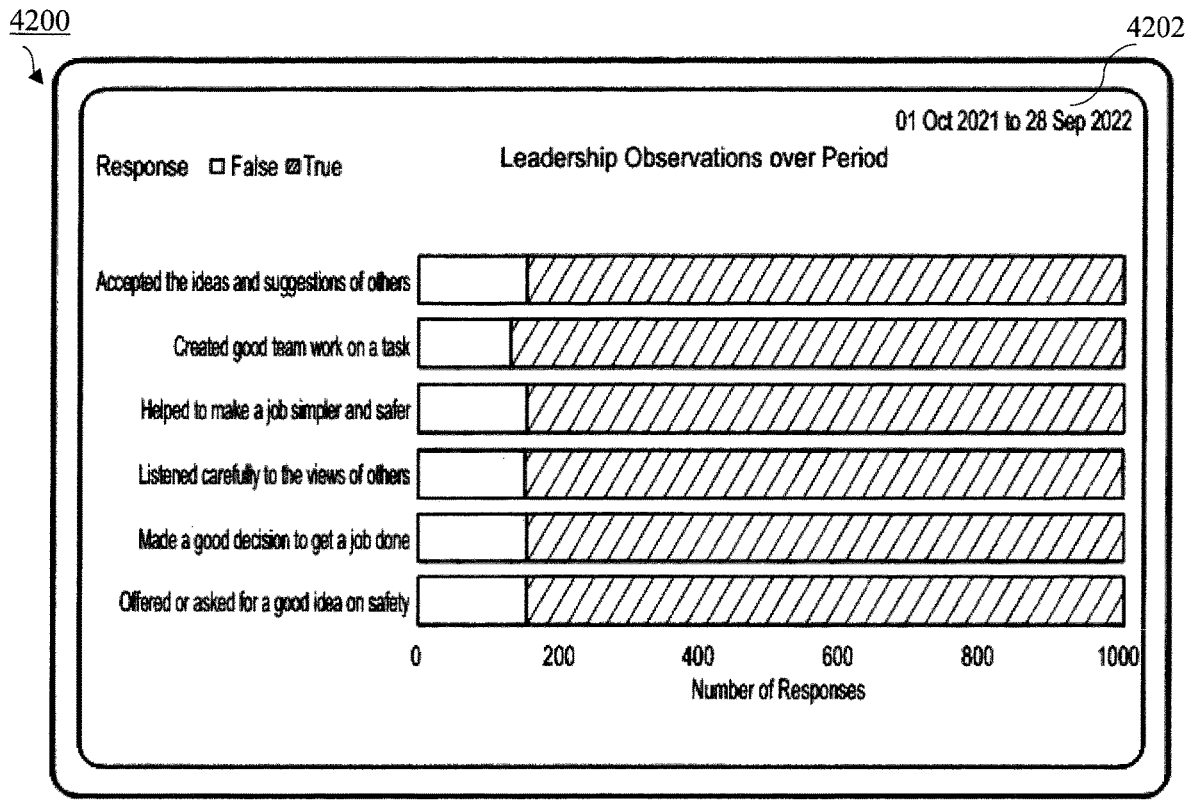
FIG. 42A depicts an example display screen to be displayed via a user interface of a user device for presenting graphical analysis of leadership observations, in accordance with an embodiment of the present invention.
Figure 42B:
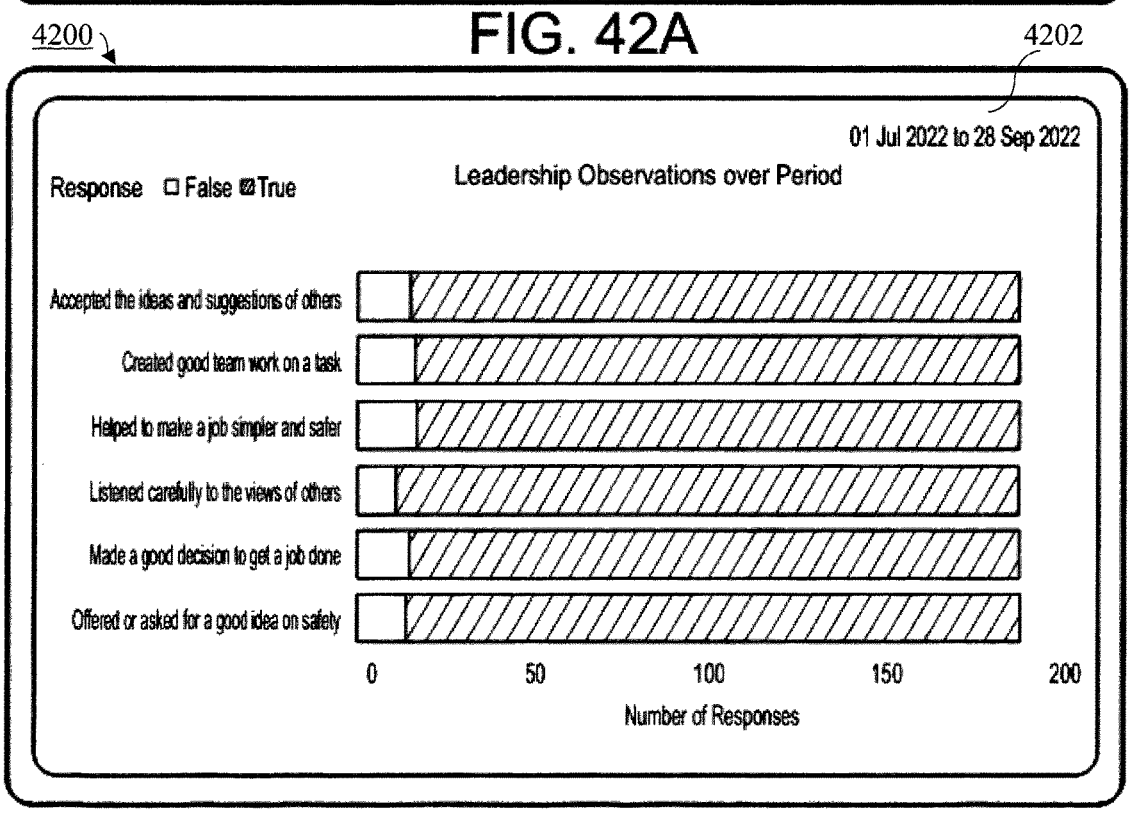
FIG. 42B depicts an example display screen to be displayed via a user interface of a user device for presenting graphical analysis of leadership observations, in accordance with an embodiment of the present invention.
Figure 42C:
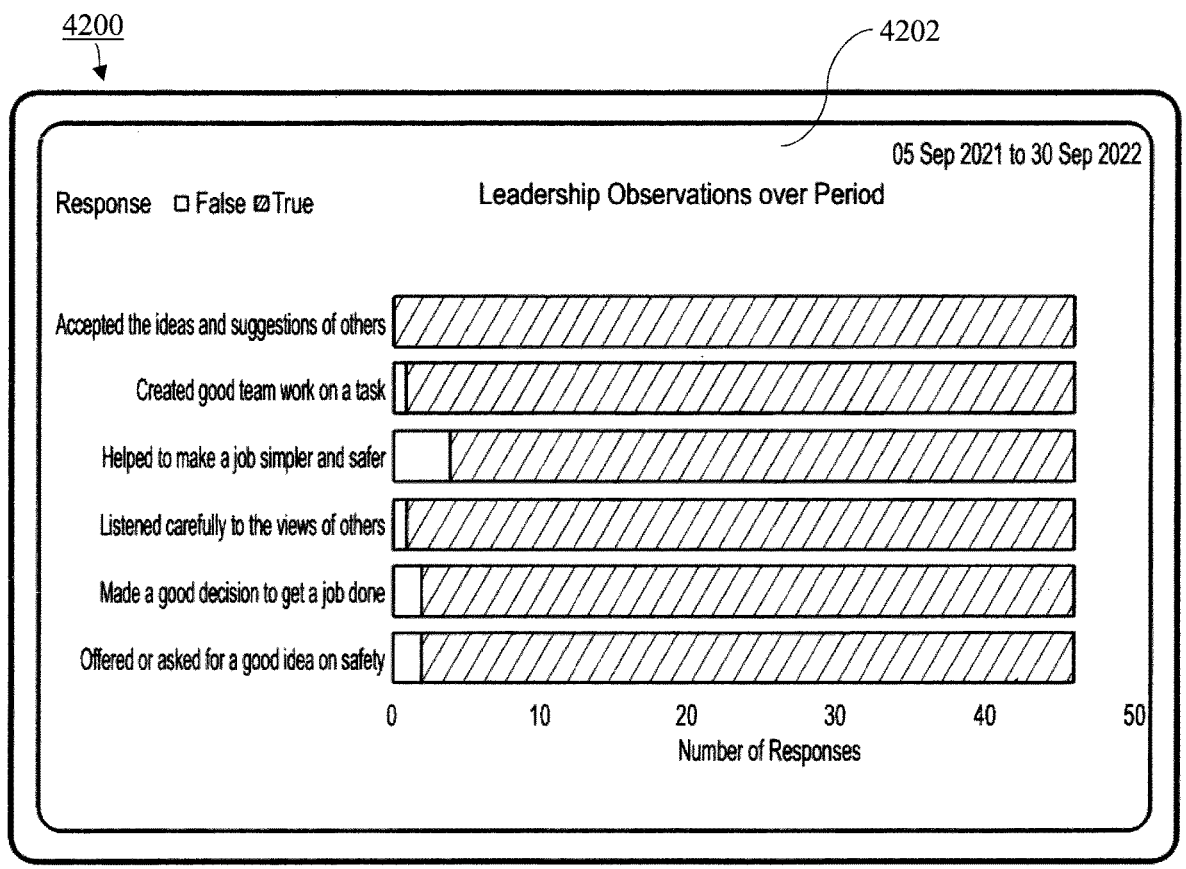
FIG. 42C depicts an example display screen to be displayed via a user interface of a user device for presenting graphical analysis of leadership observations, in accordance with an embodiment of the present invention.

FIGS. 42A-42C depict an example display screen to be displayed via a user interface 4202 of a user device 4000 for presenting graphical analysis of leadership observations, in accordance with various embodiments of the present invention. In particular, bar graphs represent the number of responses indicating how the employees feel about the leadership. For instance, the bar graphs may indicate the number of employees that responded "true" or "false" related to specific leadership observation prompts. Each bar graph may indicate a time period during which the responses were obtained in order to help provided analysis of how responses have changed over time.

Figure 43:
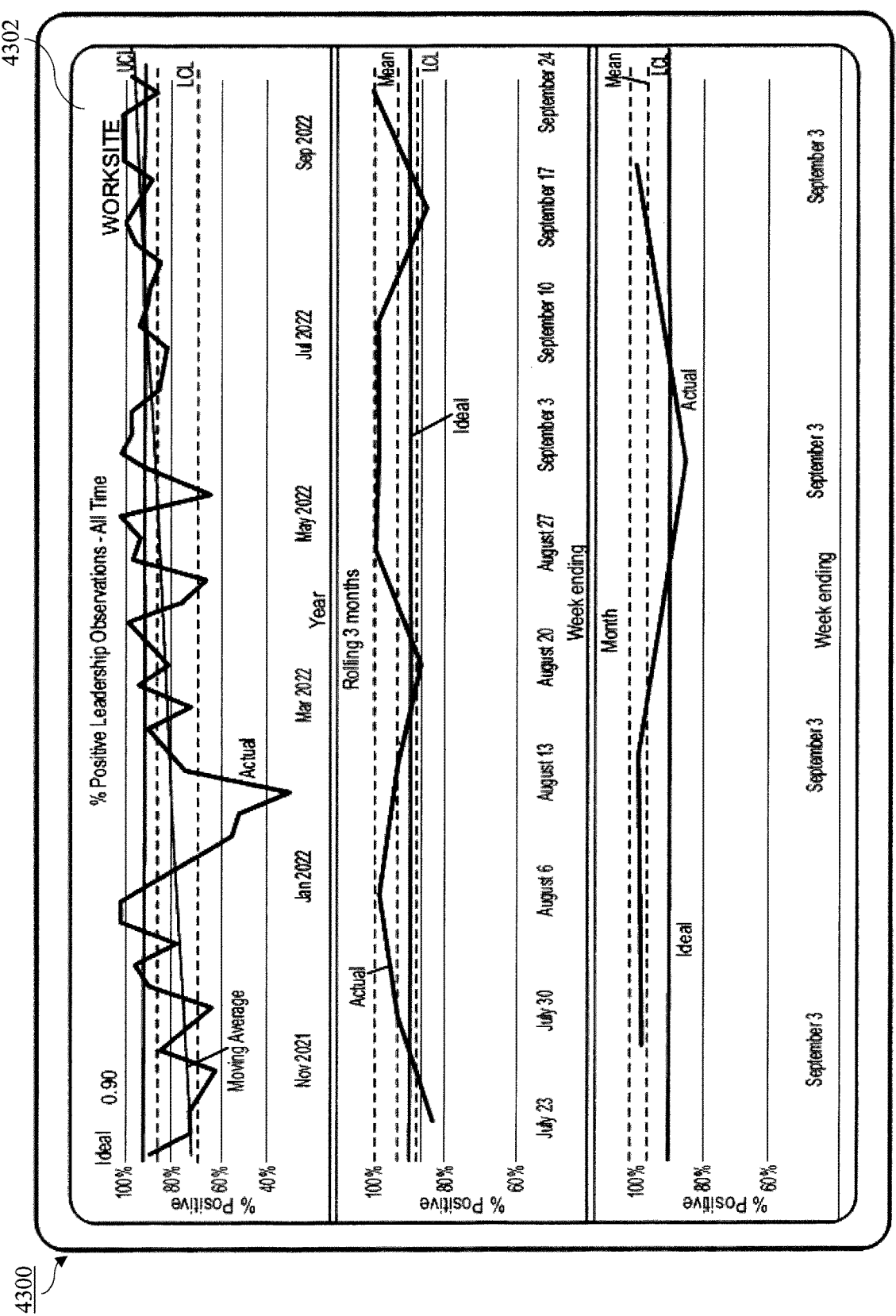
FIG. 43 depicts an example display screen to be displayed via a user interface of a user device for presenting graphical analysis of leadership observations, in accordance with an embodiment of the present invention.

FIG. 43 depicts an example display screen to be displayed via a user interface 4302 of a user device 4300 for presenting graphical analysis of leadership observations, in accordance with an embodiment of the present invention. In particular, line graphs representing the percentage of positive leadership observations over time at a given worksite are displayed. The time period displayed can be adjusted to show all time observations, observations over a rolling three months, and observations over a given week.

Figure 44:
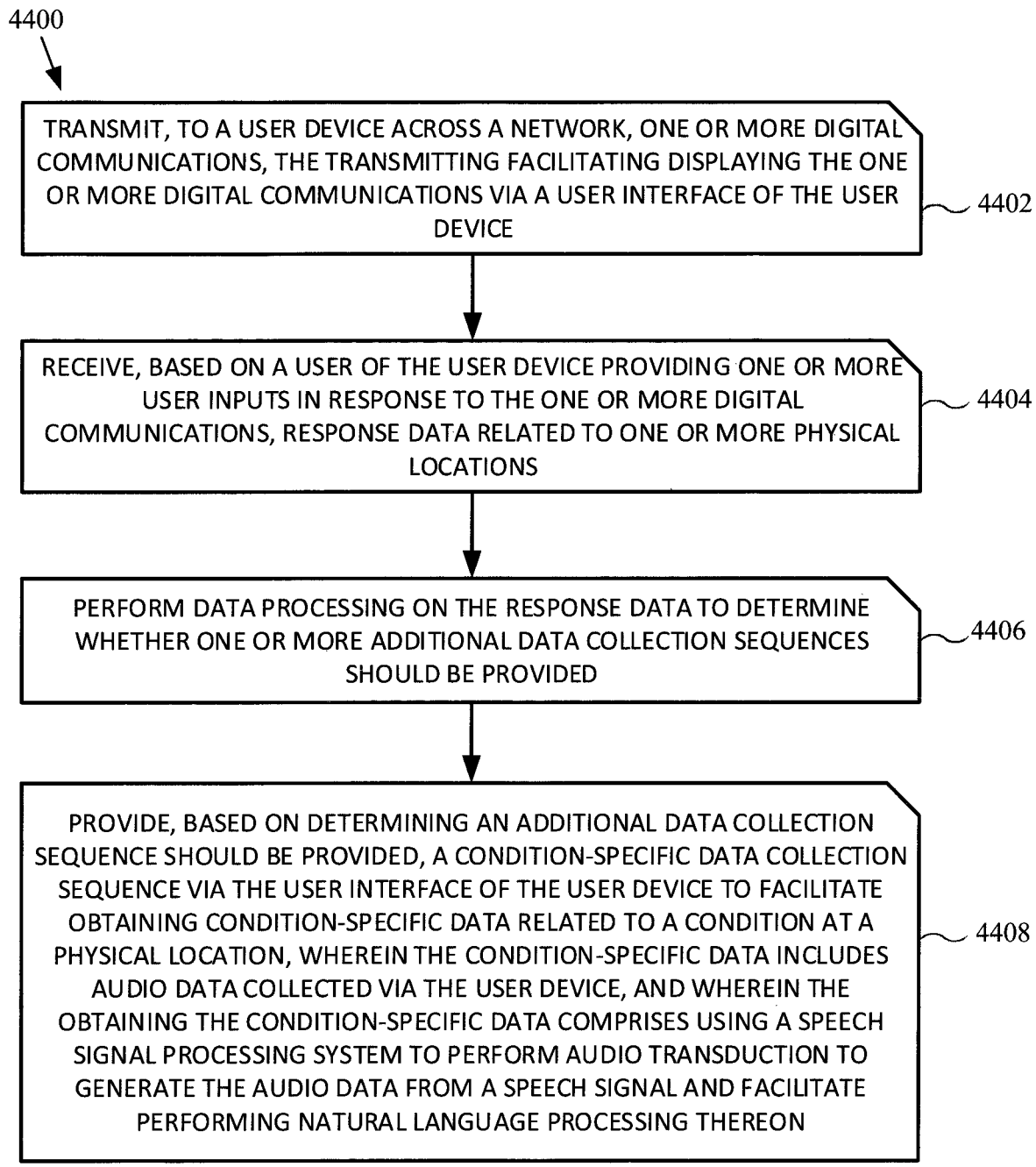
FIG. 44 depicts a block diagram of an example method for facilitating natural language processing using audio transduction, in accordance with an embodiment of the present invention.

FIG. 44 depicts a block diagram of an example method 4400 for facilitating natural language processing using audio transduction, in accordance with an embodiment of the present invention. At block 4402, one or more digital communications may be transmitted to a user device across a network. The one or more digital communications may be included as part of a risk assessment of a worksite and may allow for a user performing the risk assessment (i.e., the assessor) to provide user inputs in response to the one or more digital communications. According to one particular embodiment, the one or more digital communications may be transmitted based on the user initiating a risk assessment and the risk assessment is performed as part of implementing a risk management system, where the risk management system includes shift-based risk assessments of a site, where the site includes a physical workplace facility. According to various embodiments herein, the one or more digital communications include a risk assessment that includes queries to assess one or more potential risks at the physical location and the physical location includes a facility. In particular, the one or more potential risks may include physical hazards and the condition (e.g., risk condition) may include a potentially hazardous condition.

As provided herein, the one or more digital communications may include any data communication transferring data to the user device, and more particular transferring data associated with a risk assessment in order for the user to perform the risk assessment. Transmission of the one or more digital communications may facilitate displaying the one or more digital communications via a user interface of the user device. In particular, the user interface may include a digital display used to present content included in the digital communications to the user. For instance, the content presented to the user as part of the risk assessment may include selectable parameters that the user may select to provide user inputs. Specifically, according to one embodiment, the one or more digital communications may include one or more selectable parameters that are displayed and the one or more user inputs include selected parameters, as selected by the user, of the one or more selectable parameters displayed. In some embodiments, the selectable parameters may include various user interface controls such as selectable buttons (e.g. call-to-action buttons, text buttons, ghost buttons, dropdown buttons, floating action buttons, menu buttons, expandable buttons, raised buttons, etc.), toggles, switches, text boxes, and/or various other types of selectable parameters.

At block 4404, based on a user of the user device providing one or more user inputs in response to the one or more digital communications, response data related to one or more physical locations is received. The response data may include audio data, textual data, digital image data, and/or various other data inputs provided by the user. According to one embodiment, the response data may also include an identification of the user. As described above, the one or more physical locations may include any indoor or outdoor location, area, and/or facility. In some embodiments, the response data may be related to questions asked to employees at a physical location (e.g., a worksite). In other embodiments, the response data may be related to images captured at a physical location (e.g., a worksite). Embodiments herein may also include response data related to a physical location that includes a geographic region (e.g. a town, a country, a continent, etc.). For instance, in one embodiment the risk assessment could be performed in the context of evaluating pollution levels at a town located near a manufacturing facility or the risk assessment could be performed in the context of evaluating rising sea levels near an island nation. Alternatively, in one embodiment, the risk assessment could be performed in the context of evaluating safety precautions taken by the crew of a maritime vessel.

At block 4406, data processing is performed on the response data to determine whether one or more additional data collection sequences should be provided. In particular, the program instructions may be executed to enable the computing system to determine, from the response data, whether additional data should be provided based, for example, upon the responses provided by the user. For instance, if the data processing identifies from the response data one or more potential risks based on the user providing an indication that a risk condition exists (e.g., based on the user providing a user input indicating that a risk condition is present at the physical location) then the risk assessment program may determine that the data collection sequence should be generated based on the physical location being likely to include a potential risk of the one or more potential risks identified during the data processing. For example, the data processing may cause the computing system to determine that follow-up questions are needed as part of an additional data collection sequence. In another example, based on the user indicating that a risk condition exists, the risk assessment program may determine that image(s) of the risk condition should be obtained and/or an audio recording from the user should be obtained so that the user may orally describe the risk condition.

At block 4408, based on determining an additional data collection sequence should be provided, a condition-specific data collection sequence is provided via the user interface of the user device to facilitate obtaining condition-specific data related to a condition at a physical location. In particular, according to various embodiments, the condition-specific data collection sequence may include questions for the assessor and/or a person observed by the assessor to answer, the condition-specific data collection sequence may include classification identifiers that the user may select to identify why the risk condition exists, the condition-specific data collection sequence may provide prompts for the user to provide more information about the condition at the physical location, etc. For instance, the data collection sequence may display a prompt asking the user to classify the condition by, for example, providing a text box through which a user can input text, by providing selectable inputs (e.g., buttons) for the user to further classify the condition, etc. According to various embodiments, the data collection sequence may display may prompt the user to survey one or more individuals at the location about the condition Additionally or alternatively, according to one embodiment, the condition-specific data collection sequence may prompt the user to provide an audio recording, in which case providing the condition-specific data collection sequence may facilitate obtaining condition-specific data that includes audio data that is collected via the user device. In particular, obtaining the audio data that is included in the condition-specific data includes using a speech signal processing system to perform audio transduction (e.g., via an audio transducer that converts speech into an electrical signal) on a speech signal (e.g., words spoken by the user) to generate the audio data. Further, obtaining the condition-specific data that includes the audio data may facilitate performing natural language processing on the audio data in order to generate text (e.g., textual data) from the audio data.

According to various embodiments, the condition-specific data may also include digital image data. For instance, the condition-specific data collection sequence may prompt the user to take at least one photo or to take a video of the risk condition. In response, the user may capture a digital image or video via an image capturing input (e.g., a camera) of the user device of the risk condition at the physical location. In particular, obtaining the condition-specific data may include collecting the digital image data via the image capturing input of the user device, where the digital image data includes one or more digital images that visually depict the condition at the physical location. According to various embodiments, the image capturing input of the user device may include an image sensor that receives photons and converts the received photons into an electrical signal, and the electrical signal may further be converted to a digital signal to transmit digital image data. In some embodiments, the data collection sequence further facilitates storing the digital image data to a storage device (e.g., a database) accessible via the user device (e.g., across a network).

According to various embodiments, the method 4400 may also include executing the condition-specific data collection sequence and based on receiving condition-specific data in response to executing the condition-specific data collection sequence, data analytics may be performed on the condition to quantify magnitude of risk of the condition. Further, the method 4400 may also include performing the natural language processing on the condition-specific data based on the condition-specific data including audio data. The natural language processing may generate a textual record (e.g., textual data) of the condition at the physical location.

According to various embodiments, the method 4400 may also include generating a report from the condition-specific data, where the report provides analysis of the condition at the physical location. In particular, the report may be transmitted to a user device of a manager/supervisor to review and sign off on the report. In various embodiments, the report that is generated may also provide analysis of the condition over time based on, for example, additional observations performed by users each shift, each day, each week, etc.

Figure 45:
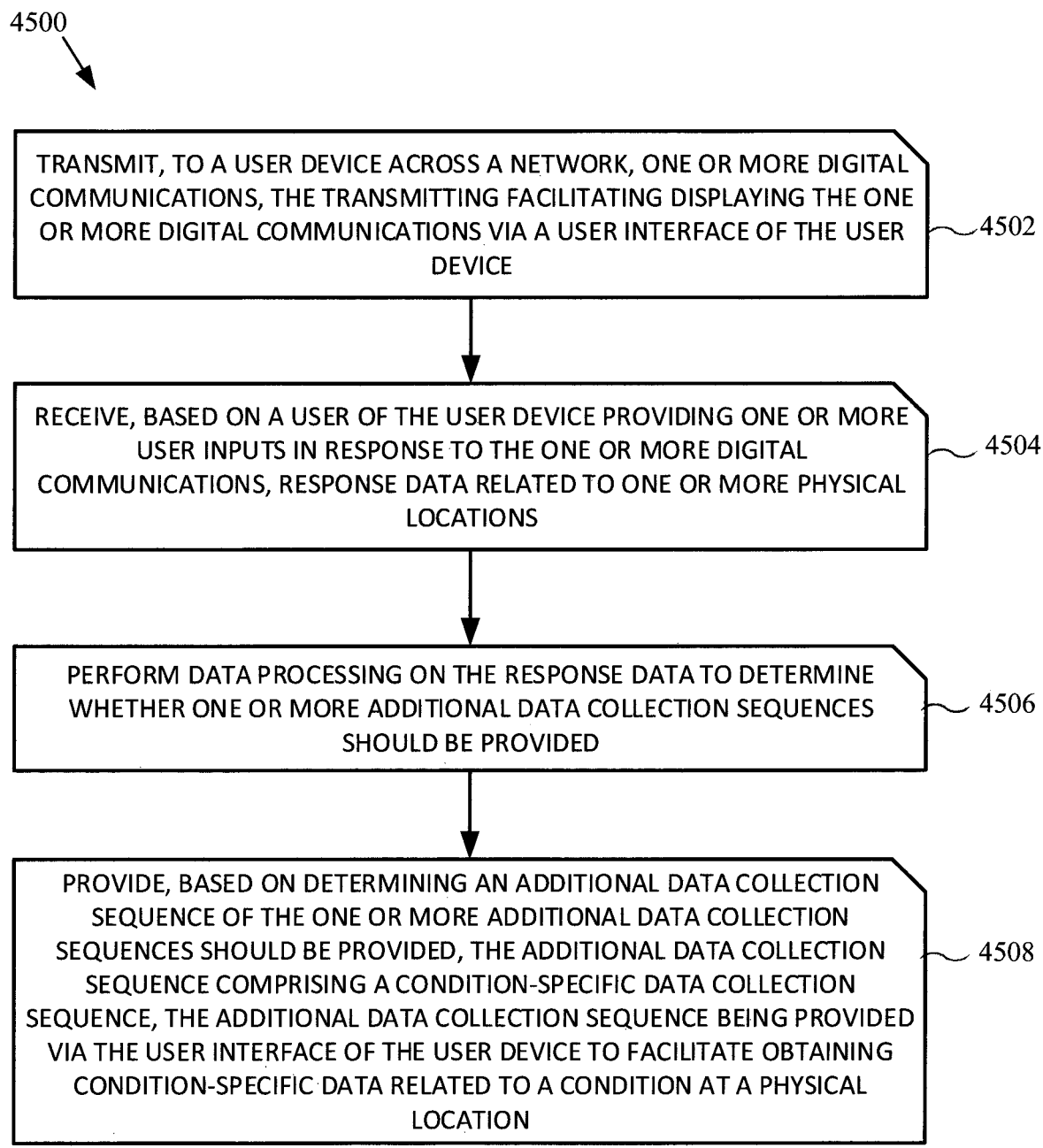
FIG. 45 depicts a block diagram of an example method for providing a condition-specific data collection sequence, in accordance with an embodiment of the present invention.

FIG. 45 depicts a block diagram of an example method 4500 for providing a condition-specific data collection sequence, in accordance with an embodiment of the present invention. At block 4502, one or more digital communications are transmitted to a user device across a network, where the transmitting facilitates displaying the one or more digital communications via a user interface of the user device. For instance, the one or more digital communications may include questions or inquiries about the user (e.g., a user name), a physical location (e.g., a worksite), a period of time (e.g., a work shift), a risk condition (e.g., lifting and rigging, working at heights, explosives, radiation, etc.), an individual in management (e.g., observations of management), safety procedures being implemented, surveys of employees, etc. At block 4504, based on the user of the user device providing one or more user inputs in response to the one or more digital communications, response data related to one or more physical locations is received. For instance, the physical locations could be a specific area of the worksite, a machine, a geographic location, a floor of a building, a cabin in a maritime vessel, etc. At block 4506, data processing is performed on the response data to determine whether one or more additional data collection sequences should be provided. The one or more additional data collection sequences can include, for example, survey questions or inputs for the user to provide additional information about a risk condition or as part of a risk assessment.

At block 4508, based on determining an additional data collection sequence of the one or more additional data collection sequences should be provided, the computing system provides the additional data collection sequence to the user via the user interface of the user device to facilitate obtaining condition-specific data related to a condition at a physical location. For instance, the additional data collection sequence provided may prompt the user to provide condition-specific data related to the condition at the physical location. The condition-specific data may include audio data, digital image data, textual data, and/or various other data obtained via user inputs provided by the user such as those described herein to provide data about a specific condition (e.g., a risk condition).

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor(s) may execute the computer readable program instructions thereby creating a means for implementing the actions specified in the flowchart illustrations and/or block diagrams.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable instructions for implementing the specified logical function(s). Additionally, the alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, or the functions of the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®", "Windows®", "macOS®", "iOS®", "Android®", and the like may be subject to trademark rights in various jurisdictions throughout the world and are used here only in reference to the products or services properly denominated by the marks to the extent that such trademark rights may exist.

What is claimed is:

1. A speech signal processing system facilitating natural language processing using audio transduction, the speech signal processing system comprising:
   one or more processors;
   at least one non-transitory computer readable storage medium storing program instructions executable by the one or more processors to:
      transmit, to a user device across a network, one or more digital communications, the transmitting facilitating displaying the one or more digital communications via a user interface of the user device;
      receive, based on a user of the user device providing one or more user inputs in response to the one or more digital communications, response data related to one or more physical locations;
      perform data processing on the response data to determine whether one or more additional data collection sequences should be provided; and
      provide, based on determining an additional data collection sequence should be provided, a condition-specific data collection sequence via the user interface of the user device to facilitate obtaining condition-specific data related to a condition at a physical location, wherein the condition-specific data includes audio data collected via the user device, and wherein the obtaining the condition-specific data comprises using a speech signal processing system to perform audio transduction to generate the audio data from a speech signal and facilitate performing natural language processing thereon.

2. The speech signal processing system facilitating natural language processing using audio transduction of claim 1, wherein the condition-specific data includes digital image data, and wherein the obtaining the condition-specific data further comprises collecting the digital image data via an image capturing input of the user device of the condition at the physical location, and wherein the digital image data includes one or more digital images.

3. The speech signal processing system facilitating natural language processing using audio transduction of claim 2, wherein the image capturing input of the user device comprises an image sensor that receives photons and converts the received photons into an electrical signal.

4. The speech signal processing system facilitating natural language processing using audio transduction of claim 2, wherein the data collection sequence further facilitates storing the digital image data to a storage device accessible via the user device.

5. The speech signal processing system facilitating natural language processing using audio transduction of claim 1, wherein the one or more digital communications comprise a risk assessment comprising queries to assess one or more potential risks at a facility, where the physical location comprises the facility.

6. The speech signal processing system facilitating natural language processing using audio transduction of claim 5, wherein the one or more potential risks include physical hazards and wherein the condition includes a potentially hazardous condition.

7. The speech signal processing system facilitating natural language processing using audio transduction of claim 1, wherein the data processing identifies one or more potential risks from the response data, and wherein the data collection sequence is generated based on the physical location being likely to include a potential risk of the identified one or more potential risks.

8. The speech signal processing system facilitating natural language processing using audio transduction of claim 1, wherein the one or more digital communications include one or more selectable parameters and wherein the one or more user inputs include selected parameters of the one or more selectable parameters.

9. The speech signal processing system facilitating natural language processing using audio transduction of claim 1, wherein the response data includes an identification of the user.

10. The speech signal processing system facilitating natural language processing using audio transduction of claim 1, wherein the program instructions are further executable to execute the condition-specific data collection sequence.

11. The speech signal processing system facilitating natural language processing using audio transduction of claim 10, wherein based on receiving the condition-specific data in response to executing the condition-specific data collection sequence the program instructions are further executable to perform data analytics of the condition to quantify magnitude of risk of the condition.

12. The speech signal processing system facilitating natural language processing using audio transduction of claim 1, wherein the natural language processing generates a textual record of the condition at the physical location.

13. The speech signal processing system facilitating natural language processing using audio transduction of claim 1, wherein the audio transduction is performed via an audio transducer that converts speech into an electrical signal.

14. The speech signal processing system facilitating natural language processing using audio transduction of claim 1, wherein the transmitting the one or more digital communications is performed based on the user initiating a risk assessment, and wherein the risk assessment is performed as part of a risk management system implementation that includes shift-based risk assessments of a site.

15. The speech signal processing system facilitating natural language processing using audio transduction of claim 14, wherein the site includes a physical workplace facility.

16. The speech signal processing system facilitating natural language processing using audio transduction of claim 1, wherein the condition-specific data collection sequence displays a prompt asking the user to classify the condition.

17. The speech signal processing system facilitating natural language processing using audio transduction of claim 1, wherein the condition-specific data collection sequence prompts the user to survey one or more individuals at the location about the condition.

18. The speech signal processing system facilitating natural language processing using audio transduction of claim 1, wherein the program instructions are further executable to generate a report from the condition-specific data, the report providing analysis of the condition at the physical location.

19. A computer system for providing a condition-specific data collection sequence, the computer system comprising:
  one or more processors;
  at least one non-transitory computer readable storage medium storing program instructions executable by the one or more processors to:
    transmit, to a user device across a network, one or more digital communications, the transmitting facilitating displaying the one or more digital communications via a user interface of the user device;
    receive, based on a user of the user device providing one or more user inputs in response to the one or more digital communications, response data related to one or more physical locations;
    perform data processing on the response data to determine whether one or more additional data collection sequences should be provided; and
    provide, based on determining an additional data collection sequence of the one or more additional data collection sequences should be provided, the additional data collection sequence comprising a condition-specific data collection sequence, the additional data collection sequence being provided via the user interface of the user device to facilitate obtaining condition-specific data related to a condition at a physical location.

20. A computer-implemented method for facilitating natural language processing using audio transduction, the method comprising:
  transmitting, to a user device across a network, one or more digital communications, the transmitting facilitating displaying the one or more digital communications via a user interface of the user device;
  receiving, based on a user of the user device providing one or more user inputs in response to the one or more digital communications, response data related to one or more physical locations;

performing data processing on the response data to determine whether one or more additional data collection sequences should be provided; and providing, based on determining a data collection sequence should be provided, a condition-specific data collection sequence via the user interface of the user device to facilitate obtaining condition-specific data related to a condition at a physical location, wherein the condition-specific data includes audio data collected via the user device, and wherein the obtaining the condition-specific data comprises using a speech signal processing system to perform audio transduction to generate the audio data from a speech signal and facilitate performing natural language processing thereon.

* * * * *